US012551553B2

(12) United States Patent
Harvengt et al.

(10) Patent No.: US 12,551,553 B2
(45) Date of Patent: Feb. 17, 2026

(54) METHODS FOR MANUFACTURING AN ADJUVANT

(71) Applicant: GLAXOSMITHKLINE BIOLOGICALS SA, Rixensart (BE)

(72) Inventors: Pol Harvengt, Rixensart (BE); Philippe Jehoulot, Rixensart (BE); Loic Le Gourrierec, Rixensart (BE); Demostene Sifakakis, Rixensart (BE); Laurent Strodiot, Rixensart (BE)

(73) Assignee: GlaxoSmithKline Biologicals SA, Rixensart (BE)

( * ) Notice: Subject to any disclaimer, the term of this patent is extended or adjusted under 35 U.S.C. 154(b) by 1210 days.

(21) Appl. No.: 17/296,689

(22) PCT Filed: Nov. 27, 2019

(86) PCT No.: PCT/EP2019/082689
§ 371 (c)(1),
(2) Date: May 25, 2021

(87) PCT Pub. No.: WO2020/109365
PCT Pub. Date: Jun. 4, 2020

(65) Prior Publication Data
US 2022/0339282 A1 Oct. 27, 2022

(30) Foreign Application Priority Data

Nov. 29, 2018 (EP) .................................. 18209335

(51) Int. Cl.
*A61K 39/39* (2006.01)
*A61K 47/24* (2006.01)
(Continued)

(52) U.S. Cl.
CPC .............. *A61K 39/39* (2013.01); *A61K 47/24* (2013.01); *A61K 47/28* (2013.01); *A61P 37/04* (2018.01);
(Continued)

(58) Field of Classification Search
None
See application file for complete search history.

(56) References Cited

U.S. PATENT DOCUMENTS

| 6,113,918 A * | 9/2000 | Johnson | A61P 37/00 |
| | | | 424/278.1 |
| 6,506,386 B1 * | 1/2003 | Friede | A61P 37/08 |
| | | | 424/283.1 |

(Continued)

FOREIGN PATENT DOCUMENTS

| CN | 1480136 A | 3/2004 |
| CN | 102133186 A | 7/2011 |

(Continued)

OTHER PUBLICATIONS

Beheiry et al., "Effect of pre-eclampsia on glomerular filtration rate in Sudanese women," International Journal of Research in Medical Sciences, vol. 5, No. 3, Mar. 2017, pp. 1053-1057.
(Continued)

*Primary Examiner* — Benjamin A Schiffman
(74) *Attorney, Agent, or Firm* — Christopher L. Wright

(57) ABSTRACT

The present invention relates to compositions and methods for manufacturing an adjuvant comprising an aminoalkyl glucosaminide phosphate compound or glucopyranosyl lipid adjuvant using a microfluidic device and to related aspects.

26 Claims, 36 Drawing Sheets
Specification includes a Sequence Listing.

(51) Int. Cl.
*A61K 47/28* (2006.01)
*A61P 37/04* (2006.01)
*A61K 39/00* (2006.01)

(52) U.S. Cl.
CPC ............ *A61K 2039/55555* (2013.01); *A61K 2039/55572* (2013.01); *A61K 2039/55577* (2013.01); *Y02A 50/30* (2018.01)

(56) References Cited

U.S. PATENT DOCUMENTS

| | | | |
|---|---|---|---|
| 6,846,489 B1 | 1/2005 | Garcon et al. | |
| 6,890,093 B2* | 5/2005 | Karp | B01F 35/713 |
| | | | 137/833 |
| 7,976,789 B2* | 7/2011 | Kenis | B01F 25/4521 |
| | | | 422/600 |
| 7,988,913 B2* | 8/2011 | Numajiri | B01L 3/502761 |
| | | | 422/65 |
| 8,563,325 B1 | 10/2013 | Bartsch et al. | |
| 8,609,114 B2* | 12/2013 | Reed | A61K 39/0011 |
| | | | 424/278.1 |
| 8,696,952 B2* | 4/2014 | Kumacheva | B01F 25/4331 |
| | | | 264/4.1 |
| 8,715,591 B2* | 5/2014 | Gaitan | A61K 9/1277 |
| | | | 422/502 |
| 8,722,064 B2* | 5/2014 | Reed | C07H 15/20 |
| | | | 424/278.1 |
| 8,821,006 B2* | 9/2014 | Norikane | B01F 25/4338 |
| | | | 366/DIG. 3 |
| 9,168,645 B2 | 10/2015 | Wassenhoven et al. | |
| 9,198,645 B2* | 12/2015 | Jahn | A61K 9/1277 |
| 9,241,988 B2* | 1/2016 | Shaw | A61K 39/0007 |
| 9,254,265 B2* | 2/2016 | Geall | A61P 31/12 |
| 9,518,078 B2* | 12/2016 | Shaw | A61K 39/39 |
| 9,592,198 B2* | 3/2017 | Hood | B01J 13/08 |
| 9,657,341 B2* | 5/2017 | Park | C12Q 1/686 |
| 9,750,812 B2* | 9/2017 | Ali | A61K 31/58 |
| 9,758,795 B2* | 9/2017 | Cullis | C12N 15/111 |
| 9,881,832 B2* | 1/2018 | Usenko | H01L 21/76254 |
| 9,943,846 B2* | 4/2018 | Cullis | A61P 43/00 |
| 9,981,237 B2* | 5/2018 | Brujic | A61Q 19/00 |
| 10,039,823 B2* | 8/2018 | Vandepapeliere | A61P 31/22 |
| 10,821,175 B2* | 11/2020 | Gindy | A61K 39/12 |
| 10,864,162 B2* | 12/2020 | Kim | A61K 9/5176 |
| 11,243,494 B2 | 2/2022 | Mueth et al. | |
| 11,266,602 B2* | 3/2022 | Fox | A61K 39/002 |
| 11,801,223 B2* | 10/2023 | Fox | A61K 39/04 |
| 11,844,828 B2* | 12/2023 | Bertaud | A61K 47/6415 |
| 12,016,919 B2* | 6/2024 | Harvengt | B01F 33/3017 |
| 2001/0053365 A1* | 12/2001 | Friede | A61K 39/39 |
| | | | 424/277.1 |
| 2002/0097633 A1 | 7/2002 | O'Connor et al. | |
| 2004/0262223 A1* | 12/2004 | Strook | B01F 25/43172 |
| | | | 436/178 |
| 2005/0112184 A1 | 5/2005 | Jahn et al. | |
| 2007/0242560 A1 | 10/2007 | Norikane et al. | |
| 2008/0069832 A1* | 3/2008 | Chomez | A61P 31/04 |
| | | | 424/236.1 |
| 2010/0022007 A1 | 1/2010 | Kenis et al. | |
| 2010/0182868 A1 | 7/2010 | Woehl | |
| 2010/0202928 A1 | 8/2010 | Gaitan et al. | |
| 2010/0266672 A1* | 10/2010 | Garcon | A61P 31/12 |
| | | | 424/197.11 |
| 2011/0212167 A1 | 9/2011 | Ali et al. | |
| 2012/0087976 A1* | 4/2012 | Henderickx | A61P 37/00 |
| | | | 424/277.1 |
| 2012/0093921 A1* | 4/2012 | Henderickx | A61P 37/04 |
| | | | 424/277.1 |
| 2012/0276209 A1 | 11/2012 | Cullis et al. | |
| 2012/0321694 A1* | 12/2012 | Larocque | A61K 39/0005 |
| | | | 424/193.1 |
| 2013/0119570 A1* | 5/2013 | Sugiura | B01F 33/3011 |
| | | | 425/6 |
| 2013/0168885 A1 | 7/2013 | Omiatek et al. | |
| 2013/0195969 A1 | 8/2013 | Geall et al. | |
| 2013/0202684 A1 | 8/2013 | Geall et al. | |
| 2014/0234403 A1* | 8/2014 | De Kesel | A61K 9/1277 |
| | | | 514/777 |
| 2015/0017191 A1* | 1/2015 | Fox | A61K 47/06 |
| | | | 424/283.1 |
| 2015/0110854 A1 | 4/2015 | Shaw et al. | |
| 2015/0115488 A1 | 4/2015 | Hood et al. | |
| 2016/0051954 A1 | 2/2016 | Brujic et al. | |
| 2016/0214103 A1 | 7/2016 | Cullis et al. | |
| 2016/0276209 A1 | 9/2016 | Usenko | |
| 2016/0324783 A1 | 11/2016 | Fox et al. | |
| 2016/0361411 A1* | 12/2016 | Gindy | A61K 39/292 |
| 2017/0071967 A1 | 3/2017 | Dutta et al. | |
| 2017/0082551 A1* | 3/2017 | Mackay | B01L 3/5027 |
| 2017/0144123 A1 | 5/2017 | Tabeling et al. | |
| 2017/0333348 A1 | 11/2017 | Kim et al. | |
| 2018/0318415 A1* | 11/2018 | Burkhart | A61K 45/06 |
| 2021/0069321 A1* | 3/2021 | Schneider-Ohrum | |
| | | | A61K 9/127 |
| 2021/0128474 A1 | 5/2021 | Strodiot et al. | |
| 2021/0162042 A1 | 6/2021 | Harvengt et al. | |
| 2022/0032247 A1 | 2/2022 | Buesink et al. | |
| 2023/0277657 A1 | 9/2023 | Jehoulet et al. | |

FOREIGN PATENT DOCUMENTS

| | | |
|---|---|---|
| CN | 102302453 A | 1/2012 |
| CN | 102327224 A | 1/2012 |
| CN | 103796642 A | 5/2014 |
| CN | 106902081 A | 6/2017 |
| EP | 1 473 084 A2 | 11/2004 |
| EP | 1 810 746 A1 | 7/2007 |
| EP | 2 596 858 A1 | 5/2013 |
| EP | 2 364 720 B1 | 5/2014 |
| EP | 2 759 344 A2 | 7/2014 |
| FR | 3 043 919 A1 | 5/2017 |
| JP | 2008-163010 A | 7/2008 |
| WO | WO 96/33739 A1 | 10/1996 |
| WO | WO 98/15287 A1 | 4/1998 |
| WO | WO 00/07621 A2 | 2/2000 |
| WO | WO 2005/103106 A1 | 11/2005 |
| WO | WO 2005/112991 A2 | 12/2005 |
| WO | WO 2007/062831 A1 | 6/2007 |
| WO | WO 2009/136300 A2 | 11/2009 |
| WO | WO 2010/142685 A1 | 12/2010 |
| WO | WO 2010/142686 A1 | 12/2010 |
| WO | WO 2011/140627 A1 | 11/2011 |
| WO | WO 2012/030901 A1 | 3/2012 |
| WO | WO 2013/041572 A1 | 3/2013 |
| WO | WO 2015/063710 A1 | 5/2015 |
| WO | WO 2015/095340 A1 | 6/2015 |
| WO | WO 2015/095346 A1 | 6/2015 |
| WO | WO 2015/148764 A1 | 10/2015 |
| WO | WO 2016/037053 A1 | 3/2016 |
| WO | WO 2016/138175 A1 | 9/2016 |
| WO | 2017097783 A1 | 6/2017 |
| WO | 2017200957 A1 | 11/2017 |
| WO | 2018219521 A1 | 12/2018 |
| WO | WO 2018/220553 A1 | 12/2018 |

OTHER PUBLICATIONS

Garg et al., "Microfluidics: a transformational tool for nanomedicine development and production," Journal of Drug Targeting, vol. 24, No. 9, 2016, pp. 821-835.

Gujrati et al., "Multifunctional pH-Sensitive Amino Lipids for siRNA Delivery," Bioconjugate Chemistry, vol. 27, 2016, pp. 19-35.

Ignatova et al., "Feasibility of scaling from pilot to process scale," Journal of Chromatography A, vol. 1151, 2007, pp. 20-24.

Leung et al., "Microfluidic Mixing: A General Method for Encapsulating Macromolecules in Lipid Nanoparticle Systems," The Journal of Physical Chemistry B, vol. 119, 2015, pp. 8698-8706.

Fung, et al.,. "Optimizing manufacturing and composition of a TLR4 nanosuspension: physicochemical stability and vaccine adjuvant activity", Journal of Nanobiotechnology, Biomed Central, GB, vol. 11, No. 1, Dec. 21, 2013 (Dec. 21, 2013), pp. 43.

(56) References Cited

OTHER PUBLICATIONS

Jahn, et al., "Microfluidic Directed Formation of Liposomes of Controlled Size", Langmuir, vol. 23, No. 11, May 1, 2007 (May 1, 2007), pp. 6289-6293.
Sameer et al.,"Microfluidics based manufacture of liposomes simultaneously entrapping hydrophilic and lipophilic drugs", International Journal of Pharmaceutics, Elsevier, NL, vol. 514, No. 1, Nov. 15, 2016 (Nov. 15, 2016), pp. 160-168.
International Search Report and Written Opinion in corresponding International Application No. PCT/EP2019/082689, mailed May 12, 2020 (19 pages).
"Lab-on-a-Chip Catalogue," Microfluidic ChipShop GmbH, Jan. 2018, 294 pages total.
"Lab-on-a-Chip Catalogue," Microfluidic ChipShop GmbH, Oct. 2016, 246 pages total.
Arias et al., "Glucopyranosyl lipid adjuvant (GLA), a synthetic TLR4 agonist, promotes potent systemic and mucosal responses to intranasal immunization with HIVgp140," PLoS One, vol. 7, Issue 7, e41144, Jul. 2012, pp. 1-8.
Black et al., "Developing vaccines for an aging population," Science Translational Medicine, vol. 7, Issue 281, 281ps8, Apr. 1, 2015, pp. 1-7.
Coler et al., "Development and characterization of synthetic glucopyranosyl lipid adjuvant system as a vaccine adjuvant," PLoS One, vol. 6, Issue 1, e16333, Jan. 2011, pp. 1-12.
Dalsgaard, "Saponin adjuvants: III. Isolation of a substance from quillaja saponaria molina with adjuvant activity in foot-and-mouth disease vaccines," Archiv für die gesamte Virusforschung, vol. 44, 1974, pp. 243-254.
Damiati et al., "Microfluidic devices for drug delivery systems and drug screening," Genes, vol. 9, No. 103, 2018, pp. 1-24.
De Becker et al., "The adjuvant monophosphoryl lipid A increases the function of antigen-presenting cells," International Immunology, vol. 12, No. 6, 2000, pp. 807-815.
Dendouga et al, "Cell-mediated immune responses to a varicella-zoster virus glycoprotein E vaccine using both a TLR agonist and QS21 in mice," Vaccine, vol. 30, 2012, pp. 3126-3135.
Didierlaurent et al., "Adjuvant system AS01: helping to overcome the challenges of modern vaccines," Expert Review of Vaccines, vol. 16, No. 1, 2017, pp. 55-63.
Didierlaurent et al., "Enhancement of adaptive immunity by the human vaccine adjuvant AS01 depends on activated dendritic cells," The Journal of Immunology, vol. 193, No. 4, 2014, pp. 1920-1930.
Dillon et al., "Molecular characterization and human T-cell responses to a member of a novel *Mycobacterium tuberculosis* mtb39 gene family," Infection and Immunity, vol. 67, No. 6, Jun. 1999, pp. 2941-2950.
Fochesato et al., "Comparative preclinical evaluation of AS01 versus other adjuvant systems in a candidate herpes zoster glycoprotein E subunit vaccine," Human Vaccines & Immunotherapeutics, vol. 12, No. 8, 2016, pp. 2092-2095.
Garcon et al., "Recent clinical experience with vaccines using MPL-and QS-21-containing adjuvant systems," Expert Review of Vaccines, vol. 10, No. 4, 2011, pp. 471-486.
Geall et al., "Nonviral delivery of self-amplifying RNA vaccines," Proceedings of the National Academy of Sciences, vol. 109, No. 36, Sep. 4, 2012, pp. 14604-14609.
Haumont et al., "Purification, characterization and immunogenicity of recombinant varicella-zoster virus glycoprotein gE secreted by Chinese hamster ovary cells," Virus Research, vol. 40, 1996, pp. 199-204.
Helminen et al., "A major outer membrane protein of Moraxella catarrhalis is a target for antibodies that enhance pulmonary clearance of the pathogen in an animal model," Infection and Immunity, vol. 61, No. 5, May 1993, pp. 2003-2010.
Hood et al., "High-throughput continuous flow production of nanoscale liposomes by microfluidic vertical flow focusing," Small, vol. 11, No. 43, 2015, pp. 5790-5799.

Ismaili et al. "Monophosphoryl lipid A activates both human dendritic cells and T cells," The Journal of Immunology, vol. 168, No. 2, 2002, pp. 926-932.
Javaid et al., "Analysis of passive mixing in a serpentine microchannel with sinusoidal side walls," Micromachines, vol. 9, No. 8, 2017, pp. 1-15.
Jeffs et al., "A scalable, extrusion-free method for efficient liposomal encapsulation of plasmid DNA," Pharmaceutical Research, vol. 22, No. 3, Mar. 2005, pp. 362-372.
Joshi et al., "Microfluidics based manufacture of liposomes simultaneously entrapping hydrophilic and lipophilic drugs," International Journal of Pharmaceutics, vol. 514, 2016, pp. 160-168.
Karthikeyan et al., "Numerical modeling and parametric optimization of micromixer for low diffusivity fluids," International Journal of Chemical Reactor Engineering, Feb. 31, 2016, 2018, pp. 1-11.
Kastner et al., "High-throughput manufacturing of size-tuned liposomes by a new microfluidics method using enhanced statistical tools for characterization," International Journal of Pharmaceutics, vol. 477, 2014, pp. 361-368.
Kensil et al., "QS-21: a water-soluble triterpene glycoside adjuvant," Expert Opinion on Investigational Drugs, vol. 7, No. 9, 1998, pp. 1475-1482.
Kensil et al., "Separation and characterization of saponins with adjuvant activity from quillaja saponaria molina cortex," The Journal of Immunology, vol. 146, No. 2, Jan. 15, 1991, pp. 431-437.
Kim et al., "Mass production and size control of lipid-polymer hybrid nanoparticles through controlled microvortices," Nano Letters, vol. 12, published Jun. 20, 2012, Correction published Sep. 17, 2013, pp. 3587-3591.
Lambrecht et al., "Mechanism of action of clinically approved adjuvants," Current Opinion in Immunology, vol. 21, 2009, pp. 23-29.
Leroux-Roels et al., "A phase 1/2 clinical trial evaluating safety and immunogenicity of a varicella zoster glycoprotein E subunit vaccine candidate in young and older adults," The Journal of Infectious Diseases, vol. 206, Oct. 15, 2012, pp. 1280-1290.
Li et al., "Cutting edge: inflammasome activation by alum and alum's adjuvant effect are mediated by NLRP3," The Journal of Immunology, vol. 181, No. 1, 2008, pp. 17-21.
Liang et al., "Simulation and experiment of capillary driven passive planar baffle micro-mixer," Proceedings of the 10th IEEE International Conference on Nano/Micro Engineered and Molecular Systems, Apr. 7-11, 2015, pp. 120-123.
Livingston et al., "Phase 1 trial of immunological adjuvant QS-21 with a GM2 ganglioside-keyhole limpet haemocyanin conjugate vaccine in patients with malignant melanoma," Vaccine, vol. 12, No. 14, 1994, pp. 1275-1280.
Martin et al., "Role of innate immune factors in the adjuvant activity of monophosphoryl lipid A," Infection and Immunity, vol. 71, No. 5, May 2003, pp. 2498-2507.
Marty-Roix et al., "Identification of QS-21 as an inflammasome-activating molecular component of saponin adjuvants," Journal of Biological Chemistry, vol. 291, No. 3, Jan. 15, 2016, pp. 1123-1136.
Mata-Haro et al., "The vaccine adjuvant monophosphoryl lipid A as a TRIF-biased agonist of TLR4," Science, vol. 316, Jun. 15, 2007, pp. 1628-1632.
Mclellan et al. "Structure of RSV fusion glycoprotein trimer bound to a prefusion-specific neutralizing antibody," Science, vol. 340, No. 6136, May 31, 2013, pp. 1113-1117.
Mclellan et al., "Structure-based design of a fusion glycoprotein vaccine for respiratory syncytial virus," Science, vol. 342, No. 6158, Nov. 1, 2013, pp. 592-598.
Meijer et al., "Passive and active mixing in microfluidic devices," Macromolecular Symposia, vol. 279, 2009, pp. 201-209.
Newman et al., "Saponin adjuvant induction of ovalbumin-specific CD8+ cytotoxic T lymphocyte responses," Journal of Immunology, vol. 148, No. 8, Apr. 15, 1992, pp. 2357-2362.
Perrie et al., "Designing liposomal adjuvants for the next generation of vaccines," Advanced Drug Delivery Reviews, vol. 99, 2016, pp. 85-96.
Perrie et al., "Microfluidics production of liposomes—from low solubility drugs to vaccines," Nanomedicines: Materials, Manufacturing and Therapeutic Applications, Jul. 16, 2016, 42 pages total.

(56) References Cited

OTHER PUBLICATIONS

Ragupathi et al., "Natural and synthetic saponin adjuvant QS-21 for vaccines against cancer," Expert Review of Vaccines, vol. 10, No. 4, Apr. 2011, pp. 463-470 (14 pages total).

Rasouli et al., "Numerical study on low Reynolds mixing of T-shaped micro-mixers with obstacles," Trans. Phenom, Nano Micro Sales, vol. 3, No. 2, 2015, pp. 68-76.

Rigter et al., "A protective and safe intranasal RSV vaccine based on a recombinant prefusion-like form of the F protein bound to bacterium-like particles," PLoS One, vol. 8, Issue 8, e71072, Aug. 2013, pp. 1-14.

Skeiky et al., "Cloning, expression, and immunological evaluation of two putative secreted serine protease antigens of *Mycobacterium tuberculosis*," Infection and Immunity, vol. 67, No. 8. Aug. 1999, pp. 3998-4007.

Skeiky et al., "Differential immune responses and protective efficacy induced by components of a tuberculosis polyprotein vaccine, Mtb72F, delivered as naked DNA or recombinant protein," The Journal of Immunology, vol. 172, No. 12, 2004, pp. 7618-7628.

Soltysik et al., "Structure/function studies of QS-21 adjuvant: assessment of triterpene aldehyde and glucuronic acid roles in adjuvant function," Vaccine, vol. 13, No. 15, 1995, pp. 1403-1410.

Vafai, "Antibody-binding sites on truncated forms of varicella-zoster virus gpl(gE) glycoprotein," Vaccine, vol. 12, No. 14, 1994, pp. 1265-1269.

Vladisavljevic et al. "Industrial lab-on-a-chip: Design, applications and scale-up for drug discovery and delivery," Advanced Drug Delivery Reviews, vol. 65, 2013, pp. 1626-1663.

Yu et al., "Microfluidic Methods for Production of Liposomes," Methods in Enzymology, vol. 465, Chapter 7, 2009, pp. 129-141.

\* cited by examiner

FIG. 8

| Day | DOPC concentration (ug/ml) | Flow rate ratio | Temperature (°C) | Total flow rate (ml/min) | Comment |
|---|---|---|---|---|---|
| 1 | 100 | 4 | 15 | 14 | |
| 1 | 100 | 4 | 25 | 20 | |
| 1 | 130 | 4 | 20 | 17 | |
| 1 | 130 | 5 | 15 | 17 | |
| 1 | 130 | 5 | 20 | 17 | Pt centre |
| 1 | 160 | 5 | 20 | 17 | |
| 1 | 160 | 6 | 15 | 14 | |
| 1 | 160 | 6 | 15 | 20 | |
| 1 | 160 | 6 | 25 | 20 | Day1 |
| 2 | 100 | 4 | 15 | 14 | RepeatDay2 |
| 2 | 100 | 5 | 20 | 17 | |
| 2 | 100 | 6 | 25 | 14 | |
| 2 | 100 | 6 | 25 | 20 | |
| 2 | 130 | 5 | 20 | 17 | Pt centre |
| 2 | 130 | 5 | 20 | 17 | Pt centre |
| 2 | 160 | 4 | 15 | 20 | |
| 2 | 160 | 4 | 25 | 14 | |
| 2 | 160 | 6 | 25 | 20 | RepeatDay2 |
| 3 | 100 | 4 | 15 | 14 | RepeatDay3 |
| 3 | 100 | 4 | 15 | 20 | |
| 3 | 100 | 4 | 25 | 14 | |
| 3 | 100 | 6 | 15 | 14 | |
| 3 | 130 | 5 | 20 | 17 | Pt centre |
| 3 | 130 | 5 | 20 | 17 | Pt centre |
| 3 | 130 | 6 | 20 | 17 | |
| 3 | 160 | 6 | 25 | 14 | |
| 3 | 160 | 6 | 25 | 20 | RepeatDay3 |
| 4 | 100 | 4 | 15 | 14 | RepeatDay4 |
| 4 | 100 | 6 | 15 | 20 | |
| 4 | 130 | 5 | 20 | 14 | |
| 4 | 130 | 5 | 20 | 17 | Pt centre |
| 4 | 130 | 5 | 20 | 20 | |
| 4 | 130 | 5 | 25 | 17 | |
| 4 | 160 | 4 | 15 | 14 | |
| 4 | 160 | 4 | 25 | 20 | |
| 4 | 160 | 6 | 25 | 20 | RepeatDay4 |

FIG. 10

| Day | Concentration mg/ml | Ratio | Temp °C | Flow rate ml/min | Reynolds number | QS21 in aqueous phase mg/ml | Zav nm | Pdi |
|---|---|---|---|---|---|---|---|---|
| 1 | 100 | 4 | 25 | 20 | 171 | 1.67 | 159.2 | 0.302 |
| 1 | 160 | 6 | 25 | 20 | 198 | 1.60 | 141.1 | 0.297 |
| 1 | 130 | 4 | 20 | 17 | 137 | 2.17 | 116.6 | 0.225 |
| 1 | 130 | 5 | 20 | 17 | 148 | 1.63 | 97.09 | 0.200 |
| 1 | 160 | 5 | 20 | 17 | 148 | 2.00 | 120.6 | 0.229 |
| 1 | 100 | 4 | 15 | 14 | 104 | 1.67 | 114.6 | 0.248 |
| 1 | 130 | 5 | 15 | 17 | 136 | 1.63 | 94.41 | 0.167 |
| 1 | 160 | 6 | 15 | 14 | 118 | 1.60 | 110.8 | 0.213 |
| 1 | 160 | 6 | 15 | 20 | 169 | 1.60 | 100.1 | 0.166 |
| 2 | 100 | 6 | 25 | 14 | 139 | 1.00 | 115.2 | 0.21 |
| 2 | 100 | 6 | 25 | 20 | 198 | 1.00 | 123.5 | 0.237 |
| 2 | 160 | 4 | 25 | 14 | 120 | 2.67 | 128.1 | 0.162 |
| 2 | 160 | 6 | 25 | 20 | 198 | 1.60 | 127.5 | 0.204 |
| 2 | 100 | 5 | 20 | 17 | 148 | 1.25 | 87.42 | 0.157 |
| 2 | 130 | 5 | 20 | 17 | 148 | 1.63 | 95.35 | 0.158 |
| 2 | 130 | 5 | 20 | 17 | 148 | 1.63 | 95.36 | 0.167 |
| 2 | 100 | 4 | 15 | 14 | 104 | 1.67 | 103 | 0.183 |
| 2 | 160 | 4 | 15 | 20 | 149 | 2.67 | 107.7 | 0.187 |
| 3 | 100 | 4 | 25 | 14 | 120 | 1.67 | 131.6 | 0.2 |
| 3 | 160 | 6 | 25 | 14 | 139 | 1.60 | 115.7 | 0.178 |
| 3 | 160 | 6 | 25 | 20 | 198 | 1.60 | 132.6 | 0.24 |
| 3 | 130 | 5 | 20 | 17 | 148 | 1.63 | 96.19 | 0.169 |
| 3 | 130 | 5 | 20 | 17 | 148 | 1.63 | 98.51 | 0.183 |
| 3 | 130 | 6 | 20 | 17 | 157 | 1.30 | 97.39 | 0.171 |
| 3 | 100 | 4 | 15 | 14 | 104 | 1.67 | 97.85 | 0.182 |
| 3 | 100 | 6 | 15 | 14 | 118 | 1.00 | 98.3 | 0.189 |
| 3 | 100 | 4 | 15 | 20 | 149 | 1.67 | 88.89 | 0.186 |
| 4 | 130 | 5 | 25 | 17 | 158 | 1.63 | 105 | 0.16 |
| 4 | 160 | 4 | 25 | 20 | 171 | 2.67 | 134 | 0.183 |
| 4 | 160 | 6 | 25 | 20 | 198 | 1.60 | 127.3 | 0.194 |
| 4 | 130 | 5 | 20 | 14 | 122 | 1.63 | 110.7 | 0.159 |
| 4 | 130 | 5 | 20 | 17 | 148 | 1.63 | 96.91 | 0.154 |
| 4 | 130 | 5 | 20 | 20 | 174 | 1.63 | 100.2 | 0.168 |
| 4 | 100 | 4 | 15 | 14 | 104 | 1.67 | 103.9 | 0.194 |
| 4 | 100 | 6 | 15 | 20 | 169 | 1.00 | 77.07 | 0.177 |
| 4 | 160 | 4 | 15 | 14 | 104 | 2.67 | 115.5 | 0.191 |

METHODS FOR MANUFACTURING AN ADJUVANT

SEQUENCE LISTING

The instant application contains an electronically submitted Sequence Listing in ASCII text file format (Name: VB66688_US_SeqListinf.txt; Size: 4,918 bytes; and Date of Creation: 8 Nov. 2021) which is hereby incorporated by reference in its entirety.

TECHNICAL FIELD

The present invention relates to methods for manufacturing an adjuvant comprising an aminoalkyl glucosaminide phosphate compound or glucopyranosyl lipid adjuvant, such as CRX524, CRX527, CRX529, CRX547, CRX526, CRX601 and/or CRX602, using a microfluidic device and to related aspects.

BACKGROUND OF THE INVENTION

Adjuvants are included in vaccines to improve humoral and cellular immune responses, particularly in the case of poorly immunogenic subunit vaccines. Similar to natural infections by pathogens, adjuvants rely on the activation of the innate immune system to promote long-lasting adaptive immunity. As simultaneous activation of multiple innate immune pathways is a feature of natural infections, adjuvants may combine multiple immunostimulants in order to promote adaptive immune responses to vaccination.

The Adjuvant System 01 (AS01) is a liposome-based adjuvant which contains two immunostimulants, 3-O-desacyl-4'-monophosphoryl lipid A (3D-MPL) and QS-21 (Garcon and Van Mechelen, 2011; Didierlaurent et al, 2017). The TLR4 agonist 3D-MPL is a non-toxic derivative of the lipopolysaccharide from *Salmonella minnesota*. QS-21 is a natural saponin molecule extracted from the bark of the South American tree *Quillaja saponaria* Molina (Kensil et al., 1991; Ragupathi et al., 2011). AS01 is included in the recently developed malaria vaccine RTS,S (Mosquirix™) and Herpes zoster HZ/su vaccine (Shingrix™) and in multiple candidate vaccines in development against pathogens such as human immunodeficiency virus and *Mycobacterium tuberculosis*. During preclinical and clinical evaluation of these candidate vaccines, both antigen-specific antibody and CD4+ T cell immunity were consistently observed. The ability of AS01 to consistently generate cellular immune responses to vaccination sets it apart from other adjuvants that typically mainly promote humoral responses to vaccination (Black et al., 2015; Garcon and Van Mechelen, 2011). Concomitantly, AS01-adjuvanted vaccines have been efficient in promoting immunogenicity to vaccination in challenging populations, such as infants (with RTS,S) and older adults (with HZ/su).

AS01 injection results in rapid and transient activation of innate immunity in animal models. Neutrophils and monocytes are rapidly recruited to the draining lymph node (dLN) upon immunization. Moreover, AS01 induces recruitment and activation of MHCII$^{high}$ dendritic cells (DC), which are necessary for T cell activation (Didierlaurent A. M. et al., 2014). Some data are also available on the mechanism of action of the components of AS01. 3D-MPL signals via TLR4, stimulating NF-κB transcriptional activity and cytokine production and directly activates antigen-presenting cells (APCs) both in humans and in mice (De Becker et al., 2000; Ismaili et al., 2002; Martin et al., 2003; Mata-Haro et al., 2007). QS-21 promotes high antigen-specific antibody responses and CD8+ T-cell responses in mice (Kensil and Kammer, 1998; Newman et al., 1992; Soltysik et al., 1995) and antigen-specific antibody responses in humans (Livingston et al., 1994). Because of its physical properties, it is thought that QS-21 might act as a danger signal in vivo (Lambrecht et al., 2009; Li et al., 2008). Although QS-21 has been shown to activate ASC-NLRP3 inflammasome and subsequent IL-1β/IL-18 release (Marty-Roix, R. et al., 2016), the exact molecular pathways involved in the adjuvant effect of saponins have yet to be clearly defined.

The TLR4 agonist 3D-MPL and saponin QS-21 have been shown to act synergistically in the induction of immune responses. Furthermore, the manner in which both immunostimulants are provided has been shown to be an important factor which influences the quality of the induced responses, with the liposomal presentation in AS01 providing higher potency than the oil-in-water emulsion based AS02. (Dendouga et al. 2012)

Aminoalkyl glucosaminide phosphate TLR4 modulators have been described in the prior art, see for example international patent applications WO2004062599, WO2006016997 and WO2014141127.

Glucopyranosyl lipid adjuvants have been as described in WO2008/153541 or WO2009/143457, and in the literature articles Coler R N et al. (2011) Development and Characterization of Synthetic Glucopyranosyl Lipid Adjuvant System as a Vaccine Adjuvant. PLoS ONE 6(1): e16333. doi:10.1371/Journal.pone.0016333 and Arias M A et al. (2012) Glucopyranosyl Lipid Adjuvant (GLA), a Synthetic TLR4 Agonist, Promotes Potent Systemic and Mucosal Responses to Intranasal Immunization with HIVgp140. PLoS ONE 7(7): e41144. doi:10.1371/journal.pone.0041144.

US2010202928 and US2015115488 describe the preparation of liposomes using microfluidics.

WO2013/192310 discloses methods for the mass production of nanoparticles through controlled microvortices. The methods are stated to be of use in the preparation of polymeric or non-polymeric particles and hybrid particles.

Kim et al *Nano Letters* 2012 12(7):3587-3591 also discloses methods for the mass production of nanoparticles through controlled microvortices.

Hood et al *Small* 2015 11 43:5790-5799 describes methods for the production of liposomes using microfluidics.

WO2018/219521 describes methods for manufacturing an adjuvant comprising a saponin using a microfluidic device and related aspects.

There remains a need for new manufacturing approaches which enable the safe, convenient and cost effective production of liposomal adjuvants on a commercially viable scale while maintaining the immunological performance arising from conventional manufacturing approaches.

SUMMARY OF THE INVENTION

It has now surprisingly been found that a microfluidic device can be used to manufacture a liposomal adjuvant comprising an aminoalkyl glucosaminide phosphate compound or glucopyranosyl lipid adjuvant.

Accordingly, there is provided a method of manufacturing a liposomal adjuvant comprising an aminoalkyl glucosaminide phosphate compound or glucopyranosyl lipid adjuvant using a microfluidic device, comprising the following steps:
(a) mixing in the device a first solution comprising a solvent, phosphatidylcholine lipid and an aminoalkyl glucosaminide phosphate compound or glucopyranosyl lipid adjuvant, and a second solution comprising water; and (b) removing the solvent.

Also provided is a method of manufacturing a liposomal adjuvant comprising an aminoalkyl glucosaminide phosphate compound or glucopyranosyl lipid adjuvant using a microfluidic device, comprising the following steps:

(a) mixing in the device a first solution comprising a solvent, phosphatidylcholine lipid and an aminoalkyl glucosaminide phosphate compound or glucopyranosyl lipid adjuvant, and a second solution comprising water;

(b) adding a saponin; and (c) removing the solvent.

Further provided is a method of manufacturing a liposomal adjuvant comprising an aminoalkyl glucosaminide phosphate compound or glucopyranosyl lipid adjuvant using a microfluidic device, comprising the following steps:

(a) mixing in the device a first solution comprising a solvent, phosphatidylcholine lipid and an aminoalkyl glucosaminide phosphate compound or glucopyranosyl lipid adjuvant, and a second solution comprising water;

(b) removing the solvent; and (c) adding a saponin.

The present invention also provides a method of manufacturing a liposomal concentrate of use in preparing a liposomal adjuvant comprising an aminoalkyl glucosaminide phosphate compound or glucopyranosyl lipid adjuvant using a microfluidic device, comprising the step of mixing in the device a first solution comprising a solvent, phosphatidylcholine lipid and an aminoalkyl glucosaminide phosphate compound or glucopyranosyl lipid adjuvant, and a second solution comprising water.

Also provided is a method of manufacturing a liposomal concentrate of use in preparing a liposomal adjuvant comprising an aminoalkyl glucosaminide phosphate compound or glucopyranosyl lipid adjuvant using a microfluidic device, comprising the following steps:

(a) mixing in the device a first solution comprising a solvent, phosphatidylcholine lipid and an aminoalkyl glucosaminide phosphate compound or glucopyranosyl lipid adjuvant, and a second solution comprising water; and (b) adding a saponin.

Further provided is a liposomal concentrate of use in preparing a liposomal adjuvant, said liposomal concentrate comprising water, a solvent, phosphatidylcholine lipid and an aminoalkyl glucosaminide phosphate compound or glucopyranosyl lipid adjuvant.

Further provided is a liposomal concentrate of use in preparing a liposomal adjuvant, said liposomal concentrate comprising water, a solvent, phosphatidylcholine lipid, saponin and an aminoalkyl glucosaminide phosphate compound or glucopyranosyl lipid adjuvant.

The present invention additionally provides a solution comprising a solvent, 100-170 mg/ml lipid and an aminoalkyl glucosaminide phosphate compound or glucopyranosyl lipid adjuvant, wherein the solvent comprises 70-90% v/v ethanol and 10-30% v/v isopropyl alcohol. Such solutions may be used in the manufacture of liposomes, such as a liposomal adjuvant.

BRIEF DESCRIPTION OF THE DRAWINGS

FIG. 8: Detail of Example 3 operating conditions and organisational arrangements FIG. 10: Results of Example 3

DESCRIPTION OF SEQUENCE IDENTIFIERS

Figure 1:
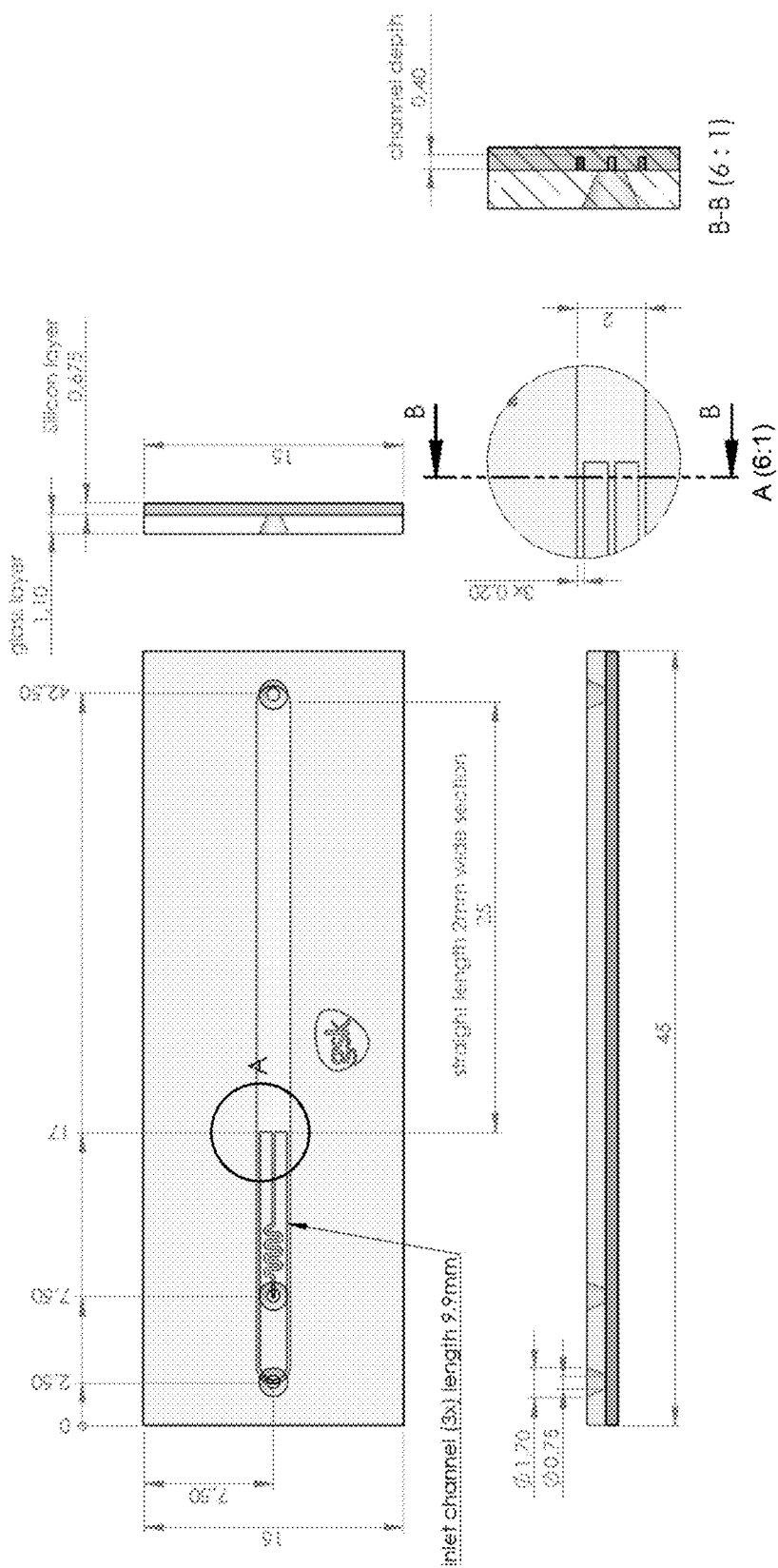
FIG. 1: Schematic of single mixing chamber microfluidic chip

SEQ ID No. 1: Varicella zoster virus truncated gE polypeptide sequence

DETAILED DESCRIPTION

The present invention provides a method of manufacturing a liposomal adjuvant comprising an aminoalkyl glucosaminide phosphate compound using a microfluidic device, comprising the following steps:

(a) mixing in the device a first solution comprising a solvent, phosphatidylcholine lipid and an aminoalkyl glucosaminide phosphate compound, and a second solution comprising water; and (b) removing the solvent.

Also provided is a method of manufacturing a liposomal adjuvant comprising an aminoalkyl glucosaminide phosphate compound using a microfluidic device, comprising the following steps:

(a) mixing in the device a first solution comprising a solvent, phosphatidylcholine lipid and an aminoalkyl glucosaminide phosphate compound, and a second solution comprising water;

(b) adding a saponin; and (c) removing the solvent.

Further provided is a method of manufacturing a liposomal adjuvant comprising an aminoalkyl glucosaminide phosphate compound using a microfluidic device, comprising the following steps:

(a) mixing in the device a first solution comprising a solvent, phosphatidylcholine lipid and an aminoalkyl glucosaminide phosphate compound, and a second solution comprising water;

(b) removing the solvent; and (c) adding a saponin.

The present invention also provides a method of manufacturing a liposomal concentrate of use in preparing a liposomal adjuvant comprising an aminoalkyl glucosaminide phosphate compound using a microfluidic device, comprising the step of mixing in the device a first solution comprising a solvent, phosphatidylcholine lipid and an aminoalkyl glucosaminide phosphate compound, and a second solution comprising water.

Also provided is a method of manufacturing a liposomal concentrate of use in preparing a liposomal adjuvant comprising an aminoalkyl glucosaminide phosphate compound using a microfluidic device, comprising the following steps:

(a) mixing in the device a first solution comprising a solvent, phosphatidylcholine lipid and an aminoalkyl glucosaminide phosphate compound, and a second solution comprising water; and (b) adding a saponin.

Further provided is a liposomal concentrate of use in preparing a liposomal adjuvant, said liposomal concentrate comprising water, a solvent, phosphatidylcholine lipid and an aminoalkyl glucosaminide phosphate compound.

The present invention additionally provides a solution comprising a solvent and 100-170 mg/ml lipid and an aminoalkyl glucosaminide phosphate compound, wherein the solvent comprises 70-90% v/v ethanol and 10-30% v/v isopropyl alcohol. Such solutions may be used in the manufacture of liposomes, such as a liposomal adjuvant.

The present invention provides a method of manufacturing a liposomal adjuvant comprising a glucopyranosyl lipid adjuvant using a microfluidic device, comprising the following steps:

(a) mixing in the device a first solution comprising a solvent, phosphatidyicholine lipid and a glucopyranosyl lipid adjuvant, and a second solution comprising water; and (b) removing the solvent.

Also provided is a method of manufacturing a liposomal adjuvant comprising a glucopyranosyl lipid adjuvant using a microfluidic device, comprising the following steps:

(d) mixing in the device a first solution comprising a solvent, phosphatidylcholine lipid and a glucopyranosyl lipid adjuvant, and a second solution comprising water;

(e) adding a saponin; and (f) removing the solvent.

Further provided is a method of manufacturing a liposomal adjuvant comprising a glucopyranosyi lipid adjuvant using a microfluidic device, comprising the following steps:

(d) mixing in the device a first solution comprising a solvent, phosphatidyicholine lipid and a glucopyranosyl lipid adjuvant, and a second solution comprising water;

(e) removing the solvent; and (f) adding a saponin.

The present invention also provides a method of manufacturing a liposomal concentrate of use in preparing a liposomal adjuvant comprising a glucopyranosyl lipid adjuvant using a microfluidic device, comprising the step of mixing in the device a first solution comprising a solvent, phosphatidyicholine lipid and a glucopyranosyl lipid adjuvant, and a second solution comprising water.

Also provided is a method of manufacturing a liposomal concentrate of use in preparing a liposomal adjuvant comprising a glucopyranosyl lipid adjuvant using a microfluidic device, comprising the following steps:

(c) mixing in the device a first solution comprising a solvent, phosphatidyicholine lipid and a glucopyranosyl lipid adjuvant, and a second solution comprising water; and (d) adding a saponin.

Further provided is a liposomal concentrate of use in preparing a liposomal adjuvant, said liposomal concentrate comprising water, a solvent, phosphatidylcholine lipid and a glucopyranosyl lipid adjuvant.

The present invention additionally provides a solution comprising a solvent and 100-170 mg/ml lipid and a glucopyranosyl lipid adjuvant, wherein the solvent comprises 70-90% v/v ethanol and 10-30% v/v isopropyl alcohol. Such solutions may be used in the manufacture of liposomes, such as a liposomal adjuvant.

Microfluidic Devices

A microfluidic device is a fluid handing apparatus wherein typically at least one aspect has a dimension on a sub-mm scale and typically mixing occurs through passive means (i.e. through contact of fluid streams and without moving parts within the mixing chamber). The microfluidic device will comprise a mixing chamber within which the first solution and second solution are mixed.

The mixing chamber will typically have a cross-sectional area which is 25.6 $mm^2$ or less, such as 12.8 $mm^2$ or less, suitably 6.4 $mm^2$ or less, especially 3.2 $mm^2$ or less and in particular 1.6 $mm^2$ or less. The mixing chamber will typically have a cross-sectional area which is 0.1 mm² or more, suitably 0.2 mm² or more, especially 0.3 mm² or more and in particular 0.4 mm² or more. In some embodiments the mixing chamber will have a cross-sectional area which is 0.2-3.2 mm², such as 0.4-1.6 mm², especially 0.6-1.2 mm² and in particular 0.7-1.0 mm² (e.g. 0.8 mm²).

The cross-section of the mixing chamber may be of any shape, though is typically symmetrical. The cross-section may be substantially rectangular (such as square). The cross-section may be elongate in nature, with the larger dimension being at least twice that of the perpendicular dimension, such as at least three times or at least four times. The larger dimension may be no more than ten times that of the perpendicular dimension, such as no more than eight times or no more than six times. The larger dimension will usually be two to ten times that of the perpendicular dimension, such as three to eight times, especially four to six times, in particular five times.

A rectangular cross-section may have a long side of 1-8 mm, such as 1-4 mm, for example 1.4-3.2 mm, especially 1.6-2.4 mm, in particular 1.8-2.2 mm (e.g. 2 mm). A rectangular cross-section may have a short side of 0.1 to 4 mm, for example, 0.1 to 2 mm, optionally 0.1-1.2 mm, such as 0.1-0.8 mm, especially 0.2-0.6 mm, in particular 0.3-0.5 mm (e.g. 0.4 mm).

The microfluidic device will have at least one inlet (such as one inlet) to the mixing chamber for delivery of the first solution. The device may have a plurality of inlets to the mixing chamber for delivery of the first solution, such as two inlets. Suitably the microfluidic device will have five or fewer inlets to the mixing chamber for delivery of the first solution, such as four or fewer.

The microfluidic device will have at least one inlet to the mixing chamber for delivery of the second solution. The device may have a plurality of inlets to the mixing chamber for delivery of the second solution, such as two inlets. Suitably the microfluidic device will have five or fewer inlets to the mixing chamber for delivery of the second solution, such as four or fewer.

To facilitate adequate mixing, the number of inlets for the first solution and second solution may be increased for mixing chambers with larger cross-sectional areas.

The cross-section of the inlets may be of any shape, though is typically symmetrical. The cross-section may be rectangular (such as square).

Each inlet will typically have a cross-sectional area which is 1.28 mm² or less, suitably 0.64 mm² or less, especially 0.32 mm² or less and in particular 0.16 mm² or less. Each inlet will typically have a cross-sectional area which is 0.01 mm² or more, suitably 0.02 mm² or more, especially 0.03 mm² or more and in particular 0.04 mm² or more. In some embodiments each inlet will have a cross-sectional area which is 0.02-0.32 mm², such as 0.04-0.16 mm², especially 0.06-0.12 mm² and in particular 0.07-0.10 mm² (e.g. 0.8 mm²).

The total cross-sectional area of all inlets will suitably be less than 70% of the cross-sectional area of the mixing chamber, such as less than 60% and especially less than 50%.

Conveniently, the inlets may span the full length of one side of the mixing chamber.

The shape and size of each inlet may be varied independently. However, typically inlets for the first solution will be identical in shape and size, and inlets for the second solution will be identical in shape and size. Conveniently, all inlets are identical in shape and size. Each inlet may be 2-20% of the width of the mixing chamber, e.g. 5-15% such as 8-12%, especially 10%. A particular inlet design is rectangular in shape, 0.2 mm wide and spanning the full length of the other side of the mixing chamber (e.g. 0.4 mm high)

The inlets will typically be located such that the direction of flow of the first solution and second solution into the mixing chamber is substantially parallel (e.g. within 15 degrees, such as within 10 degrees, in particular within 5 degrees), such as parallel, to the general direction of flow through the mixing chamber.

The microfluidic device will have at least one outlet from the mixing chamber for recovery of the mixed material. The device may have a plurality of outlets from the mixing chamber for recovery of the mixed material, such as two or three outlets, which are later combined. Suitably the device will have a single outlet from the mixing chamber for recovery of the mixed material.

The cross-section of the outlets may be of any shape, though is typically symmetrical. The cross-section may be rectangular (such as square), typically having an area of 0.2-1 mm², such as 0.3-0.6 mm², for example 0.4-0.5 mm². In other examples the outlet may be of circular cross-section (e.g. having a diameter of 0.5-1 mm, such as 0.6-0.8 mm, for example 0.75 mm).

The total cross-sectional area of all outlets will suitably be less than 70% of the cross-sectional area of the mixing chamber, such as less than 60% and especially less than 50%.

The mixing chamber should be of adequate length to allow for mixing to be substantially complete by the time liquid reaches the outlet(s). Typically, the chamber will be 1-10 cm in length, such as 1.5-5 cm, especially 1.8-4 cm, in particular 2-3 cm, for example 2.5 cm.

In one embodiment the device comprises a mixing chamber which is rectangular in cross-section, having a cross-sectional area of 0.2-3.2 mm² (e.g. 0.6-1.0 mm²), a long side of 1.4-3.2 mm (e.g. 1.6-2.4 mm), a short side of 0.1-1.2 mm (e.g. 0.32-0.48 mm), one inlet for the first solution and two inlets for the second solution which are symmetrically disposed at the proximal end of the mixing chamber, a mixing chamber length of 1.5-5 cm (e.g. 2-3 cm) and an outlet located at the distal end of the mixing chamber. Suitably the inlets are 0.16-0.24 mm wide and span the full length of the other side of the mixing chamber.

The microfluidic device may be formed from any suitable material, namely one which is tolerant of the components used in the first solution and second solution and which is amenable to manufacture. Suitable materials include silicon and glass. Stainless steel is another suitable material. Devices may be prepared from such materials by etching, e.g. silicon devices may be prepared by Deep Reactive Ion Etching (DRIE or plasma etching) and glass devices may be prepared by wet etching (HF etching). Chosen materials may be subjected to surface treatment to improve the characteristics of the surface.

To achieve a batch run duration which is a manageable time period (e.g. 240 minutes or less, especially 120 minutes or less) it is necessary for the system to achieve a sufficient level of productivity. Additionally, to aid batch to batch consistency by reducing the impact of startup and shutdown effects it is necessary for the run time to be of adequate length (e.g. at least 30 minutes, especially at least 60 minutes).

Microfluidic Device Scale-Up

In order to facilitate production of liposomal adjuvant on an industrial scale (e.g. a scale of at least 0.5 g of phosphatidylcholine lipid per minute, such as at least 1 g per minute, in particular at least 2 g per minute and especially at least 4 g per minute, such as a scale of at least 0.5 g of DOPC per minute, such as at least 1 g per minute, in particular at least 2 g per minute and especially at least 4 g per minute), large mixing chambers may be used or plurality of mixing chambers may be operated in parallel. For example, 2 or more mixing chambers, in particular 4 or more, especially 8 or more, such as 16 or more (e.g. 16). The plurality of mixing chambers operated in parallel may be 128 or fewer, such as 64 or fewer, in particular 32 or fewer. Consequently, in some embodiments the plurality of mixing chambers is 2-128, such as 4-64, for example 8-32.

In some circumstances each mixing chamber from the plurality of mixing chambers may be operated independently, with provision of the first solution and second solution to the mixing chamber by independent pumps (i.e. each pump not concurrently providing solution to any other mixing chamber). The first solution and/or second solution may be stored in independent containers (i.e. containers not concurrently providing first solution and/or second solution to more than one mixing chamber), or first solution and/or second solution may be stored in a container for use in more than one mixing chamber (such as all mixing chambers). Mixed material from each mixing chamber may be recovered individually and stored/processed, optionally being combined at a later stage, or may be combined (e.g. from all mixing chambers) before further processing and/or storage.

Conveniently all mixing chambers in the plurality of mixing chambers are supplied by the same pumps (i.e. one pump for the first solution and one pump for the second solution). More conveniently all mixing chambers in the plurality of mixing chambers are supplied by the same pumps and mixed material from all mixing chambers is collected before further processing and/or storage. Suitably the all mixing chambers and fluid flow within all mixing chambers are substantially the same, such that material obtained from each mixing chamber is substantially the same. Desirably the flow rates measured in each mixing chamber vary by less than 5% from the desired flow rate.

Optimally the mixing chambers, inlets and outlets, supply of first solution, second solution and collection of mixed material of multiple mixing chambers are configured such that in operation they perform substantially identically.

Each mixing chamber from the plurality of mixing chambers may be configured as an individual chip or for convenience a number of mixing chambers may be combined in a single chip (e.g. containing 2 to 20 mixing chambers, such as 4 to 16 mixing chambers, in particular 8 mixing chambers). A number of such chips can be used in parallel to provide the plurality of chambers (e.g. two chips each of which contains 8 mixing chambers to provide a total of 16 mixing chambers to be operated in parallel).

Suitably the plurality of mixing chambers is capable of producing mixed material at a total rate of 50-2000 ml/min, such as 100-1000 ml/min, in particular 200-500 ml/min.

First Solution

In some embodiments the first solution (the 'organic' phase) comprises solvent, phosphatidylcholine lipid and an aminoalkyl glucosaminide phosphate compound. Suitably the first solution comprises a solvent, DOPC and an aminoalkyl glucosaminide phosphate compound.

The first solution may comprise solvent, phosphatidylcholine lipid, an aminoalkyl glucosaminide phosphate compound and a sterol, such as solvent, DOPC, an aminoalkyl glucosaminide phosphate compound and cholesterol.

The solvent should solubilise the phosphatidylcholine lipid (such as DOPC), aminoalkyl glucosaminide phosphate compound and any other component present (e.g. sterol) to provide the first solution as a single phase. Furthermore, the solvent should be miscible with the aqueous solution, such that mixing of the first solution and second solution results in a single liquid phase which comprises a suspension of liposomes.

In other embodiments the first solution (the 'organic' phase) comprises solvent, phosphatidylcholine lipid and a glucopyranosyl lipid adjuvant. Suitably the first solution comprises a solvent, DOPC and a glucopyranosyl lipid adjuvant.

The first solution may comprise solvent, phosphatidyicholine lipid, a glucopyranosyl lipid adjuvant and a sterol, such as solvent, DOPC, a glucopyranosyl lipid adjuvant and cholesterol.

The solvent should solubilise the phosphatidyicholine lipid (such as DOPC), glucopyranosyl lipid adjuvant and any other component present (e.g. sterol) to provide the first solution as a single phase. Furthermore, the solvent should be miscible with the aqueous solution, such that mixing of the first solution and second solution results in a single liquid phase which comprises a suspension of liposomes.

The solvent will be an organic solvent or a single phase mixture comprising at least one organic solvent.

The solvent may comprise a short chain organic alcohol, such as ethanol and/or isopropanol.

Suitably, the solvent will comprise ethanol, such as at a concentration of between 70-90% v/v, more suitably between 75-85% v/v, or between 78-82% v/v.

Suitably, the solvent will comprise isopropanol, such as at a concentration of between 10-30% v/v, more suitably between 15-25% v/v, or between 18-22% v/v.

Suitably, the solvent will consist essentially of ethanol at a concentration of between 70-90% v/v and isopropanol at a concentration of between 10-30% v/v, such as ethanol at a concentration of between 75-85% v/v and isopropanol at a concentration of between 15-25% v/v, especially ethanol at a concentration of between 78-82% v/v and isopropanol at a concentration of between 18-22% v/v, in particular ethanol at a concentration of 80% v/v and isopropanol at a concentration of 20% v/v. At higher ethanol concentrations, such as above 90% v/v ethanol, the solubilising capacity of the solvent is limited (which ultimately constrains system capacity). At lower ethanol concentrations, such as below 70% v/v ethanol, the process may be more sensitive to operating parameters, such as temperature.

As mentioned, the first solution will comprise phosphatidylcholine lipid. The phosphatidylcholine lipid will contain unbranched acyl chains having 12-20 carbon atoms, optionally with one double bond, of particular interest are those with acyl chains having 14-18 carbon atoms, optionally with one double bond. Typically, each of the two acyl chains in a lipid molecule are identical. Particular phosphatidylcholine lipids of interest include: the saturated phosphatidylcholine lipids—dilauroyl phosphatidyicholine (DLPC), dimyristoyl phosphatidylcholine (DMPC), dipalmitoyl phosphatidylcholine (DPPC), distearoyl phosphatidylcholine (DSPC) and diarachidoyl phosphatidylcholine (DAPC); and unsaturated phosphatidylcholine lipids dipalmitoleoyl phosphatidylcholine and dioleoyl phosphatidylcholine (DOPC); and mixtures thereof. Suitably the phosphatidylcholine lipid is substantially purified from other lipids. Typically the phosphatidylcholine lipid is at least 80% pure, such as at least 90% pure, especially at least 95% pure, in particular 98% pure, for example at least 99% or even at least 99.8% pure.

The invention therefore provides a solution comprising a solvent, 100-170 mg/ml lipid and an aminoalkyl glucosaminide phosphate compound, wherein the solvent comprises 70-90% v/v ethanol and 10-30% v/v isopropyl alcohol. Suitably the lipid is phosphatidylcholine lipid, therefore suitably the solution provided is the first solution.

The invention also provides a solution comprising a solvent, 100-170 mg/ml lipid and a glucopyranosyl lipid adjuvant, wherein the solvent comprises 70-90% v/v ethanol and 10-30% v/v isopropyl alcohol. Suitably the lipid is phosphatidylcholine lipid, therefore suitably the solution provided is the first solution.

As mentioned, the first solution suitably comprises DOPC (dioleoyl phosphatidylcholine). Suitably the DOPC is substantially purified from other lipids, both of other acyl chain types and other headgroup types. Typically the DOPC is at least 90% pure, such as at least 95% pure, especially at least 98% pure, in particular 99% pure, for example at least 99.8% pure.

Suitably the first solution comprises 100-170 mg/ml DOPC, such as 100-160 mg/ml DOPC, especially 120-160 mg/ml, and an aminoalkyl glucosaminide phosphate compound. The first solution may comprise 120-150 mg/ml DOPC, such as 120-140 mg/ml DOPC. In particular, the first solution may comprise around 130 mg/ml DOPC (e.g. 125-135 mg/ml DOPC, especially 130 mg/ml DOPC).

Alternatively, the first solution comprises 100-170 mg/ml DOPC, such as 100-160 mg/ml DOPC, especially 120-160 mg/ml, and a glucopyranosyl lipid adjuvant. The first solution may comprise 120-150 mg/ml DOPC, such as 120-140 mg/ml DOPC. In particular, the first solution may comprise around 130 mg/ml DOPC (e.g. 125-135 mg/ml DOPC, especially 130 mg/ml DOPC).

The sterol, when present, will typically be cholesterol. Cholesterol is disclosed in the Merck Index, 13th Edn., page 381, as a naturally occurring sterol found in animal fat. Cholesterol has the formula ($C_{27}H_{46}O$) and is also known as (3β)-cholest-5-en-3-ol.

Suitably the first solution comprises 20-50 mg/ml sterol (e.g. cholesterol), such as 25-40 mg/ml, especially around 32.5 mg/ml (e.g. 30-35 mg/ml, in particular 32.5 mg/ml).

Suitably the dry weight of the first solution is 100-250 mg/ml, such as 140-220 mg/ml, especially 150-220 mg/ml.

The invention therefore provides a solution comprising a solvent, 100-170 mg/ml lipid and a aminoalkyl glucosaminide phosphate compound, wherein the solvent comprises 70-90% v/v ethanol and 10-30% v/v isopropyl alcohol. Suitably the lipid is phosphatidylcholine, such as DOPC, therefore suitably the solution provided is the first solution.

The invention also provides a solution comprising a solvent, 100-170 mg/ml lipid and a glucopyranosyl lipid adjuvant, wherein the solvent comprises 70-90% v/v ethanol and 10-30% v/v isopropyl alcohol. Suitably the lipid is phosphatidyicholine, such as DOPC, therefore suitably the solution provided is the first solution.

Lipids of use in the present invention will typically be membrane forming lipids. Membrane forming lipids comprise a diverse range of structures including phospholipids (for example phosphatidylcholine, phosphatidylethanolamine, phosphatidyiglycerol, phosphatidylinositol and phosphatidylserine), ceramides and sphingomyelins. Membrane forming lipids typically have a polar head group (which in a membrane aligns towards the aqueous phase) and one or more (e.g. two) hydrophobic tail groups (which in a membrane associate to form a hydrophobic core). The hydrophobic tail groups will typically be in the form of acyl esters, which may vary both in their length (for example from 8 to 26 carbon atoms) and their degree of unsaturation (for example one, two or three double bonds).

Lipids of use in the present invention may be of natural or synthetic origin, and may be a single pure component (e.g. 90% pure, especially 95% pure and suitably 99% pure on a weight basis), a single class of lipid components (for example a mixture of phosphatidylcholines, or alternatively, a mixture of lipids with a conserved acyl chain type) or may be a mixture of many different lipid types.

In one embodiment of the invention the lipid is a single pure component.

Pure lipids are generally of synthetic or semi-synthetic origin. Examples of pure lipids of use in the present invention include phosphatidyicholines (for example, DLPC, DMPC, DPPC, DSPC and DOPC; in particular DLPC, DMPC, DPPC and DOPC; especially DOPC) and phosphatidyl glycerols (for example DPPG), suitably phosphatidylcholines. The use of pure lipids is desirable due to their defined composition, however, they are generally more expensive.

In one embodiment of the invention the lipid is a mixture of components.

Mixtures of lipids of use in the present invention may be of natural origin, obtained by extraction and purification by means known to those skilled in the art. Lipid mixtures of natural origin are generally significantly cheaper than pure synthetic lipids. Naturally derived lipids include lipid extracts from egg or soy, which extracts will generally contain lipids with a mixture of acyl chain lengths, degrees of unsaturation and headgroup types. Lipid extracts of plant origin may typically be expected to demonstrate higher levels of unsaturation than those of animal origin. It should be noted that, due to variation in the source, the composition of lipid extracts may vary from batch to batch.

In one embodiment of the invention the lipid is a lipid extract containing at least 50%, especially at least 75% and suitably at least 90% by weight of phospholipids of a single headgroup type (e.g. phosphatidylcholines). In a second embodiment of the invention particular lipid extracts may be preferred due to their relatively cheap cost. In a third embodiment of the invention the lipid is a lipid mixture having a conserved acyl chain length (e.g. at least 50%, especially at least 75% and suitably at least 90% by weight), for example 12 (e.g. lauryl), 14 (e.g. myristyl), 16 (e.g. palmityl) or 18 (e.g. stearyl or oleoyl) carbons atoms in length.

Suitably, a lipid extract of use in the present invention will comprise at least 50% phospholipids by weight (for example, phosphatidylcholines and phosphatidylethanolamines), especially at least 55% phospholipids by weight, in particular at least 60% phospholipids by weight (such as 75% or 90%).

Lipid mixtures may also be prepared by the combination of pure lipids, or by the combination of one lipid extract with either other lipid extracts or with pure lipids.

The ratio of lipid (e.g. phosphatidyicholine, such as DOPC) to sterol is usually 3:1 to 5:1 w/w, such as 3.5:1 to 4.5:1 w/w.

In some embodiments the first solution consists essentially of a solvent, 100-160 mg/ml lipid and an aminoalkyl glucosaminide phosphate compound. In some embodiments the first solution consists essentially of a solvent, 100-160 mg/ml lipid, an aminoalkyl glucosaminide phosphate compound, 30-40 mg/ml sterol (e.g. cholesterol) wherein the solvent comprises 70-90% v/v ethanol and 10-30% v/v isopropyl alcohol. Desirably the lipid is phosphatidylcholine. Suitably the lipid is DOPC.

The first solution may contain 1-25 mg/ml of the aminoalkyl glucosaminide phosphate compound, such as 2-16 mg/ml, especially 3-12 mg/ml and in particular 4-10 mg/ml (e.g. around 6.5, such as 5.5-7.5 mg/ml, especially 6.5 mg/ml).

The present invention also provides a method for the preparation of a solution comprising a solvent, lipid, cholesterol and an aminoalkyl glucosaminide phosphate compound, said method comprising the steps:
(i) preparing a suspension of the aminoalkyl glucosaminide phosphate compound in at least a portion of the solvent;
(ii) combining the suspended aminoalkyl glucosaminide phosphate compound with the phosphatidylcholine lipid and cholesterol;
(iii) adding further solvent;
(iv) mixing.

The present invention also provides a method for the preparation of a solution comprising a solvent, DOPC, cholesterol and an aminoalkyl glucosaminide phosphate compound, said method comprising the steps:
(i) preparing a suspension of the aminoalkyl glucosaminide phosphate compound in at least a portion of the solvent;
(ii) combining the suspended aminoalkyl glucosaminide phosphate compound with the DOPC and cholesterol;
(iii) adding further solvent;
(iv) mixing.

Suitably the mixing is undertaken at a temperature of 30-50° C., especially 35-45, such as 40° C. Suitably the at least a portion of the solvent is at least 25% of the solvent, especially at least 35% and in particular at least 45%. Suitably the at least a portion is 90% of the solvent or less, such as 80% or less, especially 70% or less and in particular 60% or less. In some examples the at least a portion is 35-70% of the solvent, such as 45-60%.

Suitably the further solvent is any remaining solvent, although it may be a portion of the remaining solvent with additional solvent added later. Consequently, the present invention also provides a method for the preparation of a solution comprising a solvent, lipid, cholesterol and an aminoalkyl glucosaminide phosphate compound, said method comprising the steps:
(i) preparing a suspension of the aminoalkyl glucosaminide phosphate compound in at least a portion of the solvent;
(ii) combining the suspended aminoalkyl glucosaminide phosphate compound with the phosphatidylcholine lipid and cholesterol;
(iii) adding further solvent;
(iv) mixing;
(v) adding additional solvent.

Suitably the further solvent is any remaining solvent, although it may be a portion of the remaining solvent with additional solvent added later. Consequently, the present invention also provides a method for the preparation of a solution comprising a solvent, DOPC, cholesterol and an aminoalkyl glucosaminide phosphate compound, said method comprising the steps:
(i) preparing a suspension of the aminoalkyl glucosaminide phosphate compound in at least a portion of the solvent;
(ii) combining the suspended aminoalkyl glucosaminide phosphate compound with the DOPC and cholesterol;
(iii) adding further solvent;
(iv) mixing;
(v) adding additional solvent.

The additional solvent may be 0-30% of the solvent, such as 0-20%.

The solution arising from any of the above mentioned methods may subsequently be filtered to remove any particulate material prior to use in the microfluidics apparatus.

Other features of the method may be as described for the first solution, e.g. the solution comprises 100-160 mg/ml lipid and 30-40 mg/ml sterol (e.g. cholesterol) and wherein the solvent comprises 70-90% v/v ethanol and 10-30% v/v isopropyl alcohol. Desirably the lipid is phosphatidycholine. Suitably the lipid is DOPC. Suitably the solution comprises 1-30 mg/ml aminoalkyl glucosaminide phosphate compound, in particular CRX524, CRX527, CRX529, CRX547, CRX526, CRX601 and/or CRX602, especially CRX524, CRX529, CRX547 and/or CRX601.

Suitably the invention provides a solution consisting essentially of 100-160 mg/ml lipid and aminoalkyl glucosaminide phosphate compound (e.g. 1-30 mg/ml), and wherein the solvent comprises 70-90% v/v ethanol and 10-30% v/v isopropyl alcohol. Desirably the lipid is phosphatidylcholine, more suitably the lipid is DOPC. Suitably the solution comprises 5-25 mg/ml aminoalkyl glucosaminide phosphate compound, in particular CRX524, CRX527, CRX529, CRX547, CRX526, CRX601 and/or CRX602, especially CRX524, CRX529, CRX547 and/or CRX601.

Suitably the invention provides a solution consisting essentially of 100-160 mg/ml lipid, 30-40 mg/ml sterol (e.g. cholesterol) and aminoalkyl glucosaminide phosphate compound (e.g. 1-30 mg/ml), and wherein the solvent comprises 70-90% v/v ethanol and 10-30% v/v isopropyl alcohol. Desirably the lipid is phosphatidylcholine, more suitably the lipid is DOPC. Suitably the solution comprises 5-25 mg/ml aminoalkyl glucosaminide phosphate compound, in particular CRX524, CRX527, CRX529, CRX547, CRX526, CRX601 and/or CRX602, especially CRX524, CRX529, CRX547 and/or CRX601.

In other embodiments the first solution consists essentially of a solvent, 100-160 mg/ml lipid and a glucopyranosyl lipid adjuvant. In some embodiments the first solution consists essentially of a solvent, 100-160 mg/ml lipid, a glucopyranosyl lipid adjuvant, 30-40 mg/ml sterol (e.g. cholesterol) wherein the solvent comprises 70-90% v/v ethanol and 10-30% v/v isopropyl alcohol. Desirably the lipid is phosphatidylcholine. Suitably the lipid is DOPC.

The first solution may contain 1-25 mg/ml of the glucopyranosyl lipid adjuvant, such as 2-16 mg/ml, especially 3-12 mg/ml and in particular 4-10 mg/ml (e.g. around 6.5, such as 5.5-7.5 mg/ml, especially 6.5 mg/ml).

The present invention also provides a method for the preparation of a solution comprising a solvent, lipid, cholesterol and a glucopyranosyl lipid adjuvant, said method comprising the steps:
(i) preparing a suspension of the glucopyranosyl lipid adjuvant in at least a portion of the solvent;
(ii) combining the suspended glucopyranosyl lipid adjuvant with the phosphatidylcholine lipid and cholesterol;
(iii) adding further solvent;
(iv) mixing.

The present invention also provides a method for the preparation of a solution comprising a solvent, DOPC, cholesterol and a glucopyranosyl lipid adjuvant, said method comprising the steps:
(i) preparing a suspension of the glucopyranosyl lipid adjuvant in at least a portion of the solvent;
(ii) combining the suspended glucopyranosyl lipid adjuvant with the DOPC and cholesterol;
(iii) adding further solvent;
(iv) mixing.

Suitably the mixing is undertaken at a temperature of 30-50° C., especially 35-45, such as 40° C. Suitably the at least a portion of the solvent is at least 25% of the solvent, especially at least 35% and in particular at least 45%. Suitably the at least a portion is 90% of the solvent or less, such as 80% or less, especially 70% or less and in particular 60% or less. In some examples the at least a portion is 35-70% of the solvent, such as 45-60%.

Suitably the further solvent is any remaining solvent, although it may be a portion of the remaining solvent with additional solvent added later. Consequently, the present invention also provides a method for the preparation of a solution comprising a solvent, lipid, cholesterol and a glucopyranosyl lipid adjuvant, said method comprising the steps:
(i) preparing a suspension of the glucopyranosyl lipid adjuvant in at least a portion of the solvent;
(ii) combining the suspended glucopyranosyl lipid adjuvant with the phosphatidylcholine lipid and cholesterol;
(iii) adding further solvent;
(iv) mixing;
(v) adding additional solvent.

Suitably the further solvent is any remaining solvent, although it may be a portion of the remaining solvent with additional solvent added later. Consequently, the present invention also provides a method for the preparation of a solution comprising a solvent, DOPC, cholesterol and a glucopyranosyl lipid adjuvant, said method comprising the steps:
(i) preparing a suspension of the glucopyranosyl lipid adjuvant in at least a portion of the solvent;
(ii) combining the suspended glucopyranosyl lipid adjuvant with the DOPC and cholesterol;
(iii) adding further solvent;
(iv) mixing;
(v) adding additional solvent.

The additional solvent may be 0-30% of the solvent, such as 0-20%.

The solution arising from any of the above mentioned methods may subsequently be filtered to remove any particulate material prior to use in the microfluidics apparatus.

Other features of the method may be as described for the first solution, e.g. the solution comprises 100-160 mg/ml lipid and 30-40 mg/ml sterol (e.g. cholesterol) and wherein the solvent comprises 70-90% v/v ethanol and 10-30% v/v isopropyl alcohol. Desirably the lipid is phosphatidylcholine. Suitably the lipid is DOPC. Suitably the solution comprises 1-30 mg/ml a glucopyranosyl lipid adjuvant.

Suitably the invention provides a solution consisting essentially of 100-160 mg/ml lipid and glucopyranosyl lipid adjuvant (e.g. 1-30 mg/ml), and wherein the solvent comprises 70-90% v/v ethanol and 10-30% v/v isopropyl alcohol. Desirably the lipid is phosphatidycholine, more suitably the lipid is DOPC. Suitably the solution comprises 5-25 mg/ml glucopyranosyl lipid adjuvant.

Suitably the invention provides a solution consisting essentially of 100-160 mg/ml lipid, 30-40 mg/ml sterol (e.g. cholesterol) and glucopyranosyl lipid adjuvant (e.g. 1-30 mg/ml), and wherein the solvent comprises 70-90% v/v ethanol and 10-30% v/v isopropyl alcohol. Desirably the lipid is phosphatidylcholine, more suitably the lipid is DOPC. Suitably the solution comprises 5-25 mg/ml glucopyranosyl lipid adjuvant.

Second Solution

The second solution (the 'aqueous' phase) comprises water and in some methods may comprise a saponin.

The second solution acts as a counter solvent, causing the formation of liposomes on mixing with the first solution. The faster the precipitation of components from the first solution, typically the smaller the liposomes obtained.

The second solution will be substantially aqueous and will comprise at least 90% water v/v, such as at least 95% water, especially at least 98% water and in particular 100% water.

When present in the second solution, suitably the saponin is present at a concentration of 0.05-25 mg/ml, such as 0.2-10 mg/ml, especially 0.5-5 mg/ml and in particular 0.8-3 mg/ml (e.g. about 1.625 mg/ml, such as 1.2-2 mg/ml, especially 1.625 mg/ml).

When the saponin is not present in the second solution, suitably the second solution consists essentially of (such as consists of) water.

When the saponin is present in the second solution, suitably the second solution consists essentially of (such as consists of) water and saponin, for example the second solution may be saponin (such as QS-21) in water for injection.

The ionic strength of the second solution will suitably be 150 nM or lower, such as 100 nM or lower, in particular 80 nM or lower, especially 60 nM or lower, for example 40 nM or lower.

Conductivity may be a convenient surrogate for the ionic strength of an aqueous solution. The conductivity of the second solution will suitably be 12 mS/cm or lower, for example 10 mS/cm or lower, 8 mS/cm or lower, 6 mS/cm or lower, or 4 mS/cm or lower.

Suitably, the second solution consists essentially of aqueous saponin.

Microfluidic Operation

Optimal operating conditions will depend on the precise configuration of the device and the desired characteristics of the product.

Suitably, the total flow rate into the mixing chamber is 15-30 ml/min/mm$^2$ of mixing chamber cross-section, such as 16-28 ml/min/mm$^2$, especially 17.5-25 ml/min/mm$^2$ and in particular 19-21 (e.g. 20 ml/min/mm$^2$.

Suitably the ratio of flow rates for the first and second solutions will be in the range of 1:2 to 1:6, such as 1:3 to 1:5, especially 1:3.5 to 1:4.5 and in particular 1:4. High levels of solvent in mixed material may impact the stability of liposomes so ratio of flow rates which result in high solvent concentrations are desirably avoided—solvent concentrations of 50% result from a ratio of 1:1, 33% for 1:2, 25% for ratio 1:3, 20% for ratio 1:4 and 16.6% for ratio 1:5. Low flow rate of the first solution reduces system productivity. Ratios of flow rates which result in relatively large volumes of mixed material are less desirable due to the safety protocols associated with the handling and use of solvent containing compositions which exceed certain thresholds (e.g. 50 L).

Suitably, the flow rate of the first solution into the mixing chamber is in the range of 2-7.5 ml/min/mm$^2$ of mixing chamber cross-section, such as 2.5-7 ml/min/mm$^2$, especially 3-6.5 ml/min/mm$^2$ and in particular 3.5-6 (e.g. 5) ml/min/mm$^2$.

Suitably, the flow rate of the second solution into the mixing chamber is in the range of 11-25 ml/min/mm$^2$ of mixing chamber cross-section, such as 12-20 ml/min/mm$^2$, especially 14-18 ml/min/mm$^2$ and in particular 15-17 (e.g. 16) ml/min/mm$^2$.

The first solution and second solution will typically be provided at a temperature in the region of 10-30° C., such as 15-25° C., in particular 18-22° C. especially 20° C.), and may be at the same or different temperatures, suitably at the same temperature and especially at 20° C.

The mixing chamber may be maintained at a temperature in the region of 10-30° C., such as 15-25° C., in particular 18-22° C., especially 20° C. Dependent on the design of the device and environmental conditions it may only be necessary to actively control the temperature of the first solution and second solution, and not to actively control the mixing chamber temperature. The mixing of the first solution and second solution may be mildly exothermic. Lower operating temperatures result in the formation of smaller liposomes.

The microfluidic device may be operated within a controlled temperature environment, e.g. where the temperature is maintained in the range of 10-30° C., such as 15-25° C., in particular about 20° C. (such as 18-22° C., in particular 20° C.).

The operating pressure of the system need not be controlled.

Suitably, the maximum Reynolds number within the mixing chamber is 2100, in particular 1800, such as 1500, especially 1000, for example 500. The maximum Reynolds number within the mixing chamber is suitably within the range of 25 to 1500, more suitably between 50 to 500, in particular 75 to 300 and especially 100 to 200. Methods for calculating the Reynolds number are known to those skilled in the art and are illustrated in the examples herein.

Liposomes

Upon mixing of the first solution and second solution, liposomes will form.

The term 'liposome' is well known in the art and defines a general category of vesicles which comprise one or more lipid bilayers surrounding an aqueous space. Liposomes thus consist of one or more lipid and/or phospholipid bilayers and can contain other molecules, such as proteins or carbohydrates, in their structure. Because both lipid and aqueous phases are present, liposomes can encapsulate or entrap water-soluble material, lipid-soluble material, and/or amphiphilic compounds.

Liposome size may vary from 30 nm to several um depending on the phospholipid composition and the method used for their preparation.

The liposomes of the present invention may contain phosphatidylcholine lipid and aminoalkyl glucosaminide phosphate compound, or, consist essentially of phosphatidylcholine lipid and aminoalkyl glucosaminide phosphate compound (with saponin and/or sterol as applicable).

Suitably the liposomes of the present invention contain DOPC and aminoalkyl glucosaminide phosphate compound, or, consist essentially of DOPC and aminoalkyl glucosaminide phosphate compound (with saponin and/or sterol as applicable).

Alternatively, liposomes of the present invention contain phosphatidylcholine lipid and glucopyranosyl lipid adjuvant, or, consist essentially of phosphatidylcholine lipid and glucopyranosyl lipid adjuvant (with saponin and/or sterol as applicable).

Suitably the liposomes of the present invention contain DOPC and glucopyranosyl lipid adjuvant, or, consist essentially of DOPC and glucopyranosyl lipid adjuvant (with saponin and/or sterol as applicable).

In the present invention, the liposome size will be in the range of 50 nm to 200 nm, especially 60 nm to 180 nm, such as 70-165 nm. Optimally, the liposomes should be stable and have a diameter of ~100 nm to allow convenient sterilization by filtration.

Structural integrity of the liposomes may be assessed by methods such as dynamic light scattering (DLS) measuring the size (Z-average diameter, Zav) and polydispersity of the liposomes, or, by electron microscopy for analysis of the structure of the liposomes. Suitably the average particle size is between 95 and 120 nm, and/or, the polydispersity (PdI) index is not more than 0.35, in particular not more than 0.3, such as not more than 0.25. In one embodiment the average particle size is between 95 and 120 nm, and/or, the polydispersity (PdI) index is not more than 0.2.

In some circumstances the presence of solvents and certain additional components can impact the liposome size. Consequently, the liposome size is suitably measured after solvent removal and the incorporation of any additional components.

Removing the Solvent

The recovered mixed material will comprise liposomes in water and solvent. Such material is a liposomal concentrate of use in preparing a liposomal adjuvant, said liposomal concentrate may comprise water, a solvent, phosphatidylcholine lipid and aminoalkyl glucosaminide phosphate compound (with saponin and/or sterol as applicable), such as comprising water, a solvent, DOPC and aminoalkyl glucosaminide phosphate compound (with saponin and/or sterol as applicable). Liposomal concentrate may also comprise water, a solvent, phosphatidylcholine lipid and glucopyranosyl lipid adjuvant (with saponin and/or sterol as applicable), such as comprising water, a solvent, DOPC and glucopyranosyl lipid adjuvant (with saponin and/or sterol as applicable). The recovered material may be stored for later use or may be further processed to remove some or all of the solvent.

To facilitate use of the liposomes in an adjuvant it is desirable to remove substantially all organic solvent (e.g. leaving at least 98% water w/w, such as at least 99% water, especially at least 99.5% water, in particular at least 99.9% water such as at least 99.99%).

Suitably the residual organic solvent is at a level which equates to less than 150 ug per human dose, such as less than 100 ug per human dose, such as less than 50 ug per human dose and especially less than 20 ug per human dose (e.g. 10 ug or less per human dose). Desirably the residual organic solvent is at a level which is compliant with International Council For Harmonisation Of Technical Requirements For Pharmaceuticals For Human Use Guideline For Residual Solvents Q3C(R6).

Solvent removal may be performed by a range of methods, which may be used individually or in combination. Suitable methods include ultrafiltration and dialysis, especially diafiltration.

The removal of at least a portion of the solvent, such as substantially all of the solvent, can be performed by dialysis. Dialysis is the use of semi-permeable containment vessel that is selectively permeable such that solvent will pass through the semi-permeable portion of the vessel and liposomes (also saponin and aminoalkyl glucosaminide phosphate compound or glucopyranosyl lipid adjuvant associated therewith) will be retained when recovered material is introduced to the semi-permeable containment vessel. For example, the semi-permeable containment vessel used can include a single semi-permeable membrane and solvent removal can be achieved by immersing the semi-permeable containment vessel comprising the recovered material in an exchange medium and allowing the liquids separated by the membrane to reach equilibrium by diffusion. Dialysis may be undertaken in batch or continuous modes of operation. For example, dialysis can be repeated multiple times with batch replacement of the exchange medium to achieve a desired level of solvent removal. Dialysis can also be in a continuous process where the recovered material and/or exchange medium is continuously undergoing replacement. Exemplary dialysis membranes which may be of use in the present methods include 7 kDa membranes The removal of at least a portion of the solvent, such as substantially all of the solvent, can be performed by ultrafiltration. Ultrafiltration is the use of a containment vessel including a first compartment and a second compartment separated by a semi-permeable membrane. The recovered material can be placed into the first compartment of the containment vessel which can then be subjected to a positive pressure relative to the second compartment such that liquid is forced across the semi-permeable portion of the containment vessel. Diafiltration is a form of ultrafiltration wherein at least a portion of the remaining liquid can be replaced with an exchange medium by addition of the exchange medium to the first compartment of the vessel. Consequently, as the ultrafiltration progresses, the remaining liquid will tend towards the composition of the exchange medium. Diafiltration can be undertaken in a range of ways—continuous (also known as constant volume) wherein exchange medium is added at a comparable rate to liquid filtration over the membrane; discontinuous, wherein the volume of the remaining liquid varies and exchange medium is added in a discontinuous manner (e.g. by initial dilution and subsequent concentration to original volume or by initial concentration and subsequent dilution to original volume or the like). The optimal operating mode may depend on a number of factors including: 1) initial sample volume, concentration and viscosity 2) required final sample concentration 3) stability of sample at various concentrations 4) volume of buffer required for diafiltration 5) total processing time 6) reservoir size available 7) economics. Exemplary diafiltration membranes include Hydrosart 30 kD.

The exchange medium used during solvent removal need not correspond to the medium of the final liposomal adjuvant, for convenience the exchange medium is suitably the desired final liposomal adjuvant medium or a concentrate thereof e.g. phosphate buffered saline or another buffered composition as desired.

In certain methods, the saponin may be added to the recovered mixed material before removal of the solvent. In other methods the saponin may be added after removal of the solvent.

Saponins

A suitable saponin for use in the present invention is Quil A and its derivatives. Quil A is a saponin preparation isolated from the South American tree *Quillaja saponaria* Molina and was first described as having adjuvant activity by Dalsgaard et al. in 1974 ("Saponin adjuvants", Archiv. für die gesamte Virusforschung, Vol. 44, Springer Verlag, Berlin, p 243-254). Purified fractions of Quil A have been isolated by HPLC which retain adjuvant activity without the toxicity associated with Quil A (see, for example, EP0362278). Fractions of general interest include QS7, QS17, QS18 and QS-21, for example QS7 and QS-21 (also known as QA7 and QA21). QS-21 is a saponin of particular interest.

In certain embodiments of the present invention, the saponin is a derivative of *Quillaja saponaria* Molina quil A, suitably an immunologically active fraction of Quil A, such as QS7, QS17, QS18 or QS-21, in particular QS-21.

Typically the saponin, such as Quil A and in particular QS-21, is at least 90% pure, such as at least 95% pure, especially at least 98% pure, in particular 99% pure.

A beneficial feature of the present invention is that the saponin is presented in a less reactogenic composition where it is quenched with an exogenous sterol, such as cholesterol.

In methods where the saponin is added after mixing of the first and second solutions, the amount of saponin will typically be equivalent to the amounts which would be used if added earlier.

Aminoalkyl Glucosaminide Phosphate Compound

Aminoalkyl glucosaminide phosphate compounds (AGPs) are TLR4 modulators. TLR4 recognizes bacterial LPS (lipopolysaccharide) and when activated initiates an innate immune response. AGPs are a monosaccharide mimetic of the lipid A portion of bacterial LPS and have been developed with ether and ester linkages on the "acyl chains" of the compound. Processes for making these compounds are known and disclosed, for example, in WO 2006/016997, U.S. Pat. Nos. 7,288,640 and 6,113,918, and WO 01/90129, which are hereby incorporated by reference in their entireties for the purpose of defining AGPs of use in the present invention and their methods of manufacture. Other AGPs and related processes are disclosed in U.S. Pat. Nos. 7,129,219, 6,525,028 and 6,911,434, which are hereby incorporated by reference in their entireties for the purpose of defining AGPs of use in the present invention and their methods of manufacture. AGPs with ether linkages on the acyl chains employed in the composition of the invention are known and disclosed in WO 2006/016997 which is hereby incorporated by reference in its entirety for the purpose of defining AGPs of use in the present invention and their methods of manufacture. Of particular interest, are the aminoalkyl glucosaminide phosphate compounds set forth and described according to Formula (III) at paragraphs [0019] through [0021] in WO 2006/016997.

The term aminoalkyl glucosaminide phosphate compound therefore includes a compound of the formula:

Formula 1

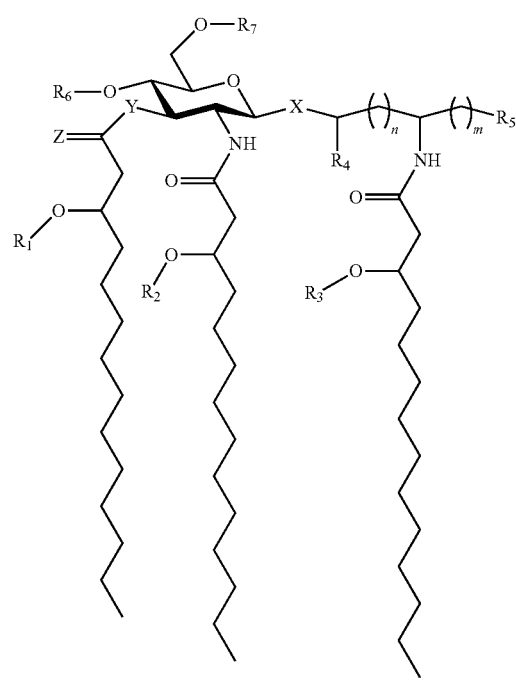

wherein m is 0 to 6;

n is 0 to 4;

X is O or S, in particular O;

Y is O or NH;

Z is O or H;

each $R_1$, $R_2$, $R_3$ is selected independently from the group consisting of a $C_{1-20}$ acyl and a $C_{1-20}$ alkyl;

$R_4$ is H or methyl;

$R_5$ is selected independently from the group consisting of —H, —OH, —($C_1$-$C_4$)alkoxy, —$PO_3R_8R_9$, —$OPO_3R_8R_9$, —$SO_3R_8$, —$OSO_3R_8$, —$NR_8R_9$, —$SR_8$, —CN, —$NO_2$, —CHO, —$CO_2R_8$, and —$CONR_8R_9$, wherein $R_8$ and $R_9$ are each independently selected from H and ($C_1$-$C_4$) alkyl; and each $R_6$ and $R_7$ is independently H or $PO_3H_2$.

The skilled person will appreciate that the AGP may be present in the form of a salt, particularly in the form of a pharmaceutically acceptable salt. Although non-pharmaceutically acceptable salts may be used during manufacture, they are desirably avoided.

The configuration of the 3' stereogenic centres to which the normal fatty acyl residues (that is, the secondary acyloxy or alkoxy residues, e.g., $R_1O$, $R_2O$, and $R_3O$) are attached is R or S, suitably R (as designated by Cahn-Ingold-Prelog priority rules). Configuration of aglycon stereogenic centres to which $R_4$ and $R_5$ are attached can be R or S. All stereoisomers, both enantiomers and diastereomers, and mixtures thereof, are encompassed by the formula.

The number of carbon atoms between heteroatom X and the aglycon nitrogen atom is determined by the variable "n", which can be an integer from 0 to 4 (i.e. 0, 1, 2, 3 or 4), suitably an integer from 0 to 2 (i.e. 0, 1 or 2).

The chain length of normal fatty acids $R_1$, $R_2$, and $R_3$ will suitably be 6 to 20 carbons, especially 6 to 16 carbons, in particular 9 to 14 carbons. The chain lengths can be the same or different.

Desirable embodiments include chain lengths where $R_1$, $R_2$ and Ra are independently selected from 6, 8, 10, 12 or 14.

In one embodiment $R_1$, $R_2$ and $R_3$ are the same. In a second embodiment all of $R_1$, $R_2$ and $R_3$ are different. In a third embodiment one of $R_1$, $R_2$ and $R_3$ is different from the other two.

The formula encompasses L/D-seryl, -threonyl, -cysteine ether and ester lipid AGPs, both agonists and antagonists and their homologs (n=1-4), as well as various carboxylic acid bioisosteres (i.e. $R_5$ is an acidic group capable of salt formation; the phosphate can be either on 4- or 6-position of the glucosamine unit, but suitably is in the 4-position).

In a particular embodiment of the AGP compound, n is 0, $R_5$ is $CO_2H$, $R_6$ is $PO_3H_2$, and $R_7$ is H. Such AGP compounds are therefore defined by the structure:

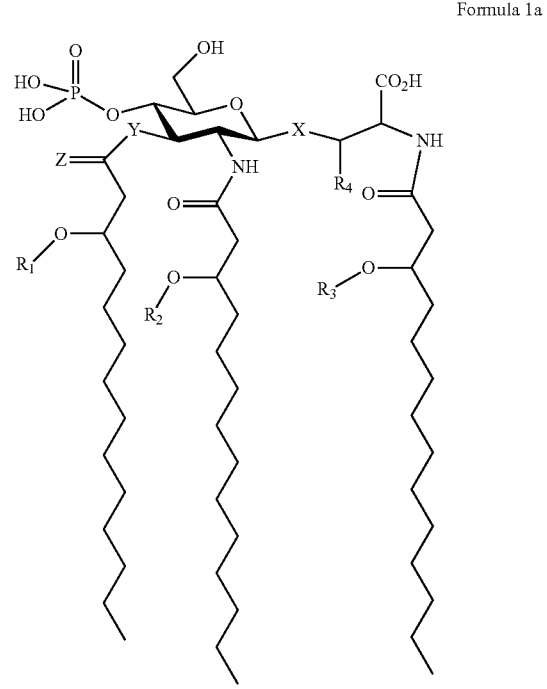

Formula 1a wherein X is O or S; Y is O or NH; Z is O or H; each $R_1$, $R_2$, $R_3$ is selected independently from the group consisting of a $C_{1-20}$ acyl and a $C_{1-20}$ alkyl; and $R_4$ is H or methyl.

In Formula 1a the configuration of the 3' stereogenic centres to which the normal fatty acyl residues (that is, the secondary acyloxy or alkoxy residues, e.g., $R_1O$, $R_2O$, and $R_3O$) are attached as R or S, preferably R (as designated by Cahn-Ingold-Prelog priority rules). Configuration of aglycon stereogenic centres to which $R_4$ and $CO_2H$ are attached can be R or S. All stereoisomers, both enantiomers and diastereomers, and mixtures thereof are encompassed by the formula.

Formula 1a encompasses L/D-seryl, -threonyl, -cysteine ether or ester lipid AGPs, both agonists and antagonists.

In both Formula 1 and Formula 1a, Z is O attached by a double bond or two hydrogen atoms which are each attached by a single bond. That is, the compound is ester-linked when Z=Y=O; amide-linked when Z=O and Y=NH; and ether-linked when Z=H/H and Y=O.

Particular compounds of Formula 1 are referred to as CRX601 and CRX527. Their structures are set forth as follows:
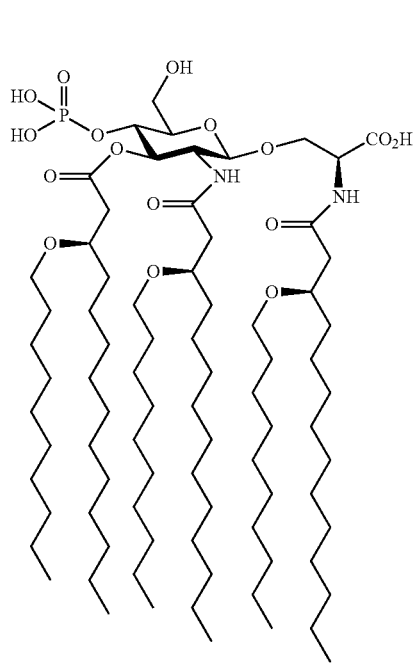
CRX601
Additionally, another embodiment employs CRX547 having the structure:
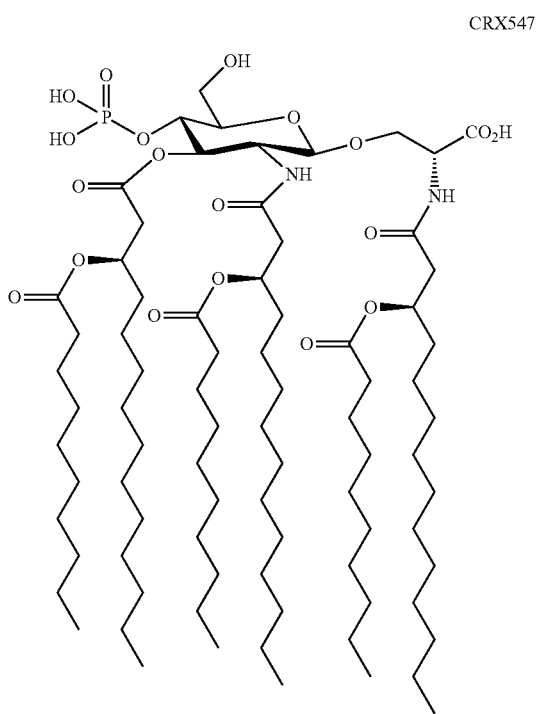
CRX547
Still other embodiments include AGPs such as CRX602 or CRX526.
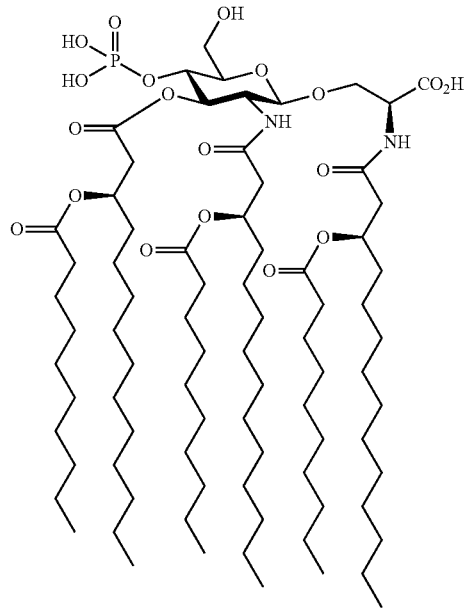
CRX527
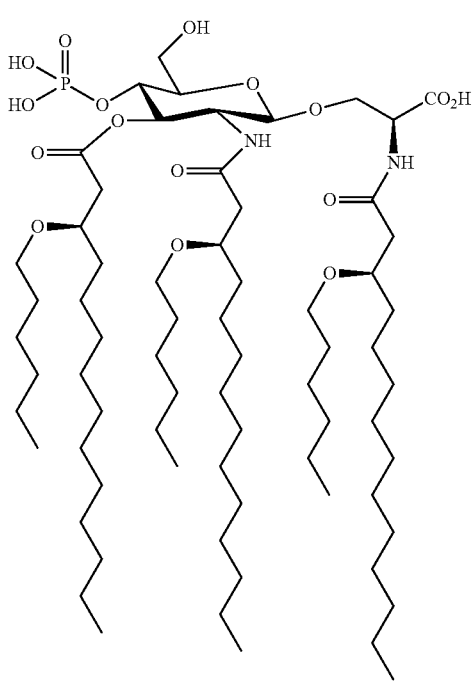
CRX602

CRX526

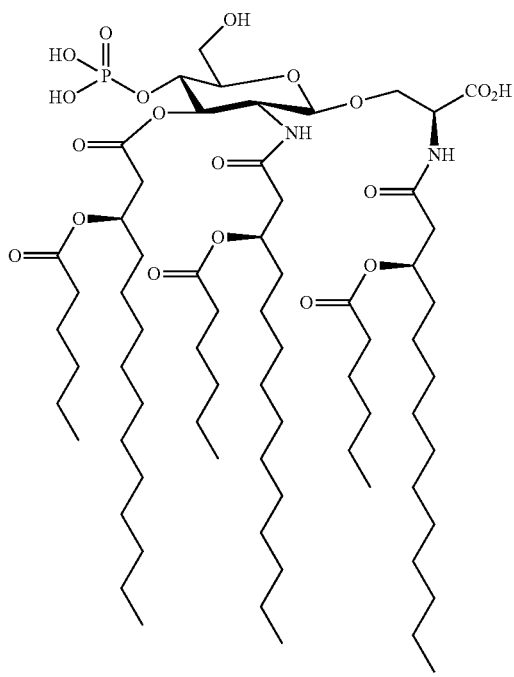

The AGP may also be CRX524 or CRX529:

CRX524

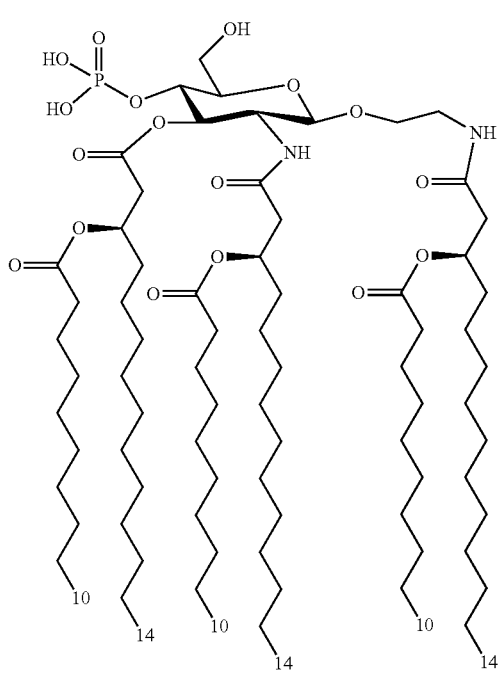

CRX529

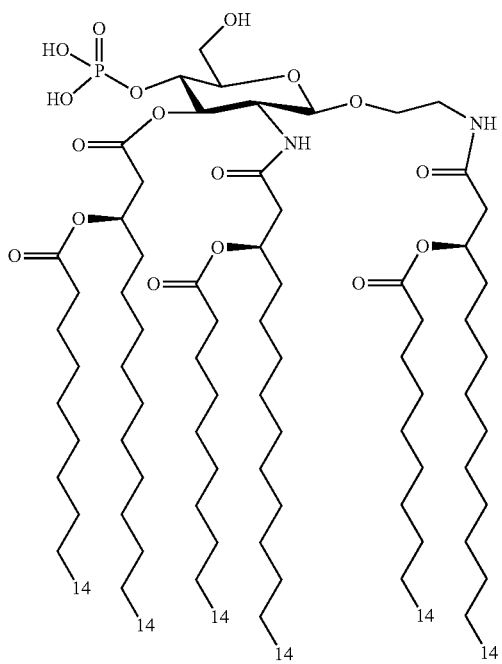

In one embodiment the invention makes use of a single AGP. In a second embodiment the invention makes use of a plurality of the AGPs (such as 2).

Suitably the AGP is a TLR4 agonist.

In one embodiment the AGP is in the form of a salt, such as pharmaceutically acceptable salt. In a second embodiment the AGP is not in the form of a salt.

Suitably the AGP or AGPs are selected from CRX524, CRX527, CRX529, CRX547, CRX526, CRX601 and CRX602, especially CRX524, CRX527, CRX529, CRX547 and CRX601, in particular the AGP is or the AGPs include CRX601.

In one embodiment of the invention, the solutions, mixtures and methods do not comprise or utilise a GLA, such as a compound of Formula 2 or a salt thereof. In one embodiment of the invention, the solutions, mixtures and methods do not comprise a compound of Formula 3 or a salt thereof.

Typically AGP, is at least 90% pure, such as at least 95% pure, especially at least 98% pure, in particular 99% pure.

Glucopyranosyl Lipid Adjuvant

Glucopyranosyl Lipid Adjuvant (GLA) are TLR4 modulators such as described in WO2008/153541 or WO2009/143457 or the literature articles Coler R N et al. (2011) Development and Characterization of Synthetic Glucopyranosyl Lipid Adjuvant System as a Vaccine Adjuvant. PLoS ONE 6(1): e16333. doi:10.1371/journal.pone.0016333 and Arias M A et al. (2012) Glucopyranosyl Lipid Adjuvant (GLA), a Synthetic TLR4 Agonist, Promotes Potent Systemic and Mucosal Responses to Intranasal Immunization with HIVgp140. PLoS ONE 7(7): e41144. doi:10.1371/journal.pone.0041144. GLAs of interest are also described in U.S. Pat. No. 9,241,988.

The term GLA therefore includes a compound of the formula:

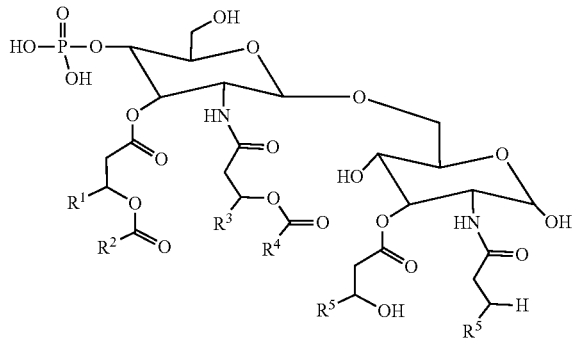

Formula 2 wherein:

$R^1$, $R^3$, $R^5$ and $R^6$ are each independently $C_{11-20}$alkyl; and
$R^2$ and $R^4$ are each independently $C_{12-20}$alkyl;

and salts, such as pharmaceutically acceptable salts, thereof.

Of particular interest are compounds of Formula 2 having the stereochemistry:

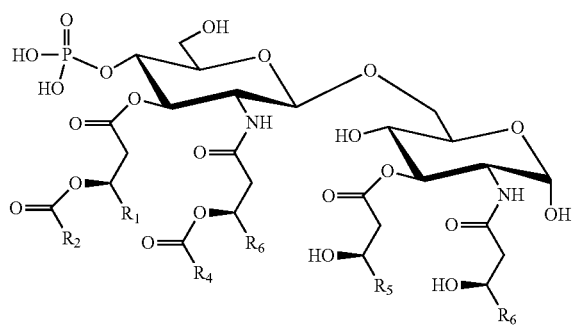

Formula 2b and salts, such as pharmaceutically acceptable salts, thereof.

Suitably, for compounds of Formula 2 and 2b, all of $R^1$ to $R^6$ are linear alkyl groups.

Suitably each of $R^1$, $R^3$, $R^5$ and $R^6$ is independently selected from $C_{11-15}$alkyl. Suitably each of $R^1$, $R^3$, $R^5$ and $R^6$ is identical. Desirably, each of $R^1$, $R^3$, $R^5$ and $R^6$ is $C_{11}$alkyl.

Suitably each of $R^2$ and $R^4$ is independently selected from $C_{12-16}$alkyl. Suitably each of $R^2$ and $R^4$ is identical. Desirably, each of $R^2$ and $R^4$ is $C_{13}$alkyl.

Of interest is:

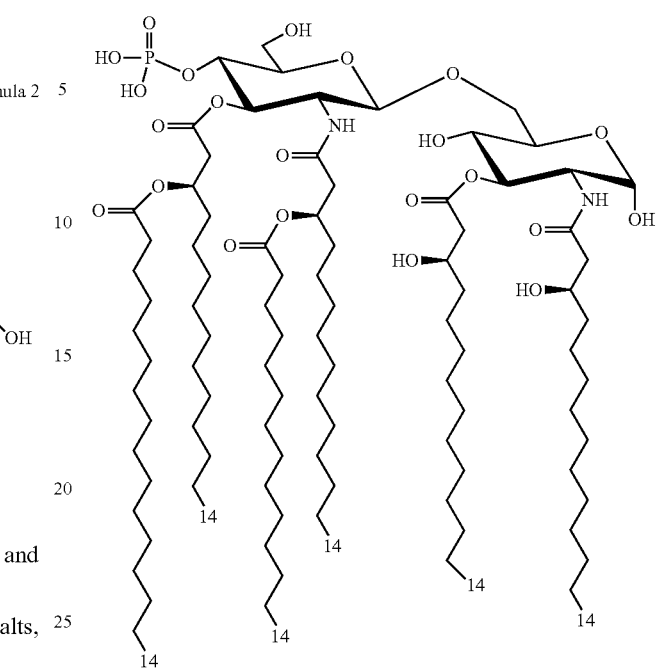

and salts, such as pharmaceutically acceptable salts, thereof.

In one embodiment the GLA is in the form of a salt, such as pharmaceutically acceptable salt. In a second embodiment the GLA is not in the form of a salt.

In one embodiment the invention makes use of a single GLA. In a second embodiment the invention makes use of a plurality of the GLAs (such as 2).

Suitably the GLA is a TLR4 agonist.

Suitably the GLA or GLAs include:

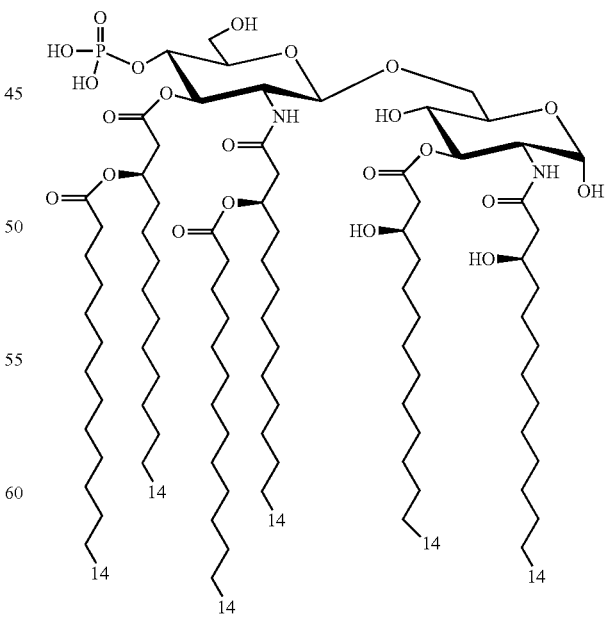

and salts, such as pharmaceutically acceptable salts, thereof.

The term GLA includes a compound of the formula:

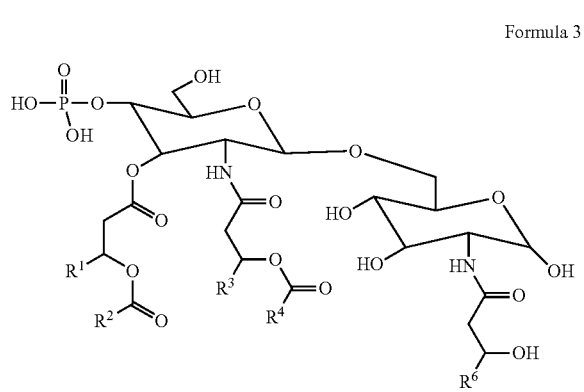

Formula 3 wherein:

$R^1$, $R^3$ and $R^6$ are each independently $C_{11-20}$alkyl; and $R^2$ and $R^4$ are each independently $C_{12-20}$alkyl;

and salts, such as pharmaceutically acceptable salts, thereof.

Of particular interest are compounds of Formula 3 having the stereochemistry:

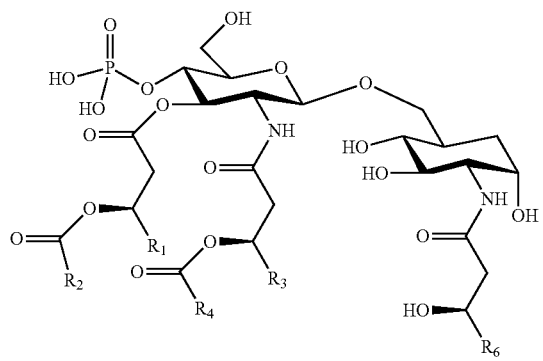

Formula 3b and salts, such as pharmaceutically acceptable salts, thereof.

Suitably, for compounds of Formula 3 and 3b, all of $R^1$ to $R^6$ are linear alkyl groups.

Suitably each of $R^1$, $R^3$ and $R^6$ is independently selected from $C_{11-15}$alkyl. Suitably each of $R^1$, $R^3$ and $R^6$ is identical. Desirably, each of $R^1$, $R^3$ and $R^6$ is $C_{11}$alkyl.

Suitably each of $R^2$ and $R^4$ is independently selected from $C_{12-16}$alkyl. Suitably each of $R^2$ and $R^4$ is identical. Desirably, each of $R^2$ and $R^4$ is $C_{13}$alkyl.

Alternatively, the GLA or GLAs include:

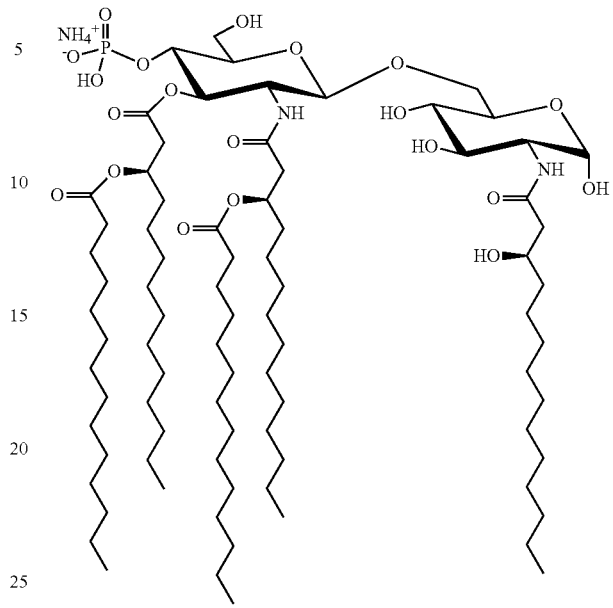

or the acid or other salt forms thereof, such as pharmaceutically acceptable salts.

In one embodiment of the invention, the solutions, mixtures and methods do not comprise or utilise an AGP, such as a compound of Formula 1 or salts thereof.

Typically GLA, is at least 90% pure, such as at least 95% pure, especially at least 98% pure, in particular 99% pure.

Liposome Containing Solutions

The liposome containing solution obtainable by (such as obtained by) mixing of the first solution and the second solution according to any of the methods described herein forms a further aspect of the invention.

Further Excipients

The liposomal adjuvant resulting from the claimed methods may be further modified. For example, it may be diluted to achieve a particular concentration of components as desired for later uses and/or additional components added. Such steps can be taken at a number of stages in the methods: prior to solvent removal, during solvent removal (e.g. by way of the exchange medium) or after solvent removal.

In a further embodiment, a buffer is added to the composition. The pH of a liquid preparation is adjusted in view of the components of the composition and necessary suitability for administration to the subject. Suitably, the pH of a liquid mixture is at least 4, at least 5, at least 5.5, at least 5.8, at least 6. The pH of the liquid mixture may be less than 9, less than 8, less than 7.5 or less than 7. In other embodiments, pH of the liquid mixture is between 4 and 9, between 5 and 8, such as between 5.5 and 8. Consequently, the pH will suitably be between 6-9, such as 6.5-8.5. In a particularly preferred embodiment the pH is between 5.8 and 6.4.

An appropriate buffer may be selected from acetate, citrate, histidine, maleate, phosphate, succinate, tartrate and TRIS. In one embodiment, the buffer is a phosphate buffer such as $Na/Na_2PO_4$, $Na/K_2PO_4$ or $K/K_2PO_4$.

The buffer can be present in the liquid mixture in an amount of at least 6 mM, at least 10 mM or at least 40 mM.

The buffer can be present in the liquid mixture in an amount of less than 100 mM, less than 60 mM or less than 40 mM.

It is well known that for parenteral administration solutions should have a pharmaceutically acceptable osmolality to avoid cell distortion or lysis. A pharmaceutically acceptable osmolality will generally mean that solutions will have an osmolality which is approximately isotonic or mildly hypertonic. Suitably the compositions of the present invention when reconstituted will have an osmolality in the range of 250 to 750 mOsm/kg, for example, the osmolality may be in the range of 250 to 550 mOsm/kg, such as in the range of 280 to 500 mOsm/kg. In a particularly preferred embodiment the osmolality may be in the range of 280 to 310 mOsm/kg.

Osmolality may be measured according to techniques known in the art, such as by the use of a commercially available osmometer, for example the Advanced™ Model 2020 available from Advanced Instruments Inc. (USA).

An "isotonicity agent" is a compound that is physiologically tolerated and imparts a suitable tonicity to a formulation to prevent the net flow of water across cell membranes that are in contact with the formulation. In some embodiments, the isotonicity agent used for the composition is a salt (or mixtures of salts), conveniently the salt is sodium chloride, suitably at a concentration of approximately 150 nM. In other embodiments, however, the composition comprises a non-ionic isotonicity agent and the concentration of sodium chloride in the composition is less than 100 mM, such as less than 80 mM, e.g. less than 50 mM, such as less 40 mM, less than 30 mM and especially less than 20 mM. The ionic strength in the composition may be less than 100 mM, such as less than 80 mM, e.g. less than 50 mM, such as less 40 mM or less than 30 mM.

In a particular embodiment, the non-ionic isotonicity agent is a polyol, such as sucrose and/or sorbitol. The concentration of sorbitol may e.g. between about 3% and about 15% (w/v), such as between about 4% and about 10% (w/v). Adjuvants comprising an immunologically active saponin fraction and a TLR4 agonist wherein the isotonicity agent is salt or a polyol have been described in WO2012/080369.

Suitably, a human dose volume of between 0.05 ml and 1 ml, such as between 0.1 and 0.5 ml, in particular a dose volume of about 0.5 ml, or 0.7 ml. The volumes of the compositions used may depend on the delivery route and location, with smaller doses being given by the intradermal route. A unit dose container may contain an overage to allow for proper manipulation of materials during administration of the unit dose.

The saponin, such as QS-21, can be used at amounts between 1 and 100 ug per human dose. QS-21 may be used at a level of about 50 ug. Examples of suitable ranges are 40-60 ug, suitably 45-55 ug or 49-51 ug, such as 50 ug. In a further embodiment, the human dose comprises QS-21 at a level of about 25 ug. Examples of lower ranges include 20-30 ug, suitably 22-28 ug or 24-26 ug, such as 25 ug. Human doses intended for children may be reduced compared to those intended for an adult (e.g. reduction by 50%).

The AGP can be used at amounts between 1 and 100 ug per human dose. Human doses intended for children may be reduced compared to those intended for an adult (e.g. reduction by 50%).

When both an AGP and a saponin are present in the adjuvant, then the weight ratio of AGP to saponin is suitably between 1:5 to 5:1, suitably 1:1.

The GLA can be used at amounts between 1 and 100 ug per human dose. Human doses intended for children may be reduced compared to those intended for an adult (e.g. reduction by 50%).

When both an GLA and a saponin are present in the adjuvant, then the weight ratio of GLA to saponin is suitably between 1:5 to 5:1, suitably 1:1.

The ratio of saponin:DOPC will typically be in the order of 1:50 to 1:10 (w/w), suitably between 1:25 to 1:15 (w/w), and preferably 1:22 to 1:18 (w/w), such as 1:20 (w/w).

Antigens

The liposomal adjuvants prepared according to the methods of the present invention may be utilised in conjunction with an immunogen or antigen. In some embodiments a polynucleotide encoding the immunogen or antigen is provided.

The liposomal adjuvant may be administered separately from an immunogen or antigen may be combined, either during manufacturing or extemporaneously, with an immunogen or antigen as an immunogenic composition for combined administration.

Consequently, there is provided a method for the preparation of an immunogenic composition comprising an immunogen or antigen, or a polynucleotide encoding the immunogen or antigen, said method comprising the steps of:
(i) preparing a liposomal adjuvant according to the methods described herein;
(ii) mixing the liposomal adjuvant with an immunogen or antigen, or a polynucleotide encoding the immunogen or antigen.

There is also provided the use of a liposomal adjuvant prepared according to the methods described herein in the manufacture of a medicament. Suitably the medicament comprises an immunogen or antigen, or a polynucleotide encoding the immunogen or antigen.

Further provided is a liposomal adjuvant prepared according to the methods described herein for use as a medicament. Suitably the medicament comprises an immunogen or antigen, or a polynucleotide encoding the immunogen or antigen.

By the term immunogen is meant a polypeptide which is capable of eliciting an immune response. Suitably the immunogen is an antigen which comprises at least one B or T cell epitope.

The elicited immune response may be an antigen specific B cell response, which produces neutralizing antibodies. The elicited immune response may be an antigen specific T cell response, which may be a systemic and/or a local response. The antigen specific T cell response may comprise a CD4+ T cell response, such as a response involving CD4+ T cells expressing a plurality of cytokines, e.g. IFNgamma, TNFalpha and/or IL2. Alternatively, or additionally, the antigen specific T cell response comprises a CD8+ T cell response, such as a response involving CD8+ T cells expressing a plurality of cytokines, e.g., IFNgamma, TNFalpha and/or IL2.

The antigen may be derived (such as obtained from) from a human or non-human pathogen including, e.g., bacteria, fungi, parasitic microorganisms or multicellular parasites which infect human and non-human vertebrates, or from a cancer cell or tumor cell.

In one embodiment the antigen is a recombinant protein, such as a recombinant prokaryotic protein.

In one embodiment, the antigen is derived from Varicella Zoster Virus (VZV), Moraxella spp. (such as Moraxella catarrhalis) or nontypable Haemophilus influenzae (ntHi).

A further antigen that may be employed in accordance with the present invention is derived from Varicella zoster virus (VZV). The VZV antigen for use in the invention may be any suitable VZV antigen or immunogenic derivative thereof, suitably being a purified VZV antigen.

In one embodiment, the VZV antigen is the VZV glycoprotein gE (also known as gp1) or immunogenic derivative hereof. The wild type or full length gE protein consists of 623 amino acids comprising a signal peptide, the main part of the protein, a hydrophobic anchor region (residues 546-558) and a C-terminal tall. In one aspect, a gE C-terminal truncate (also referred to truncated gE or gE truncate) is used whereby the truncation removes 4 to 20 percent of the total amino acid residues at the carboxy terminal end. In a further aspect, the truncated gE lacks the carboxy terminal anchor region (suitably approximately amino acids 547-623 of the wild type sequence). In a further aspect gE is a truncated gE having the sequence of SEQ ID NO. 1.

The gE antigen, anchorless derivatives thereof (which are also immunogenic derivatives) and production thereof is described in EP0405867 and references therein [see also Vafai A., Antibody binding sites on truncated forms of varicalla-zoster virus gpI(gE) glycoprotein, Vaccine 1994 12:1265-9). EP192902 also describes gE and production thereof. Truncated gE is also described by Haumont et al. Virus Research (1996) vol 40, p 199-204, herein incorporated fully by reference. An adjuvanted VZV gE composition suitable for use in accordance of the present invention is described in WO2006/094756, i.e. a carboxyterminal truncated VZV gE in combination with adjuvant comprising QS-21, 3D-MPL and liposomes further containing cholesterol. Leroux-Roels 1. et al. (J. Infect. Dis. 2012, 206: 1280-1290) reported on a phase I/II clinical trial evaluating the adjuvanted VZV truncated gE subunit vaccine.

The composition may comprise non-typeable Haemophilus influenzae antigen(s) for example selected from: Fimbrin protein [(U.S. Pat. No. 5,766,608—Ohio State Research Foundation)] and fusions comprising peptides therefrom [e.g. LB1(f) peptide fusions; U.S. Pat. No. 5,843,464 (OSU) or WO 99/64067]; OMP26 [WO 97/01638 (Cortecs)]; P6 [EP 281673 (State University of New York)]; TbpA and/or TbpB; Hia; Hsf; Hin47; Hif; Hmw1; Hmw2; Hmw3; Hmw4; Hap; D15 (WO 94/12641); protein D (EP 594610); P2; and P5 (WO 94/26304); protein E (WO07/084053) and/or PilA (WO05/063802). The composition may comprise Moraxella catarrhalis protein antigen(s), for example selected from: OMP106 [WO 97/41731 (Antex) & WO 96/34960 (PMC)]; OMP21; LbpA W/or LbpB [WO 98/55606 (PMC)]; TbpA &/or TbpB [WO 97/13785 & WO 97/32980 (PMC)]; CopB [Helminen M E, et al. (1993) Infect. Immun. 61:2003-2010]; UspA1 and/or UspA2 [WO 93/03761 (University of Texas)]; OmpCD; HasR (PCT/EP99/03824); PilQ (PCT/EP99/03823); OMP85 (PCT/EP00/01468); lipo06 (GB 9917977.2); lipo10 (GB 9918208.1); lipo11 (GB 9918302.2); lipo18 (GB 9918038.2); P6 (PCT/EP99/03038); D15 (PCT/EP99/03822); OmplA1 (PCT/EP99/06781); Hly3 (PCT/EP99/03257); and OmpE.

In an embodiment, the composition may comprise non-typeable H. influenzae (NTHi) protein antigen(s) and/or M. catarrhalis protein antigen(s). The composition may comprise Protein D (PD) from H. influenzae. Protein D may be as described in WO91/18926. The composition may further comprise Protein E (PE) and/or Pilin A (PilA) from H. influenzae. Protein E and Pilin A may be as described in WO2012/139225. Protein E and Pilin A may be presented as a fusion protein; for example LVL735 as described in WO2012/139225. For example, the composition may comprise three NTHi antigens (PD, PE and PilA, with the two last ones combined as a PEPilA fusion protein). The composition may further comprise UspA2 from M. catarrhalis. UspA2 may be as described in WO2015125118, for example MC-009 ((M)(UspA2 31-564)(HH)) described in WO2015125118. For example, the composition may comprise three NTHi antigens (PD, PE and PilA, with the two last ones combined as a PEPilA fusion protein) and one M. catarrhalis antigen (UspA2).

A plurality of antigens may be provided. For example, a plurality of antigens may be provided to strengthen the elicited immune response (e.g. to ensure strong protection), a plurality of antigens may be provided to broaden the immune response (e.g. to ensure protection against a range of pathogen strains or in a large proportion of a subject population) or a plurality of antigens may be provided to currently elicit immune responses in respect of a number of disorders (thereby simplifying administration protocols). Where a plurality of antigens are provided, these may be as distinct proteins or may be in the form of one or more fusion proteins.

Antigen may be provided in an amount of 0.1 to 100 ug per human dose.

The present invention may be applied for use in the treatment or prophylaxis of a disease or disorder associated with one or more antigens described above. In one embodiment the disease or disorder is selected from COPD, acute exacerbations of COPD (AECOPD) and herpes.

The liposomal adjuvant may be administered separately from an immunogen or antigen, or may be combined, either during manufacturing or extemporaneously), with an immunogen or antigen as an immunogenic composition for combined administration.

Sterilisation

For parenteral administration in particular, compositions should be sterile. Sterilisation can be performed by various methods although is conveniently undertaken by filtration through a sterile grade filter. Sterilisation may be performed a number of times during preparation of an adjuvant or immunogenic composition, but is typically performed at least at the end of manufacture.

By "sterile grade filter" it is meant a filter that produces a sterile effluent after being challenged by microorganisms at a challenge level of greater than or equal to $1\times10^7/cm^2$ of effective filtration area. Sterile grade filters are well known to the person skilled in the art of the invention for the purpose of the present invention, sterile grade filters have a pore size between 0.15 and 0.25 um, suitably 0.18-0.22 um, such as 0.2 or 0.22 um.

The membranes of the sterile grade filter can be made from any suitable material known to the skilled person, for example, but not limited to cellulose acetate, polyethersulfone (PES), polyvinylidene fluoride (PVDF), polytetrafluoroethylene (PTFE). In a particular embodiment of the invention one or more or all of the filter membranes of the present invention comprise polyethersulfone (PES), in particular hydrophilic polyethersulfone. In a particular embodiment of the invention, the filters used in the processes described herein are a double layer filter, in particular a sterile filter with build-in prefilter having larger pore size than the pore size of the end filter. In one embodiment the sterilizing filter is a double layer filter wherein the pre-filter membrane layer has a pore size between 0.3 and 0.5 nm, such as 0.35 or 0.45 nm. According to further embodiments, filters comprise asymmetric filter membrane(s), such as asymmetric hydrophilic PES filter membrane(s). Alternatively, the sterilizing filter layer may be made of PVDF, e.g. in combination with an asymmetric hydrophilic PES pre-filter membrane layer.

In light of the intended medical uses, materials should be of pharmaceutical grade (such as parenteral grade).

By the term 'substantially' in respect of an integer is meant functionally comparable, such that deviation may be tolerated if the essential nature of the integer is not changed. For example, in respect of specific values, the term 'substantially' will typically mean a value within plus or minus 10 percent of the stated value.

The following clauses serve to further illustrate the invention:

Clause 1. A method of manufacturing a liposomal adjuvant comprising an aminoalkyl glucosaminide phosphate compound (AGP) or a glucopyranosyl lipid adjuvant (GLA) using a microfluidic device, said method comprising the following steps:
  (a) mixing in the device a first solution comprising a solvent, an AGP or GLA and a phosphatidylcholine lipid, and a second solution comprising water; and
  (b) removing the solvent.

Clause 2. The method according to clause 1 comprising the following steps:
  (a) mixing in the device a first solution comprising a solvent, an AGP or GLA and a phosphatidylcholine lipid, and a second solution comprising water;
  (b) adding a saponin; and removing the solvent.

Clause 3. The method according to clause 1 comprising the following steps:
  (a) mixing in the device a first solution comprising a solvent, an AGP or GLA and a phosphatidylcholine lipid, and a second solution comprising water;
  (b) removing the solvent; and
  (c) adding a saponin.

Clause 4. A method of manufacturing a liposomal concentrate of use in the preparation of a liposomal adjuvant comprising an AGP or GLA using a microfluidic device, comprising the step of mixing in the device a first solution comprising a solvent, an AGP or GLA and a phosphatidylcholine lipid, and a second solution comprising water.

Clause 5. The method according to clause 1 or 4 wherein the second solution additionally comprises a saponin.

Clause 6. The method according to any one of clauses 1 to 5 wherein the phosphatidylcholine lipid is DOPC.

Clause 7. The method according to any one of clauses 1 to 6, wherein the first solution additionally comprises a sterol.

Clause 8. The method of any one of clauses 1 to 7, wherein the microfluidic device has one inlet for the first solution to the mixing chamber.

Clause 9. The method of any one of clauses 1 to 7, wherein the microfluidic device has two inlets for the first solution to the mixing chamber.

Clause 10. The method of any one of clauses 1 to 7, wherein the microfluidic device has three or more inlets for the first solution to the mixing chamber.

Clause 11. The method of any one of clauses 1 to 10, wherein the microfluidic device has one inlet for the second solution to the mixing chamber.

Clause 12. The method of any one of clauses 1 to 10, wherein the microfluidic device has two inlets for the second solution to the mixing chamber.

Clause 13. The method of any one of clauses 1 to 10, wherein the microfluidic device has three or more inlets for the second solution to the mixing chamber.

Clause 14. The method of any one of clauses 1 to 13, wherein each inlet is 0.2 mm wide and spans the full length of the other side of the mixing chamber.

Clause 15. The method of any one of clauses 1 to 14, wherein the cross-sectional area of the mixing chamber is 25.6 $mm^2$ or less.

Clause 16. The method of any one of clauses 1 to 15, wherein the cross-sectional area of the mixing chamber is 0.1 $mm^2$ or more.

Clause 17. The method of any one of clauses 1 to 16, wherein the cross-sectional area of the mixing chamber is 0.2-3.2 $mm^2$.

Clause 18. The method of clause 17, wherein the cross-sectional area of the mixing chamber is 0.6-1.2 $mm^2$, such as around 0.8 $mm^2$.

Clause 19. The method of any one of clauses 1 to 18, wherein the mixing chamber is substantially rectangular in cross-section.

Clause 20. The method of clause 19, wherein the cross-section of the mixing chamber has a long side of 1-8 mm.

Clause 21. The method of clause 20, wherein the cross-section of the mixing chamber has a long side of 1.6-2.4 mm.

Clause 22. The method of clause 21, wherein the cross-section of the mixing chamber has a long side of 2 mm.

Clause 23. The method of any one of clauses 1 to 22, wherein the cross-section of the mixing chamber has a short side of 0.1-4 mm.

Clause 24. The method of clause 23, wherein the cross-section of the mixing chamber has a short side of 0.2-0.6 mm.

Clause 25. The method of clause 24, wherein the cross-section of the mixing chamber has a short side of 0.4 mm.

Clause 26. The method of any one of clauses 1 to 25, wherein the mixing chamber is 1-10 cm in length.

Clause 27. The method of clause 26, wherein the mixing chamber is 2-3 cm in length.

Clause 28. The method of clause 27, wherein the mixing chamber is 2.5 cm in length.

Clause 29. The method of any one of clauses 1 to 28, wherein the microfluidic device has one outlet from the mixing chamber for recovery of the mixed material.

Clause 30. The method of any one of clauses 1 to 29, wherein the microfluidic device has two or more outlets from the mixing chamber for recovery of the mixed material.

Clause 31. The method of any one of clauses 1 to 30, wherein the microfluidic device comprises a mixing chamber which is rectangular in cross-section, having a cross-sectional area of 0.2-3.2 mm$^2$, a long side of 1.4-3.2 mm, a short side of 0.1-1.2 mm, one inlet for the first solution and two inlets for the second solution which are symmetrically disposed at the proximal end of the mixing chamber, a mixing chamber length of 1.5-5 cm and an outlet located at the distal end of the mixing chamber.

Clause 32. The method of any one of clauses 1 to 31, wherein the total flow rate into the mixing chamber is 12-30 ml/min/mm$^2$ of mixing chamber cross-section.

Clause 33. The method of clause 32, wherein the total flow rate into the mixing chamber is 17.5-25 ml/min/mm$^2$ of mixing chamber cross-section.

Clause 34. The method of clause 33, wherein the total flow rate into the mixing chamber is 20 ml/min/mm$^2$ of mixing chamber cross-section.

Clause 35. The method of any one of clauses 1 to 34, wherein the ratio of flow rates for the first and second solutions is in the range 1:2 to 1:6.

Clause 36. The method of clause 35, wherein the ratio of flow rates for the first and second solutions is in the range 1:3 to 1:5.

Clause 37. The method of clause 36, wherein the ratio of flow rates for the first and second solutions is 1:4.

Clause 38. The method of any one of clauses 1 to 37, wherein the flow rate of the first solution into the mixing chamber is 2-7.5 ml/min/mm$^2$ of mixing chamber cross-section.

Clause 39. The method of clause 38, wherein the flow rate of the first solution into the mixing chamber is 3-6.5 ml/min/mm$^2$ of mixing chamber cross-section.

Clause 40. The method of clause 39, wherein the flow rate of the first solution into the mixing chamber is 5 ml/min/mm$^2$ of mixing chamber cross-section.

Clause 41. The method of any one of clauses 1 to 40, wherein the flow rate of the second solution into the mixing chamber is 11-25 ml/min/mm$^2$ of mixing chamber cross-section.

Clause 42. The method of clause 41, wherein the flow rate of the second solution into the mixing chamber is 14-20 ml/min/mm$^2$ of mixing chamber cross-section.

Clause 43. The method of any one of clauses 1 to 42, wherein the first solution is provided at a temperature of 10-30° C.

Clause 44. The method of clause 43, wherein the temperature of the first solution is provided at a temperature of 15-25° C.

Clause 45. The method of any one of clauses 1 to 44, wherein the temperature of the second solution is provided at a temperature of 10-30° C.

Clause 46. The method of clause 45, wherein the temperature of the second solution is provided at a temperature of 15-25° C.

Clause 47. The method of any one of clauses 1 to 46, wherein the temperature of the mixing chamber is 10-30° C.

Clause 48. The method of clause 47, wherein the temperature of the mixing chamber is 15-25° C.

Clause 49. The method of any one of clauses 1 to 48, wherein the maximum Reynolds number within the mixing chamber is 1500 or lower.

Clause 50. The method of clause 49, wherein the maximum Reynolds number within the mixing chamber is 75-300, such as 100-200.

Clause 51. The method of any one of clauses 1 to 50, wherein the microfluidic device comprises a plurality of mixing chambers.

Clause 52. The method of clause 51, wherein the device comprises 2-128 mixing chambers.

Clause 53. The method of clause 52, wherein the device comprises 4-32 mixing chambers.

Clause 54. The method of clause 53, wherein the device comprises 16 mixing chambers.

Clause 55. The method of any one of clauses 51 to 54, wherein all mixing chambers in the plurality of mixing chambers are supplied by the same pumps, and in particular mixed material from all mixing chambers is collected before further processing and/or storage.

Clause 56. The method of any one of clauses 51 to 55, wherein the plurality of mixing chambers is capable of producing mixed material at a rate of 50-2000 ml/min.

Clause 57. The method of any one of clauses 51 to 56, wherein the plurality of mixing chambers is capable of producing mixed material at a rate of at least 1 g of phosphatidycholine lipid per minute.

Clause 58. The method of any one of clauses 51 to 57, wherein the plurality of mixing chambers is capable of producing mixed material at a rate of at least 1 g of DOPC per minute.

Clause 59. The method of any one of clauses 1 to 58, wherein the solvent comprises an organic alcohol.

Clause 60. The method of clause 59, wherein the solvent comprises ethanol.

Clause 61. The method of clause 60, wherein the solvent comprises 70-90% v/v ethanol.

Clause 62. The method of clause 61, wherein the solvent comprises 75-85% v/v ethanol.

Clause 63. The method of clause 62 wherein the solvent comprises 80% v/v ethanol.

Clause 64. The method according to any one of clauses 59 to 63, wherein the solvent comprises isopropanol.

Clause 65. The method of clause 64, wherein the solvent comprises 10-30% v/v isopropanol.

Clause 66. The method of clause 65, wherein the solvent comprises 15-25% v/v isopropanol.

Clause 67. The method of clause 66, wherein the solvent comprises 20% v/v isopropanol.

Clause 68. The method of any one of clauses 1 to 67, wherein the first solution comprises 100-170 mg/ml phosphatidycholine lipid.

Clause 69. The method of clause 68, wherein the first solution comprises 100-160 mg/ml phosphatidylcholine lipid.

Clause 70. The method of clause 69, wherein the first solution comprises 130 mg/ml phosphatidylcholine lipid.

Clause 71. The method of any one of clauses 1 to 70, wherein the first solution comprises 100-170 mg/ml DOPC.

Clause 72. The method of clause 71, wherein the first solution comprises 100-160 mg/ml DOPC.

Clause 73. The method of clause 72, wherein the first solution comprises 130 mg/ml DOPC.

Clause 74. The method of any one of clauses 1 to 73, wherein the first solution comprises 20-50 mg/ml sterol.

Clause 75. The method of any one of clauses 1 to 74, wherein the first solution comprises 30-35 mg/ml sterol.

Clause 76. The method of any one of clauses 1 to 75, wherein the sterol is cholesterol.

Clause 77. The method of any one of clauses 1 to 76, wherein the dry weight of the first solution is 120 to 250 mg/ml.

Clause 78. The method of any one of clauses 1 to 77, wherein the second solution comprises at least 90% w/w water.

Clause 79. The method of clause 78, wherein the second solution comprises at least 98% w/w water.

Clause 80. The method of any one of clauses 1 to 80, wherein the saponin is Quil A or a derivative thereof.

Clause 81. The method of clause 80, wherein the saponin is QS-21.

Clause 82. The method of any one of clauses 1 to 81, wherein the second solution comprises 0.15-15 mg/ml saponin.

Clause 83. The method of clause 82, wherein the second solution comprises 1-4 mg/ml saponin.

Clause 84. The method of any one of clauses 8 to 83, wherein the first solution comprises 4-10 mg/ml of an AGP.

Clause 85. The method of any one of clauses 1 to 84, wherein the average liposome size is 95-120 nm.

Clause 86. The method of any one of clauses 1 to 85, wherein the liposome polydispersity is 0.3 or lower.

Clause 87. The method of clause 86, wherein the liposome polydispersity is 0.2 or lower.

Clause 88. The method of any one of clauses 1 to 87, wherein the solvent is removed by diafiltration, ultrafiltration and/or dialysis, in particular diafiltration.

Clause 89. The method of any one of clauses 1 to 88, wherein solvent removal results in a water content of at least 98% water w/w.

Clause 90. The method of any one of clauses 1 to 89, comprising the additional step of diluting, such as to a desired final concentration.

Clause 91. The method of any one of clauses 1 to 90, comprising the additional step of adjusting the pH to 5-9.

Clause 92. The method of any one of clauses 1 to 91, comprising the additional step of adjusting the osmolality to 250 to 750 mOsm/kg.

Clause 93. A method for the preparation of an adjuvanted immunogenic composition comprising an immunogen or antigen, or a polynucleotide encoding the immunogen or antigen, said method comprising the steps of:
 (i) manufacturing a liposomal adjuvant according to the method of any one of clauses 1 to 92;
 (ii) mixing the liposomal adjuvant with an immunogen or antigen, or a polynucleotide encoding the immunogen or antigen.

Clause 94. A method for the manufacture of an adjuvanted immunogenic composition, said method comprising the step of combining an immunogen or antigen, or a polynucleotide encoding the immunogen or antigen, with a liposomal adjuvant manufactured according to the method of any one of clauses 1 to 92.

Clause 95. The method of clause 93 or 94, wherein the antigen is derived from Varicella Zoster Virus (VZV), *Moraxella* spp. (such as *Moraxella catarrhalis*) or non-typable *Haemophilus influenzae* (ntHi).

Clause 96. The method of any one of clauses 1 to 95, comprising the additional step of sterilisation by filtration.

Clause 97. A liposomal adjuvant comprising an AGP or GLA, and phosphatidylcholine lipid produced according to the method of any one of clauses 1 to 96.

Clause 98. The liposomal adjuvant according to clause 96 additionally comprising a sterol.

Clause 99. The liposomal adjuvant according to either clause 97 or 98 additionally comprising a saponin.

Clause 100. An adjuvanted immunogenic composition produced according to the method of clause 93 or 94.

Clause 101. The adjuvant or immunogenic composition according to any one of clauses 97 to 100 comprising saponin, such as QS-21, at an amount of 1-100 ug per human dose.

Clause 102. The adjuvant or immunogenic composition according any one of clauses 97 to 101 comprising an AGP or GLA, at an amount of 1-100 ug per human dose.

Clause 103. A solution comprising a solvent, an AGP or GLA and 100-170 mg/ml lipid, wherein the solvent comprises 70-90% v/v ethanol, such as 75-85% v/v ethanol, and 10-30% v/v isopropyl alcohol such as 15-25% v/v isopropanol.

Clause 104. The solution according to clause 103, wherein the lipid is phosphatidylcholine.

Clause 105. The solution according to clause 104, wherein the lipid is DOPC.

Clause 106. The solution according to either clause 103 to 105, comprising 100-160 mg/ml lipid.

Clause 107. The solution according to clause 106, comprising 120-140 mg/ml lipid, such as 130 mg/ml.

Clause 108. The solution according to any one of clauses 103 to 107, further comprising 20-50 mg/ml sterol.

Clause 109. The solution according to any one of clauses 103 to 108, wherein the ratio of lipid to sterol is 3:1 to 5:1.

Clause 110. The solution according to either clause 111 or 117, wherein the sterol is cholesterol.

Clause 111. The solution according to any one of clauses 103 to 110, wherein the AGP or GLA is present at a concentration of 4-12 mg/ml.

Clause 112. The solution of any one of clauses 103 to 111 which consists essentially of a solvent and 100-160 mg/ml DOPC and 30-40 mg/ml cholesterol, 4-10 mg/ml AGP or GLA, and wherein the solvent comprises 70-90% v/v ethanol and 10-30% v/v isopropyl alcohol.

Clause 113. A method for the preparation of a solution comprising a solvent, lipid, cholesterol and AGP, said method comprising the steps:
 (i) preparing a suspension of the AGP or GLA in at least a portion of the solvent;
 (ii) combining the suspended AGP or GLA with the phosphatidylcholine lipid and cholesterol;
 (iii) adding further solvent;
 (iv) mixing.

Clause 114. A method for the preparation of a solution comprising a solvent, lipid, cholesterol and an AGP or GLA, said method comprising the steps:
 (i) preparing a suspension of an AGP or GLA in at least a portion of the solvent;
 (ii) combining the suspended AGP or GLA with the phosphatidycholine lipid and cholesterol;

(iii) adding further solvent;
(iv) mixing;
(v) adding additional solvent.

Clause 115. The method for the preparation of a solution comprising a solvent, lipid, cholesterol and an AGP according to clause 113, said method comprising the steps:
(i) preparing a suspension of an AGP or GLA in at least a portion of the solvent; (ii) combining the suspended AGP or GLA with the DOPC and cholesterol;
(iii) adding further solvent;
(iv) mixing.

Clause 116. A method for the preparation of a solution comprising a solvent, lipid, cholesterol and an AGP or GLA according to clause 114, said method comprising the steps:
(i) preparing a suspension of an AGP or GLA in at least a portion of the solvent;
(ii) combining the suspended AGP or GLA with the DOPC and cholesterol;
(iii) adding further solvent;
(iv) mixing;
(v) adding additional solvent.

Clause 117. The method of either clause 113 to 116, wherein the mixing is at a temperature of 30-50° C.

Clause 118. The method of clause 117, wherein the mixing is at a temperature of 35-45° C.

Clause 119. The method of clause 118, wherein the mixing is at a temperature of 40° C.

Clause 120. The method of any one of clauses 113 to 119, wherein the at least a portion of the solvent is at least 25% of the solvent.

Clause 121. The method of clause 120, wherein the at least a portion of the solvent is at least 35% of the solvent.

Clause 122. The method of clause 121, wherein the at least a portion of the solvent is at least 45% of the solvent.

Clause 123. The method of any one of clauses 113 to 122, wherein the at least a portion of the solvent is 90% of the solvent or less such as 80% or less, especially 70% or less and in particular 60% or less.

Clause 124. The method of any one of clauses 113 to 123, wherein the further solvent is any remaining solvent.

Clause 125. The method of any one of clauses 113 to 124, wherein the solution comprises 100-160 mg/ml lipid and 30-40 mg/ml cholesterol, wherein the solvent comprises 70-90% v/v ethanol and 10-30% v/v isopropyl alcohol, wherein the lipid is suitably DOPC.

Clause 126. The method of any one of clauses 113 to 125, wherein the solution comprises 4-10 mg/ml AGP or GLA.

Clause 127. The method of any one of clauses 114 to 126, wherein the additional solvent is 0-30% of the solvent.

Clause 128. A liposome containing solution obtainable by mixing the first solution and second solution according to the methods of any one of clauses 1 to 127 prior to the removal of solvent.

Clause 129. The method, adjuvant, composition or solution according to any one of clauses 1 to 128, wherein the phosphatidycholine lipid contains saturated unbranched acyl chains having 12-20 carbon atoms such as acyl chains having 14-18 carbon atoms.

Clause 130. The method, adjuvant, composition or solution according to any one of clauses 1 to 128, wherein the phosphatidycholine lipid contains unbranched acyl chains having 12-20 carbon atoms and one double bond, such as acyl chains having 14-18 carbon atoms and one double bond.

Clause 131. The method, adjuvant, composition or solution according to any one of clauses 1 to 130, wherein the phosphatidycholine lipid is selected from dilauroyl phosphatidylcholine (DLPC), dimyristoyl phosphatidylcholine (DMPC), dipalmitoyl phosphatidylcholine (DPPC), distearoyl phosphatidycholine (DSPC) and diarachidoyl phosphatidylcholine (DAPC, dipalmitoleoyl phosphatidylcholine and dioleoyl phosphatidylcholine (DOPC); and mixtures thereof.

Clause 132. The method, adjuvant, composition or solution according to any one of clauses 1 to 131, wherein the AGP or GLA is an AGP.

Clause 133. The method, adjuvant, composition or solution according to any one of clauses 1 to 132, wherein the AGP has the following structure:

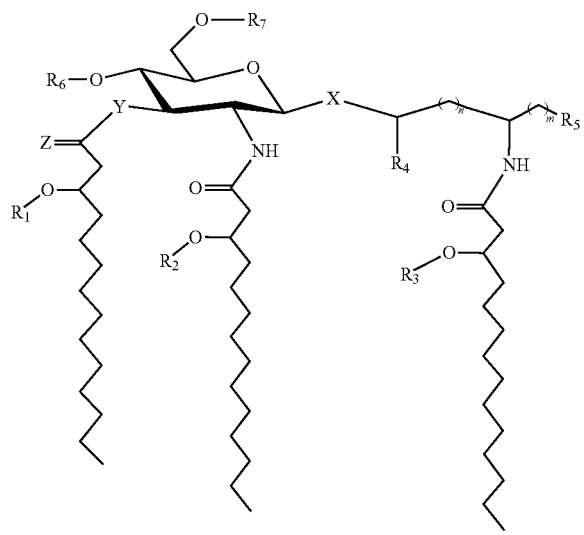

(Formula 1)

wherein
m is 0 to 6;
n is 0 to 4;
X is O or S, in particular O;
Y is O or NH;
Z is O or H;
each $R_1$, $R_2$, $R_3$ is selected independently from the group consisting of a $C_{1-20}$ acyl and a $C_{1-20}$ alkyl;
$R_4$ is H or methyl;
$R_5$ is selected independently from the group consisting of —H, —OH, —($C_1$-$C_4$)alkoxy, —$PO_3R_8R_9$, —$OPO_3R_8R_9$, —$SO_3R_8$, —$OSO_3R_8$, —$NR_8R_9$, —$SR_8$, —CN, —$NO_2$, —CHO, —$CO_2R_8$, and —$CONR_8R_9$,
wherein $R_8$ and $R_9$ are each independently selected from H and ($C_1$-$C_4$) alkyl; and
each $R_6$ and $R_7$ is independently H or $PO_3H_2$;
or a pharmaceutically acceptable salt thereof.

Clause 134. The method, adjuvant, composition or solution according to any one of clauses 1 to 133, wherein the AGP has the following structure:

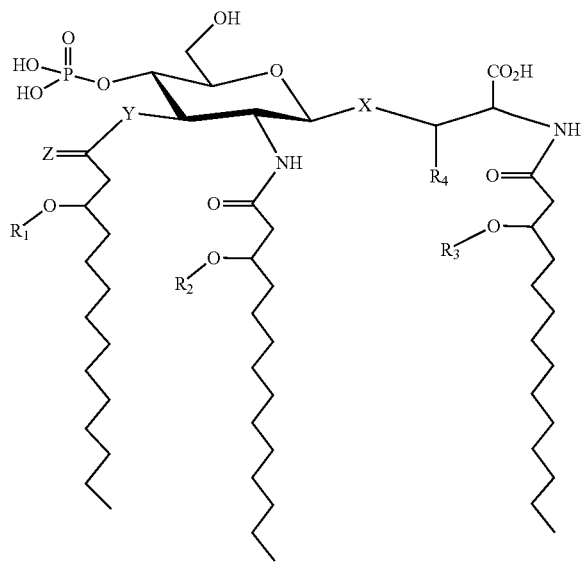

(Formula 1a)

wherein X is O or S, in particular O;
n is 0;
Y is O or NH;
Z is O or H;
each $R_1$, $R_2$, $R_3$ is selected independently from the group consisting of a $C_{1-20}$ acyl and a $C_{1-20}$ alkyl;
$R_5$ is $CO_2H$;
$R_6$ is $PO_3H_2$;
$R_7$ is H;
and $R_4$ is H or methyl;
or a pharmaceutically acceptable salt thereof.

Clause 135. The method, adjuvant composition or solution according to clauses 1 to 134, wherein the AGP is CRX524, CRX527, CRX529, CRX547, CRX526, CRX601 and/or CRX602, or a salt, such as a pharmaceutically acceptable salt thereof.

Clause 136. The method, adjuvant composition or solution according to clause 135, wherein the AGP is CRX524, CRX527, CRX529, CRX547 and/or CRX601, or a salt, such as a pharmaceutically acceptable salt thereof.

Clause 137. The method, adjuvant composition or solution according to clause 136, wherein the AGP is CRX601 or a salt, such as a pharmaceutically acceptable salt thereof.

Clause 138. The method, adjuvant composition or solution according to any one of clauses 1 to 137, wherein a single AGP compound is present.

Clause 139. The method, adjuvant composition or solution according to any one of clauses 1 to 137, wherein a plurality of AGP compounds are present, such as two.

Clause 140. The method, adjuvant composition or solution according to any one of clauses 1 to 139, wherein a GLA is not present.

Clause 141. The method, adjuvant, composition or solution according to any one of clauses 1 to 140, wherein the AGP is in the form of a sat, such as a pharmaceutically acceptable salt.

Clause 142. The method, adjuvant, composition or solution according to any one of clauses 1 to 140, wherein the AGP is not in the form of a salt.

Clause 143. The method, adjuvant, composition or solution according to any one of clauses 1 to 131, wherein the AGP or GLA is a GLA.

Clause 144. The method, adjuvant, composition or solution according to any one of clauses 1 to 132, wherein the GLA is:

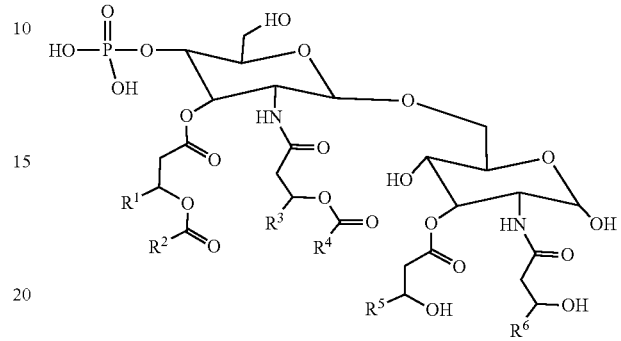

wherein:

$R^1$, $R^3$, $R^3$ and $R^6$ are each independently $C_{11-20}$alkyl; and $R^2$ and $R^4$ are each independently $C_{12-20}$alkyl;

and salts, such as pharmaceutically acceptable salts, thereof.

Clause 145. The method, adjuvant, composition or solution according to any one of clauses 1 to 132, wherein the GLA is:

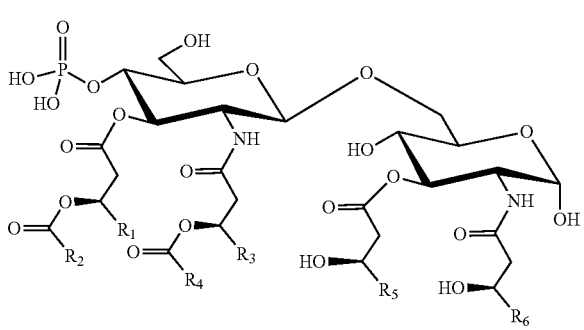

wherein:

$R^1$, $R^3$, $R^5$ and $R^6$ are each independently $C_{11-20}$alkyl; and $R^2$ and $R^4$ are each independently $C_{12-20}$alkyl;

and salts, such as pharmaceutically acceptable salts, thereof.

Clause 146. The method, adjuvant, composition or solution according to any one of clauses 1 to 132, wherein the GLA is:

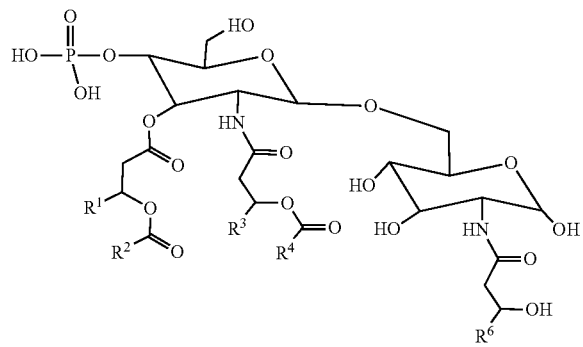

wherein:
$R^1$, $R^3$ and $R^6$ are each independently $C_{11-20}$alkyl; and
$R^2$ and $R^4$ are each independently $C_{12-20}$alkyl;
and salts, such as pharmaceutically acceptable salts, thereof.

Clause 147. The method, adjuvant, composition or solution according to any one of clauses 1 to 132, wherein the GLA is:

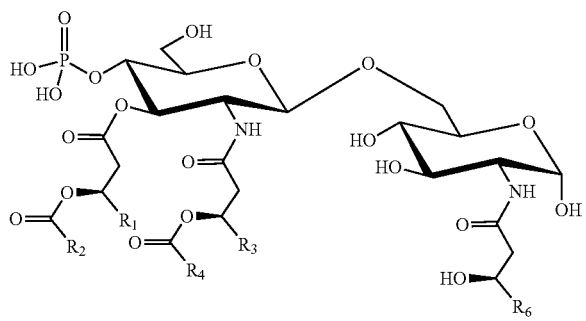

wherein:
$R^1$, $R^3$ and $R^6$ are each independently $C_{11-20}$alkyl; and
$R^2$ and $R^4$ are each independently $C_{12-20}$alkyl;
and salts, such as pharmaceutically acceptable salts, thereof.

Clause 148. The method, adjuvant, composition or solution according to any one of clauses 144 to 147, wherein all of $R^1$ to $R^6$ are linear alkyl groups.

Clause 149. The method, adjuvant, composition or solution according to any one of clauses 144 to 148, wherein each of $R^1$, $R^3$, $R^5$ and $R^6$ is independently selected from $C_{11-15}$alkyl.

Clause 150. The method, adjuvant, composition or solution according to any one of clauses 144 to 149, wherein each of $R^1$, $R^3$, $R^5$ and $R^6$ is identical.

Clause 151. The method, adjuvant, composition or solution according to any one of clauses 144 to 150, wherein each of $R^1$, $R^3$, $R^5$ and $R^6$ is $C_{11}$alkyl.

Clause 152. The method, adjuvant, composition or solution according to any one of clauses 144 to 151, wherein each of $R^2$ and $R^4$ is independently selected from $C_{12-16}$alkyl.

Clause 153. The method, adjuvant, composition or solution according to any one of clauses 144 to 152, wherein each of $R^2$ and $R^4$ is identical.

Clause 154. The method, adjuvant, composition or solution according to any one of clauses 144 to 153, wherein each of $R^2$ and $R^4$ is $C_{13}$alkyl.

Clause 155. The method, adjuvant, composition or solution according to any one of clauses 143 to 154, wherein the GLA is:

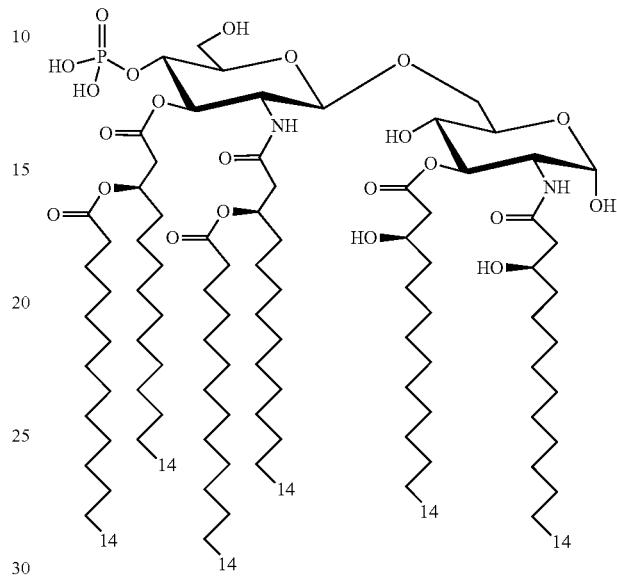

or a salt, such as a pharmaceutically acceptable salt, thereof.

Clause 156. The method, adjuvant, composition or solution according to any one of clauses 143 to 154, wherein the GLA is:

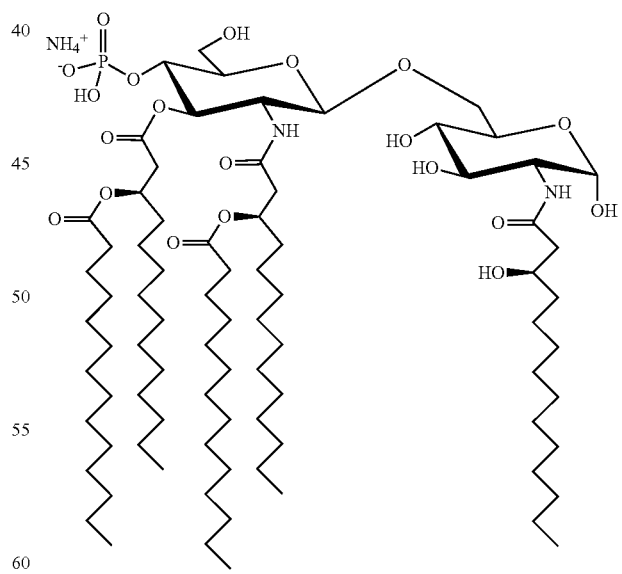

or the acid or other salt forms thereof, such as pharmaceutically acceptable salts.

Clause 157. The method, adjuvant composition or solution according to any one of clauses 1 to 156, wherein a single GLA compound is present Clause 158. The method, adjuvant composition or solution according to any one of clauses 1 to 156, wherein a plurality of GLA compounds are present, such as two.

Clause 159. The method, adjuvant composition or solution according to any one of clauses 1 to 158, wherein an AGP is not present.

Clause 160. The method, adjuvant composition or solution according to any one of clauses 1 to 159, wherein the GLA is in the form of a salt, such as a pharmaceutically acceptable salt.

Clause 161. The method, adjuvant composition or solution according to any one of clauses 1 to 160, wherein the GLA is not in the form of a salt.

The teaching of all references in the present application, including patent applications and granted patents, are herein fully incorporated by reference. A composition or method or process defined as "comprising" certain elements is understood to encompass a composition, method or process (respectively) consisting of those elements. As used herein, "consisting essentially of" means additional components may be present provided they do not alter the overall properties or function.

The invention will be further described by reference to the following, non-limiting, examples:

EXAMPLES

General Experimental Details
Single Mixing Chamber Microfluidic Device and General Operation
Device FIG. 1 illustrates the design of an exemplary microfluidic device having one mixing chamber on a single chip. The device comprises a mixing chamber of 2.5 cm in length and having an elongate cross-section of 2 mm by 0.4 mm. The mixing chamber has one centrally located inlet for the provision of the first solution and two inlets for the provision of the second solution. Each of the inlets is 0.2 mm wide and spans the full length of the other side of the mixing chamber. A single outlet is located at the distal end of the mixing chamber.

Operation

To perform microfluidic experiments, Cetoni neMesys Mi-pressure syringe pumps, Cetoni glass syringes and a Micronit chip-holder containing the device were placed in a temperature controlled area (Sartorius Certomat). Before any experimental runs, the system is cleaned and allowed to stabilize at the set temperature.

Product Collection and Solvent Removal

The concentrated liposomes collected were divided into 2 parts:

The first part was diluted with phosphate buffered saline (PBS) pH6.1 to reach a final concentration of 2 mg/ml DOPC and filtered on 0.22 um polyethersulfone (PES) membrane. Composition testing (DOPC, Cholesterol, 3D-MPL, QS-21) were performed on this sample.

The second part was dialysed (Device 7000MWCO Thermo Slide-A-Lyser) with phosphate buffered saline pH6.1 to remove the organic solvent. The protocol used was: 2×15 min, 2×30 min and overnight (1 L of PBS pH6.1 buffer at each time point). The retentate was then diluted to reach 2 mg/ml DOPC and filtered on 0.22 um PES membrane. Size measurements were undertaken on this sample. Residual alcohol was tested on this sample by gas chromatography.

Multi Mixing Chamber Microfluidic Device and General Operation
Device

Figure 2:
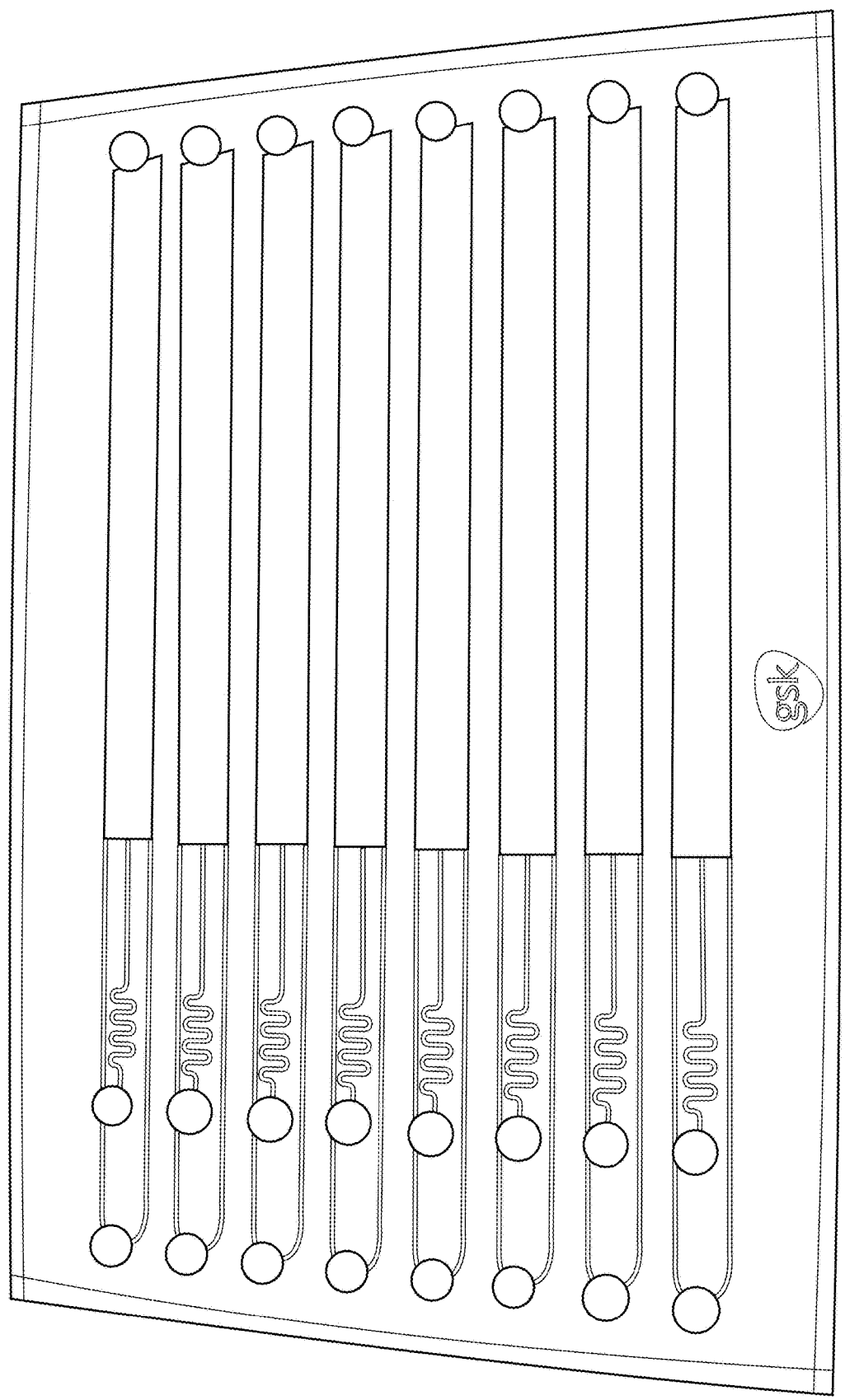
FIG. 2: Eight mixing chamber microfluidic chip

FIG. 2 illustrates the design of an exemplary multi mixing chamber microfluidic device having eight mixing chambers on a single chip. The device comprises eight mixing chambers of 2.5 cm in length and having an elongate cross-section of 2 mm by 0.4 mm. Each mixing chamber has one centrally located inlet for the provision of the first solution and two inlets for the provision of the second solution. Each of the inlets is 0.2 mm wide and spans the full length of the other side of the mixing chambers. A single outlet is located at the distal end of each of the mixing chambers.

Figure 3:
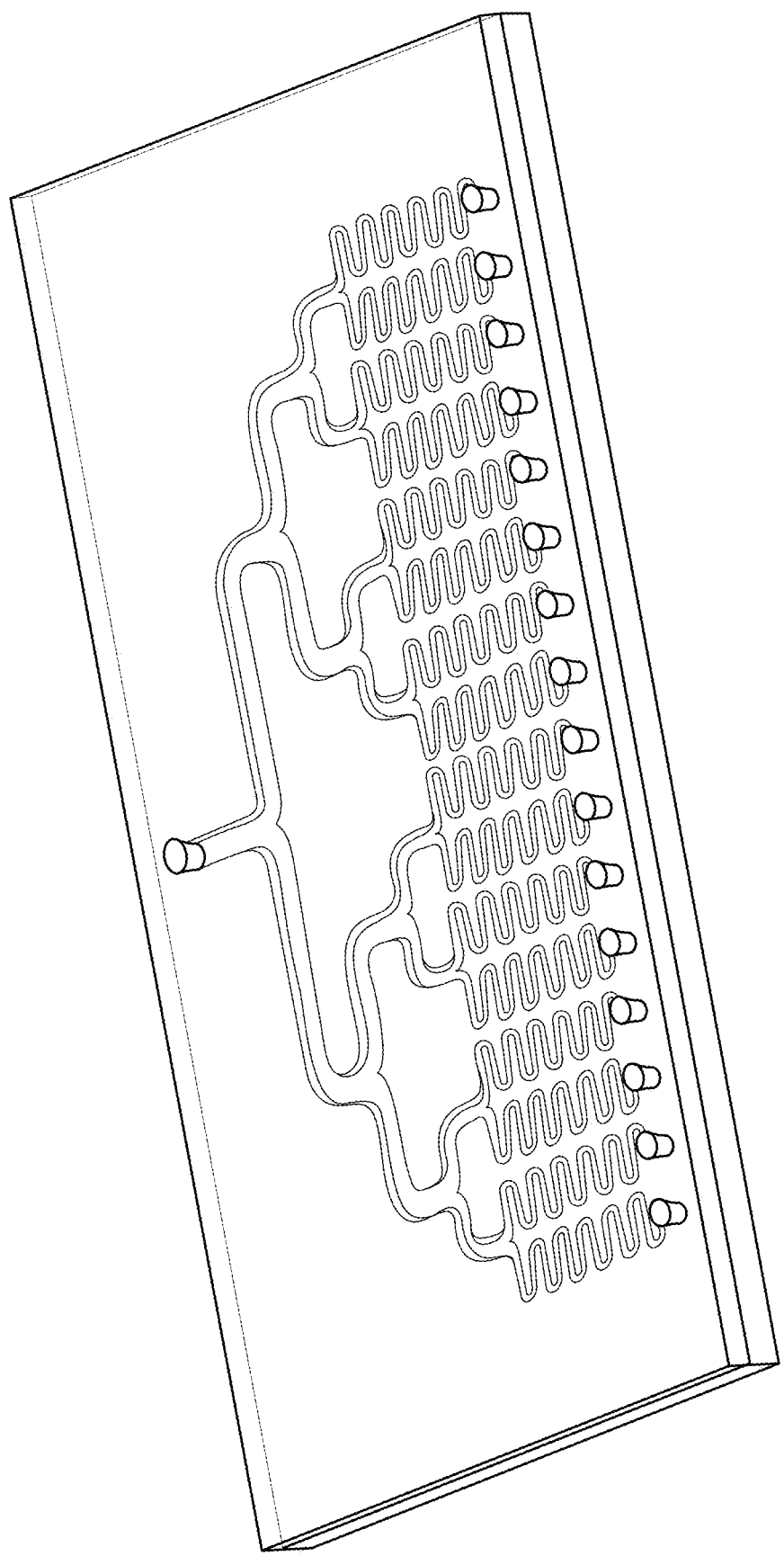
FIG. 3: Liquid distribution manifold (one to sixteen)

FIG. 3 illustrates a manifold design which can be used in conjunction with a multi mixing chamber microfluidic chip, to supply first solution or second solution to the inlets of sixteen mixing chambers, or to collect mixed material from the outlets of sixteen mixing chambers.

Figure 4:
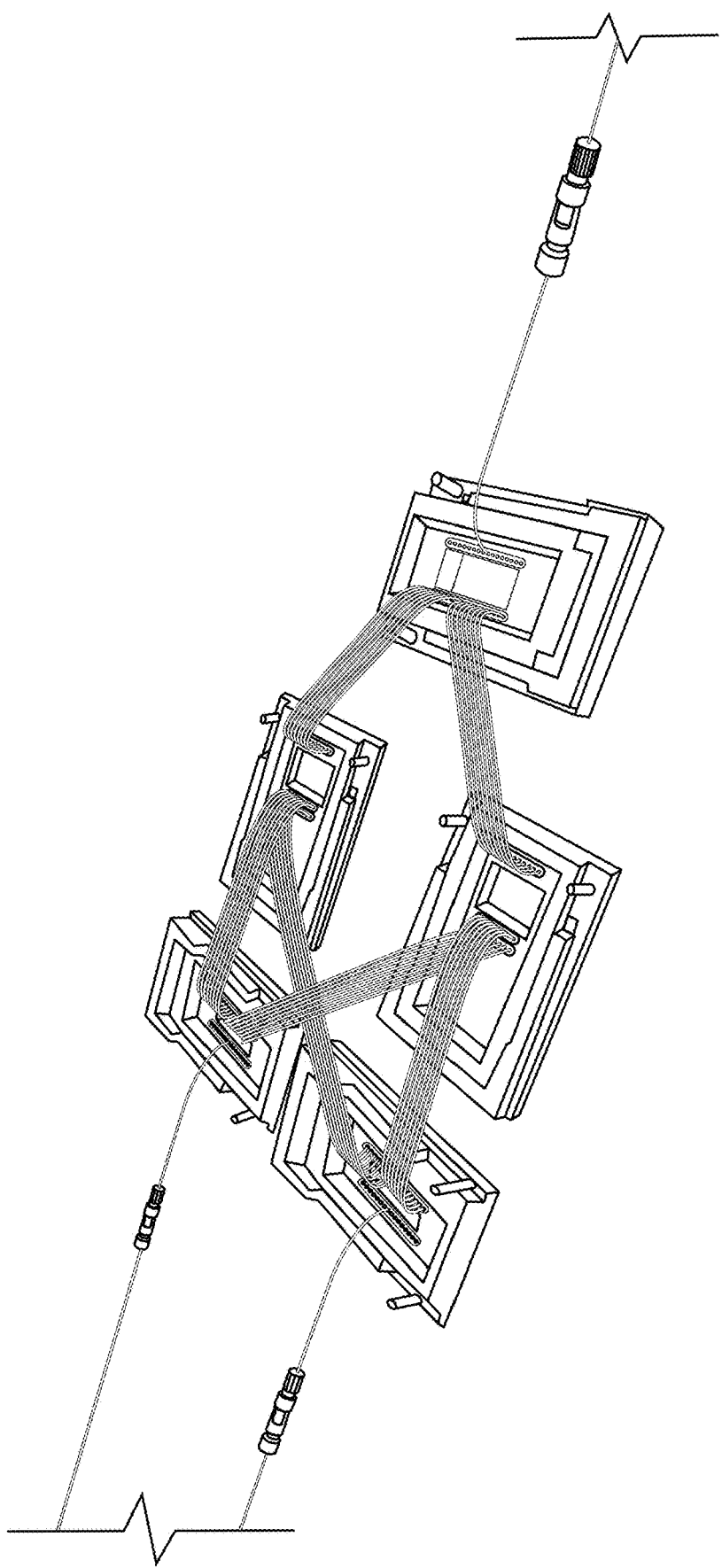
FIG. 4: Operational arrangement of two eight mixing chamber microfluidic chips with distribution and collection manifolds

FIG. 4 is a representation of an exemplary multi mixing chamber microfluidic device having a total of sixteen mixing chambers based on two chips of the style shown in FIG. 2 (occupying the two central holders), in conjunction with a distribution manifold supplying the first solution inlets of the sixteen chambers (lower left holder), a distribution manifold supplying the second solution inlets of the sixteen chambers (upper left holder) and a collection manifold which pools the outlets from the sixteen chambers (right holder).

Operation

The multi mixing chamber device may be operated in a manner similar to the single device. For example, organic stock (e.g. 4.9 L) may be prepared containing DOPC 130 mg/ml, Cholesterol 32.5 mg/ml and 3D-MPL 6.5 mg/ml in 80:20 ethanol/IPA. The aqueous phase (e.g. 19.7 L) may be composed of QS-21 at 1.625 mg/ml diluted in water for injection.

Suitable pumps, such as Isco 500D in tandem for organic phase and 1000D in tandem for aqueous phase, may be used in continuous flow to supply the liquid phases through manifolds dividing the flows into 16 streams which enter the 16 mixing chambers arranged in parallel. At the end of the mixing chambers, another manifold may be used to collect the mixed material containing concentrated liposomes into one vessel.

Diafiltration may be used to remove the organic solvent from the mixed material and replace the water for injection with a suitable buffer (such as PBS pH6.1 buffer).

Further dilution with suitable buffer (e.g. PBS pH6.1) allows the final composition to be achieved depending on the desired concentration of components. Sterile filtration may then be undertaken.

Analytical Methods
Size Measurements

Size measurements made use of the DLS principle with a Malvern Zetasizer instrument.

Samples were diluted in the corresponding buffer (typically PBS pH6.1) for the measurements.

3D-MPL Content

HPLC coupled with fluorescence detection was used to quantify the 3D-MPL component. Separation was realized on C18 column.

Standards were prepared from equimolar mix of glucosamine HCl and glucosamine 6 phosphate reconstituted in the liposomal matrix (DOPC, Cholesterol).

Samples and standards are derivatized with acid in strong reducing conditions.

QS-21 Content

HPLC coupled with UV detection was used to quantify the QS-21 component. Separation is realized on C18 column.

Standards are prepared with a QS-21 reference diluted in DMSO from 25 to 75 ug/ml Samples are diluted in DSMO for analysis.

DOPC-Chol Content 2 methods were used:

First method (individual standards) used U-HPLC coupled with UV detector. Separation was realized on C18 column.

Standards were prepared with DOPC/Chol diluted in IPA/CHCl$_3$ for stock and diluted in same buffer from 0 to 700 ug/ml for DOPC and 0 to 175 ug/ml for Cholesterol.

Samples are diluted in IPA/CHCl$_3$.

Second method (relative to previously characterised adjuvant composition) used HPLC coupled with UV detector. Separation is realized on C18 column Standards are prepared using previously characterised adjuvant composition, prepared by classical means, diluted in methanol from 0 to 500 ug/ml for DOPC and 0 to 125 ug/ml for Cholesterol Samples are diluted in methanol Solvent Residuals Method using Gas-Chromatography coupled with Head-Space injector and FID (Flam Ionization detector). Separation is realized on CP WAX52-CB Agilent column.

Standards are prepared for each specific organic solvent (in this case, IPA and Ethanol) from 2 to 160 ug/ml. The LOQ is at 2 ug/ml Samples are diluted in order to be in the range of the standards.

Example 1: Investigation of First Solution Preparation Methods and Composition

Example 1A—Solvent Composition

Method

To investigate the impact of solvent composition on liposome production, solutions of DOPC, cholesterol and 3D-MPL were prepared in various ethanol/isopropyl alcohol ratios.

DOPC, cholesterol and 3D-MPL were each individually solubilised (60% volume for DOPC, 20% for cholesterol and 20% for 3D-MPL) for 15 minutes at 55° C. 3D-MPL solution was then added to DOPC solution and this mixture added to the cholesterol solution and further mixed for 15 additional minutes to provide final compositions with 150 mg/ml DOPC (20:5:1 weight ratio DOPC:cholesterol:3D-MPL).

The single chamber microfluidics device was operated with a total flow rate of 14 ml/min, flow rate ratio of 20 (19:1) (1:19 organic:aqueous), using water for injection as the aqueous phase, with stock solutions and environment at room temperature.

Results

TABLE 1

Impact of solvent composition on liposome size

| Ethanol:IPA ratio | Liposome size (nm) |
| --- | --- |
| 100:0 | — |
| 80:20 | 124 |
| 70:30 | 139 |
| 60:40 | 154 |
| 50:50 | 174 |

Conclusions

Pure ethanol was unable to solubilise the components at the target concentration. Although pure isopropanol was able to solubilise the components at the target concentration, the liposomes produced in a similar experiment (160 mg/ml) were very large with a diameter of 203 nm.

Mixtures of ethanol and IPA, particularly in the range of 90:10 to 70:30 provide good solubilisation capacity with low viscosity.

Example 1B—Solution Operation

Method

The order of component addition was evaluated comparing the two following methods:

1. DOPC, cholesterol and 3D-MPL were each individually solubilised (60%, 20%, 20% volumes respectively) in 80:20 ethanol:IPA for 15 minutes at 55° C. 3D-MPL solution was then added to DOPC solution and further mixed for 15 additional minutes. The 3D-MPL/DOPC mixture was then added to the cholesterol solution and further mixed for 1 additional hr to provide a final composition with 120 mg/ml DOPC (20:5:1 weight ratio DOPC:cholesterol:3D-MPL).
2. 3D-MPL was suspended with 50% of the solvent (80:20 ethanol:IPA) and then added to DOPC and cholesterol powders. The volume was then adjusted with the rest of the solvent and the mixture heated to 40° C. for 15 minutes to provide a final composition with 120 mg/ml DOPC (20:5:1 weight ratio DOPC:cholesterol:3D-MPL).

Method 1 required the mixture to be kept at 55° C. for 1 h for complete solubilisation of the components. However, if not kept under mild agitation for a few minutes, a phase separation can be observed. In order to avoid this, continuous agitation is required until solubilisation is complete.

Method 2 allows complete solubilisation after less time (15 min) and no phase separation can be observed if not agitated.

The single mixing chamber microfluidics device was operated with a total flow rate of 18 ml/min, flow rate ratio of 20 (1:19 organic:aqueous) and at temperatures of 15-25° C. using stock first solution prepared by both methods. The second solution (aqueous) was QS-21 in water for injection.

Results

Figure 5:
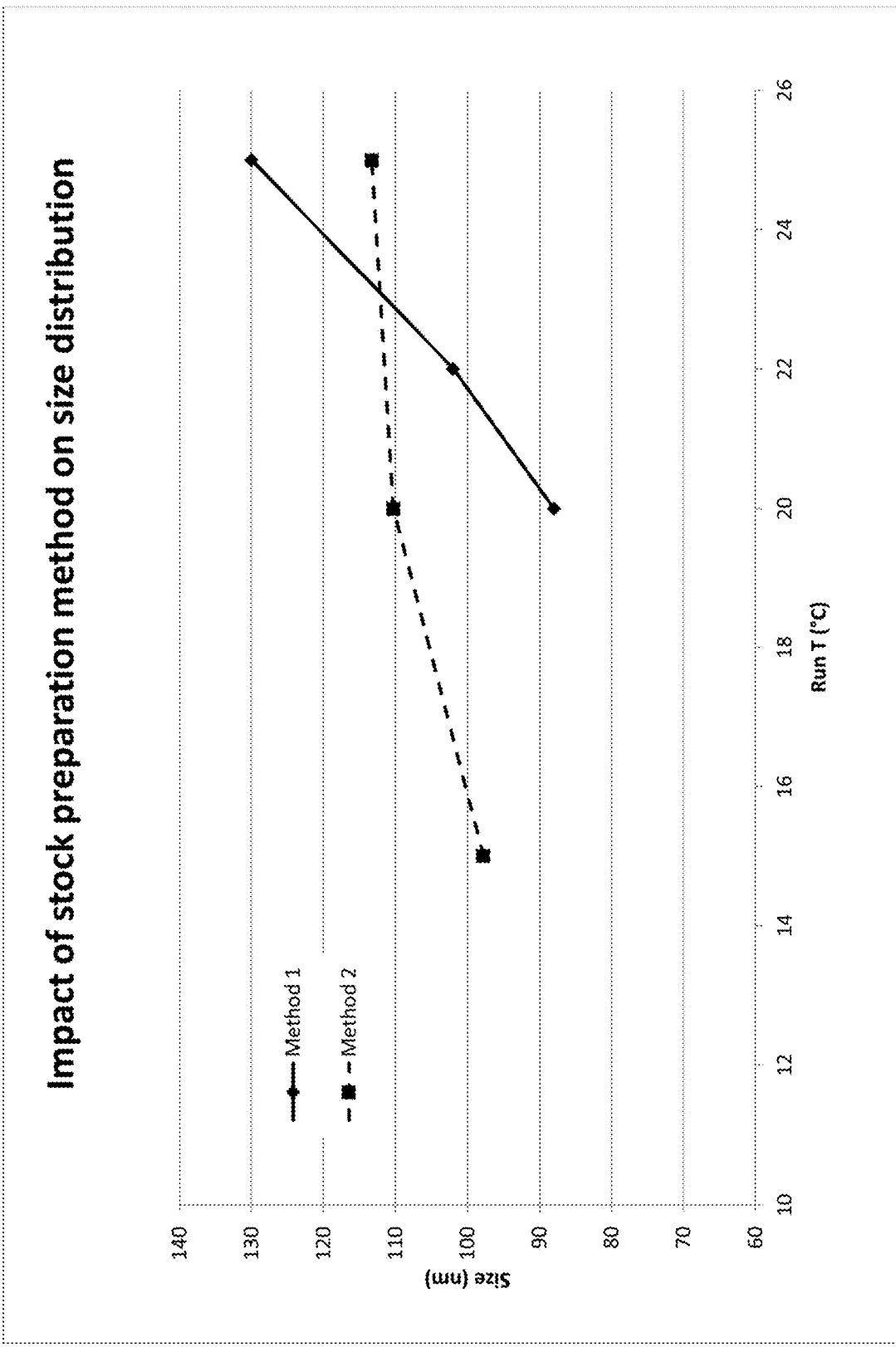
FIG. 5: Impact of stock preparation method on liposome size distribution

The results are shown in FIG. 5.

Conclusions

Method 1 is more sensitive to temperature while Method 2 allows for a less temperature sensitive microfluidic operation with liposome samples within size specification of 95-120 nm on the 15-25° C. range.

Example 1C—Solution Concentration Limits

The impact of the concentration of the DOPC, cholesterol and 3D-MPL on the stock stability and solubility was evaluated.

Stock solutions of DOPC, cholesterol and 3D-MPL in ethanol/IPA 80:20 were prepared at DOPC concentrations of 40, 60, 80, 100, 120, 140, 160 and 200 mg/ml (20:5:1 weight ratio DOPC:cholesterol:3D-MPL) following Method 2. Measurement was first made at To (30° C.), samples were then stored at 25° C. for one hour, analysed and then stored at 20° C. for one hour, analysed and then stored at 15° C. for one hour and analysed.

Results

Figure 6:
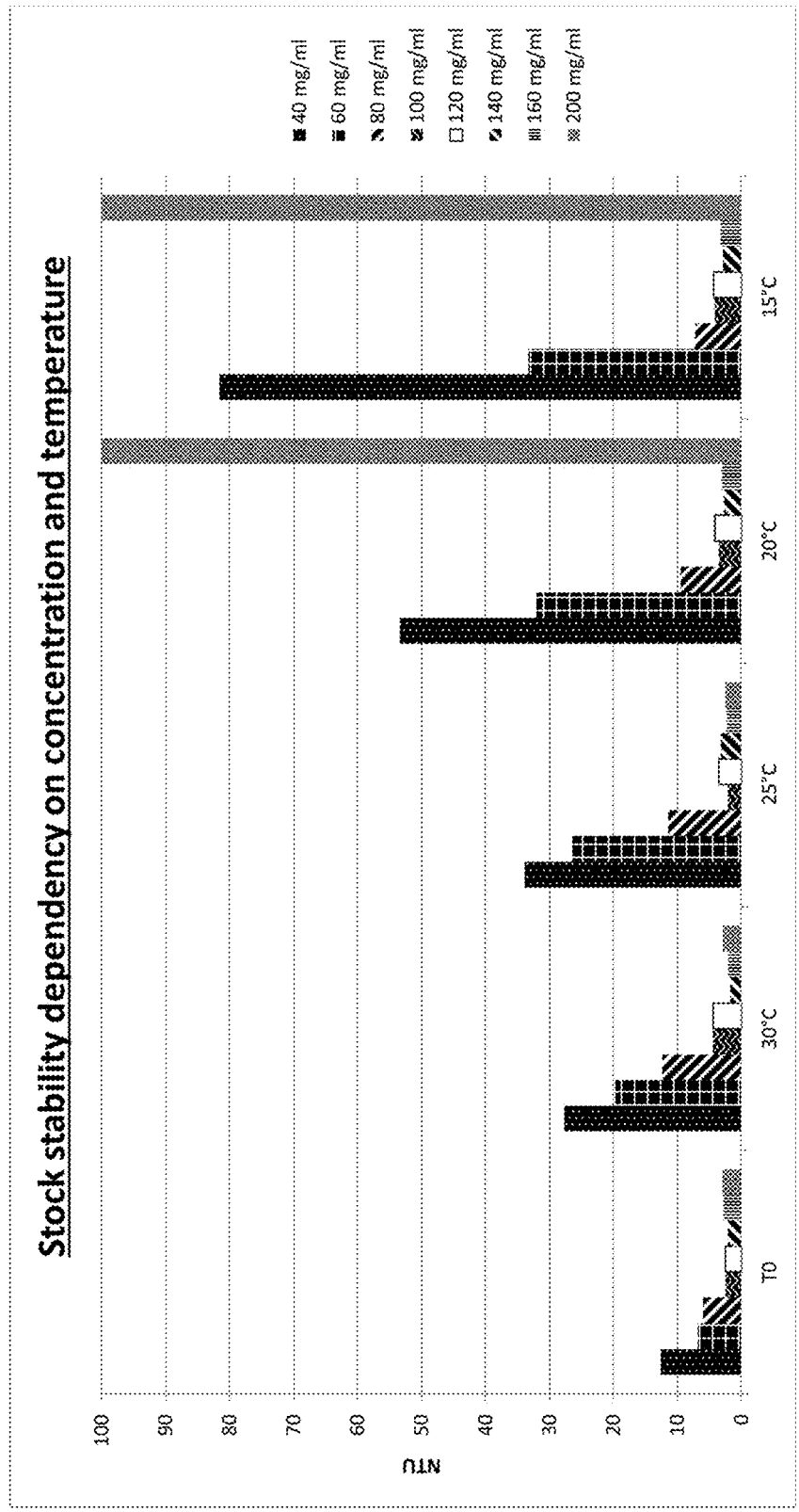
FIG. 6: Stock stability dependency on concentration and temperature

The results are shown in FIG. 6.

Nephelometric measurement by Nepheostar revealed that concentrations below 100 mg/ml evolve and have higher turbidity. Similarly, 200 mg/ml evolves and has higher turbidity.

Conclusions

Concentrations between 100 and 160 mg/ml are stable at temperatures between 15° C. and 30° C. These surprising results could be explained by specific interactions between the lipid (DOPC), sterol (cholesterol) and TLR4 agonist (3D-MPL) when mixed in ethano/IPA within this concentration range.

Example 2: Investigation of the Impact of Solvent Composition and Temperature on Liposome Size Method Stock solutions of DOPC, cholesterol and 3D-MPL were prepared at a DOPC concentration of 120 mg/ml (20:5:1 weight ratio DOPC:cholesterol:3D-MPL) following Method 2 in ethanol:IPA at ratios of 80:20; 70:30 and 60:40 and used along with aqueous QS-21 stock at 1.5 mg/ml.

The microfluidics process was run at temperatures of 15° C., 20° C. and 25° C. at a total flowrate of 18 ml/min and a flowrate ratio of 5 (1:4 organic:aqueous).

In this experiment liposome sizes were measured before dialysis.

Results

Figure 7:
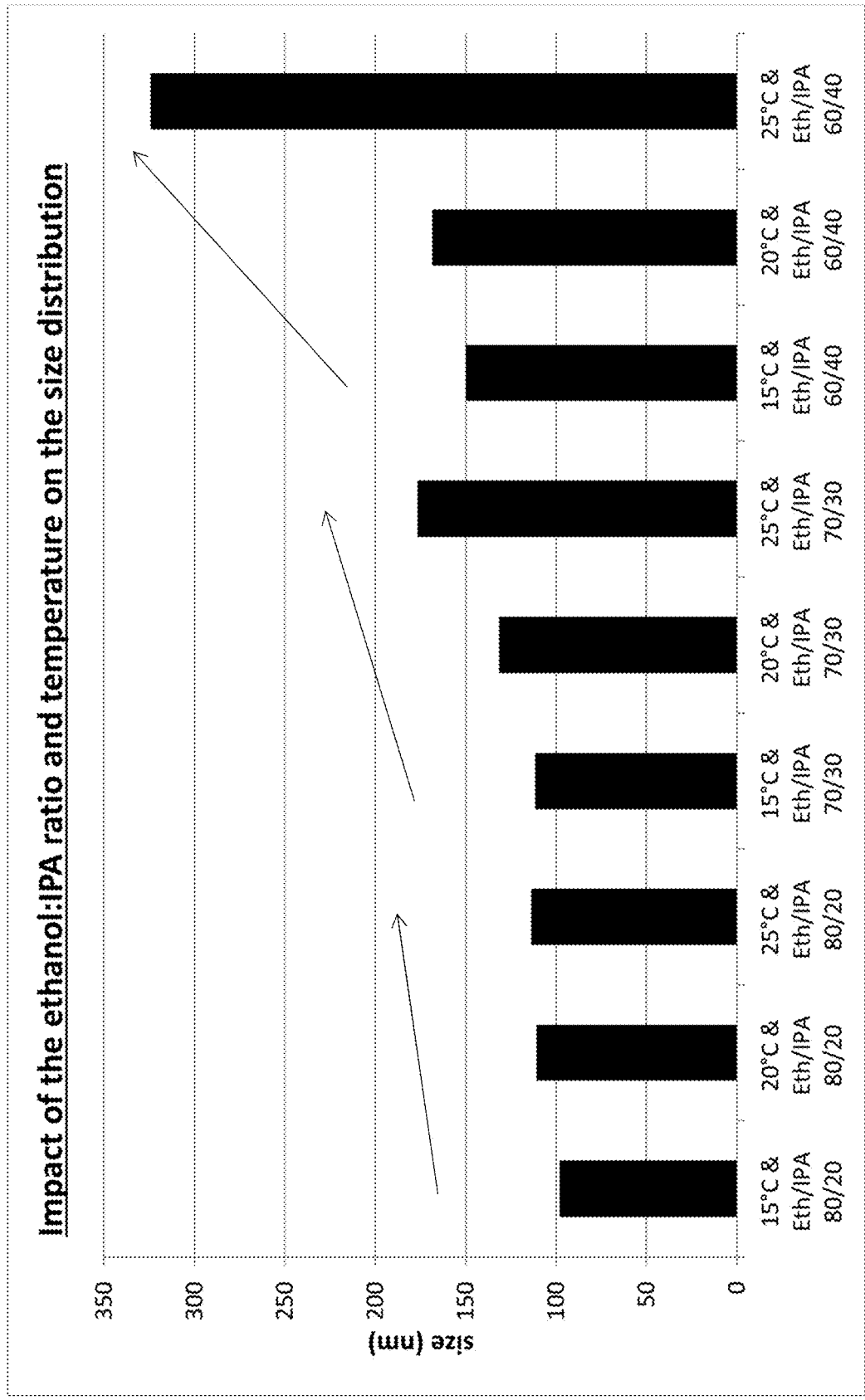
FIG. 7: Impact of solvent composition and temperature on liposome size

The results are shown in FIG. 7.

Conclusions

The temperature partially drives the solubility of the components (DOPC, cholesterol and 3D-MPL). Stock prepared at 40° C. can be cooled down to 15° C. without precipitation. However, operation at lower temperatures induces faster precipitation and thereby results in smaller liposomes.

The liposome size is impacted by the composition of the first solution different temperatures with greatest variation with ratio of 60:40>70:30>80:20. This experiment also confirms the choice of an 80:20 ratio as having the lowest sensitivity to temperature.

Example 3: Detailed Analysis of Microfluidic Run Conditions and their Impact on Liposome Size Based on the general limits determined previously, a DOE (Design of Experiment) central composite was built to determine the process response in terms of size (Zav) and detect any cross interactions between temperature, total flow rate, flow rate ratio and stock concentration.

Method

TABLE 2

Summary of conditions investigated

| Parameter | Evaluation range (upper & lower limits) |
|---|---|
| First solution DOPC concentration | 100 ug/ml<br>160 ug/ml |
| Total flow rate | 14 ml/min<br>20 ml/min |
| Flow rate ratio | 4 (1:3 organic:aqueous)<br>6 (1:5 organic:aqueous) |
| Temperature | 15° C.<br>25° C. |

Figure 9:
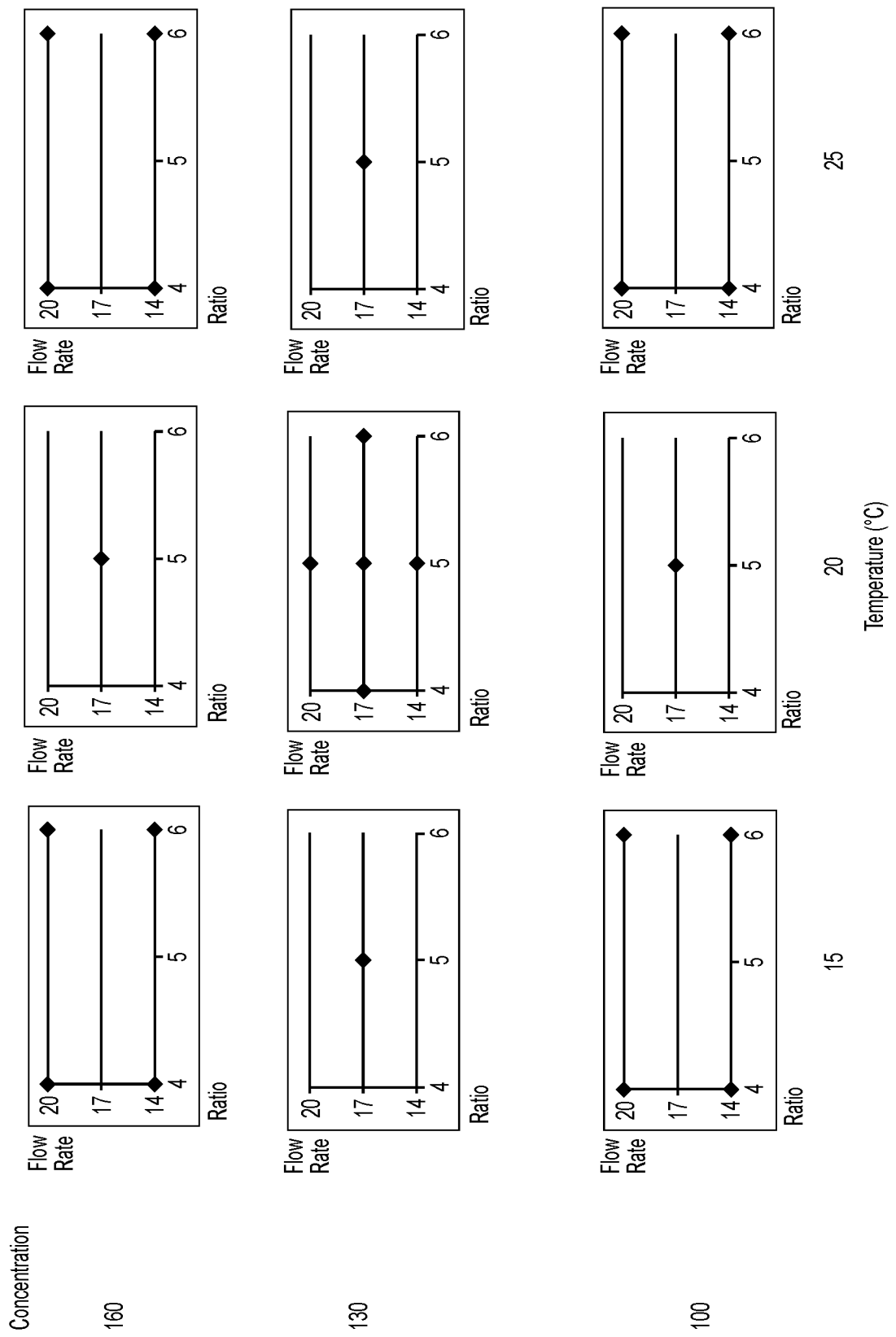
FIG. 9: Visual summary of Example 3 test conditions

A table of test conditions is provided in FIG. 8 with a visual summary of the test conditions in FIG. 9. Experiments were undertaken over four days.

First solutions were prepared according to Method 2 as described previously. Briefly DOPC (Lipoid) was weighed, followed with Cholesterol (Sigma). In a separate vial, 3D-MPL (GSK Hamilton) was weighed. 50% of the organic phase (80% Ethanol (Merck) and 20% Isopropanol was added to the 3D MPL. The suspended MPL was then added to the DOPC/cholesterol powder and placed at 40° C. under mixing. After solubilisation of the three components (clear solution), the organic stock is left for a further 15 minutes at 40° C. The volume is then adjusted to provide the target concentration (20:5:1 weight ratio DOPC:cholesterol-3D-MPL).

For the second solution, OS-21 concentrated liquid bulk was diluted in water for injection to reach the final concentration required.

Statistical analysis was performed using SAS 9.2 and Design Expert 9 based on a face-cantered central composite design for response surface estimation, with 6 cente points and 24 model points.

Reynolds numbers were calculated per the equation:

$$Re = \frac{\rho U D_h}{\mu} = \frac{\rho U}{\mu} \frac{2wh}{w+h} = \frac{\rho}{\mu} \frac{2Q}{w+h}$$

For example under the conditions:

| | Organic phase | Aqueous phase |
|---|---|---|
| Density | 0.829 g/cm$^3$ at 22.4° C. | 1.002 g/cm$^3$ at 21.7° C. |
| Viscosity | 3.345 Cp at 19.8° C. | 1.09 Cp at 20° C. |
| Flow-rate | 3.2 ml/min | 12.8 ml/min |
| Working T° | 20° C. | 20° C. |

Based on the mean densities and viscosities of the fluids as per their proportions:

Density: (12.8×1.002+3.2×0.829)/16=0.9674 g/cm$^3$

Viscosity: (12.8×1.09+3.2×3.345)/16=1.541 Cp, if 1 Pa=1 kg·m$^{-1}$·s$^{-2}$ and 1 Cp=1 mPa·s then viscosity=1.541 g·m$^{-1}$·s$^{-1}$=0.01541 g·cm$^{-1}$·s$^{-1}$ The mixing chamber dimensions are: 2000 um (w)×400 um (h).

2Q=2×16=32 ml/min=0.53 cm$^3$/s

W+h=400 um (height)+2000 um (wide)=2400 um=0.24 cm

Everything inside the equation: (0.9674×0.53)/(0.01541×0.24)=138.6

An equivalent approach can be taken for all flow-rates and flow-rate ratios.

Results

FIG. 10 provides the results of the experiment.

Modelling of Pdl

Table 3 presents the standard deviation (SD) and coefficient of variance (CV) for Zav and Pdl.

TABLE 3

Analysis of repeatability on centre point of the DOE

|  | Zav | Pdl |
|---|---|---|
| SD repeatability | 1.17 | 0.01 |
| SD intermediate precision | 5.53 | 0.03 |
| CV repeatability | 1.05% | 4.24% |
| CV intermediate precision | 4.97% | 16.89% |

Figure 11:
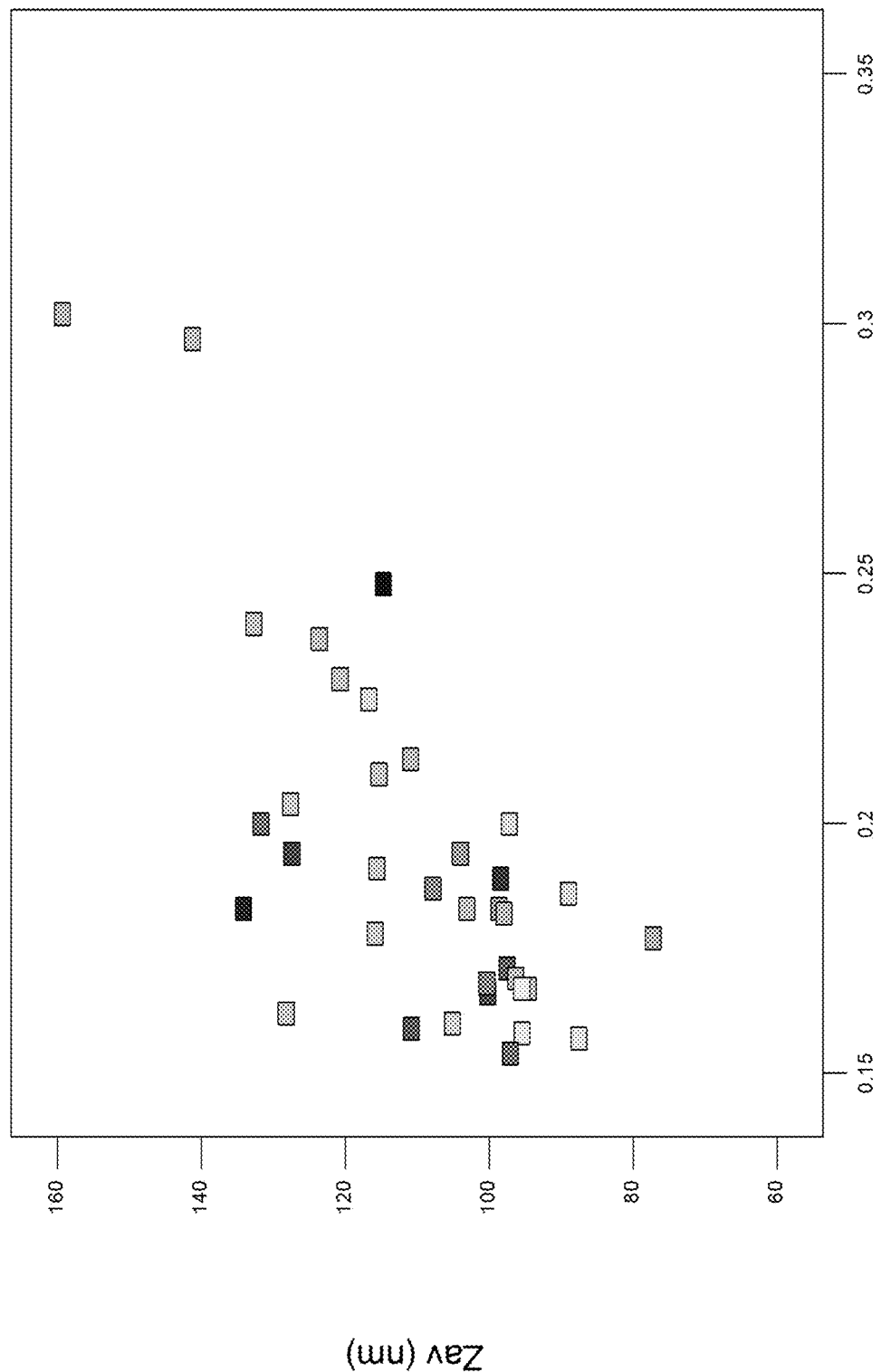
FIG. 11: Relationship between Zav and Pdl
Figure 12:
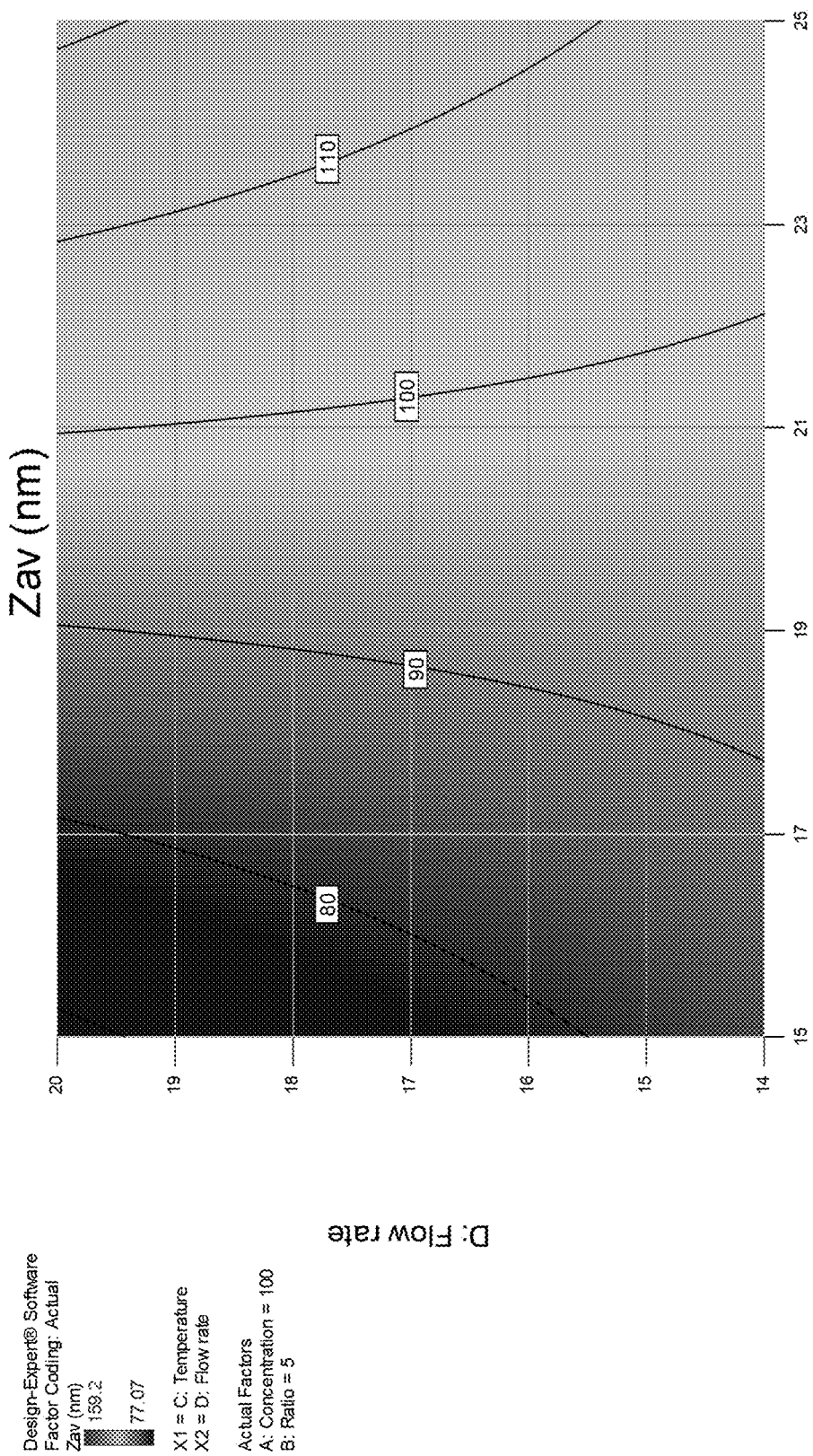
FIG. 12: Prediction of size at 100 mg/ml DOPC and ratio 5 (1:4 organic:aqueous phases)
Figure 13:
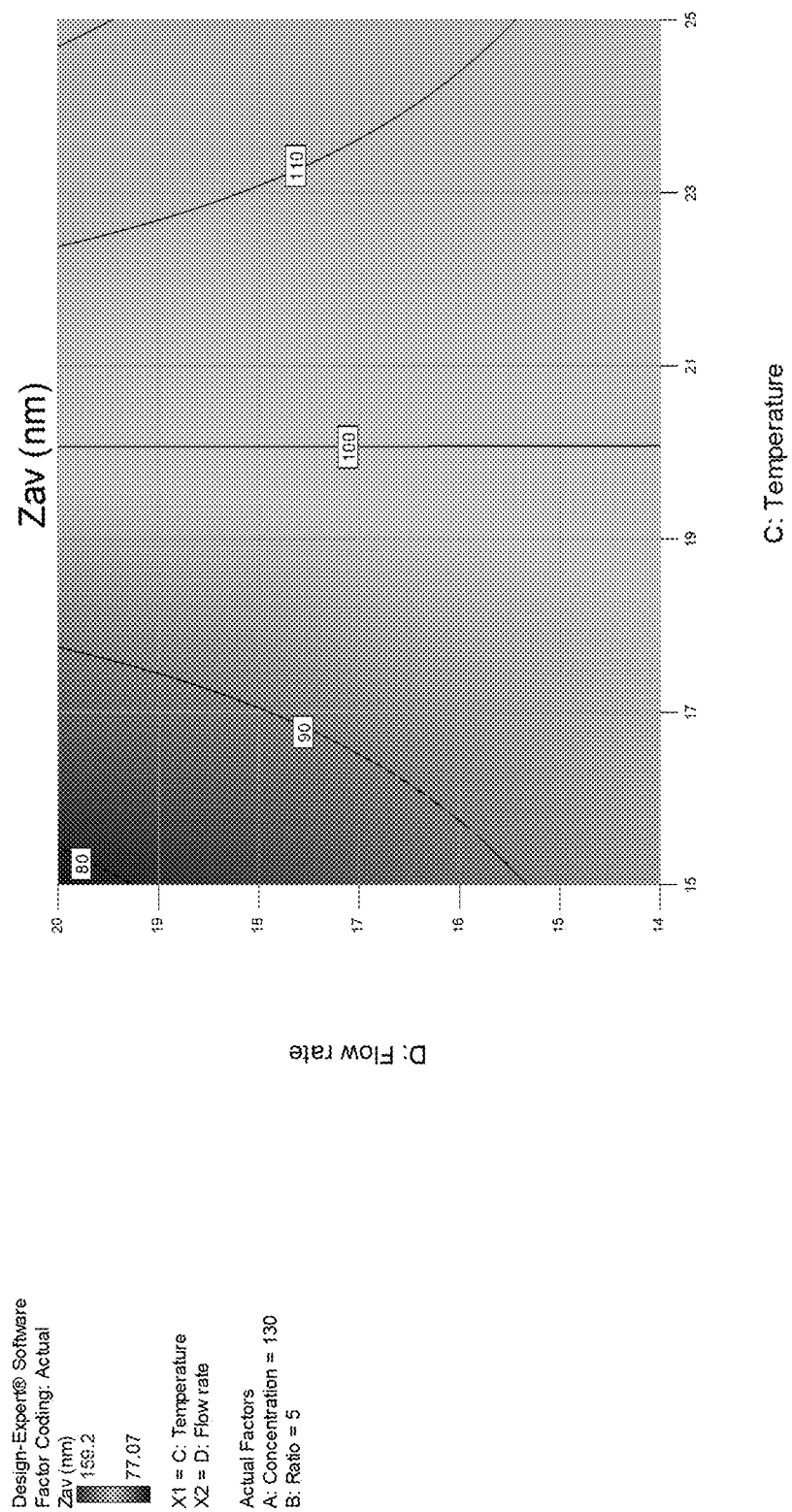
FIG. 13: Prediction of size at 130 mg/ml DOPC and ratio 5 (1:4 organic:aqueous phases)
Figure 14:
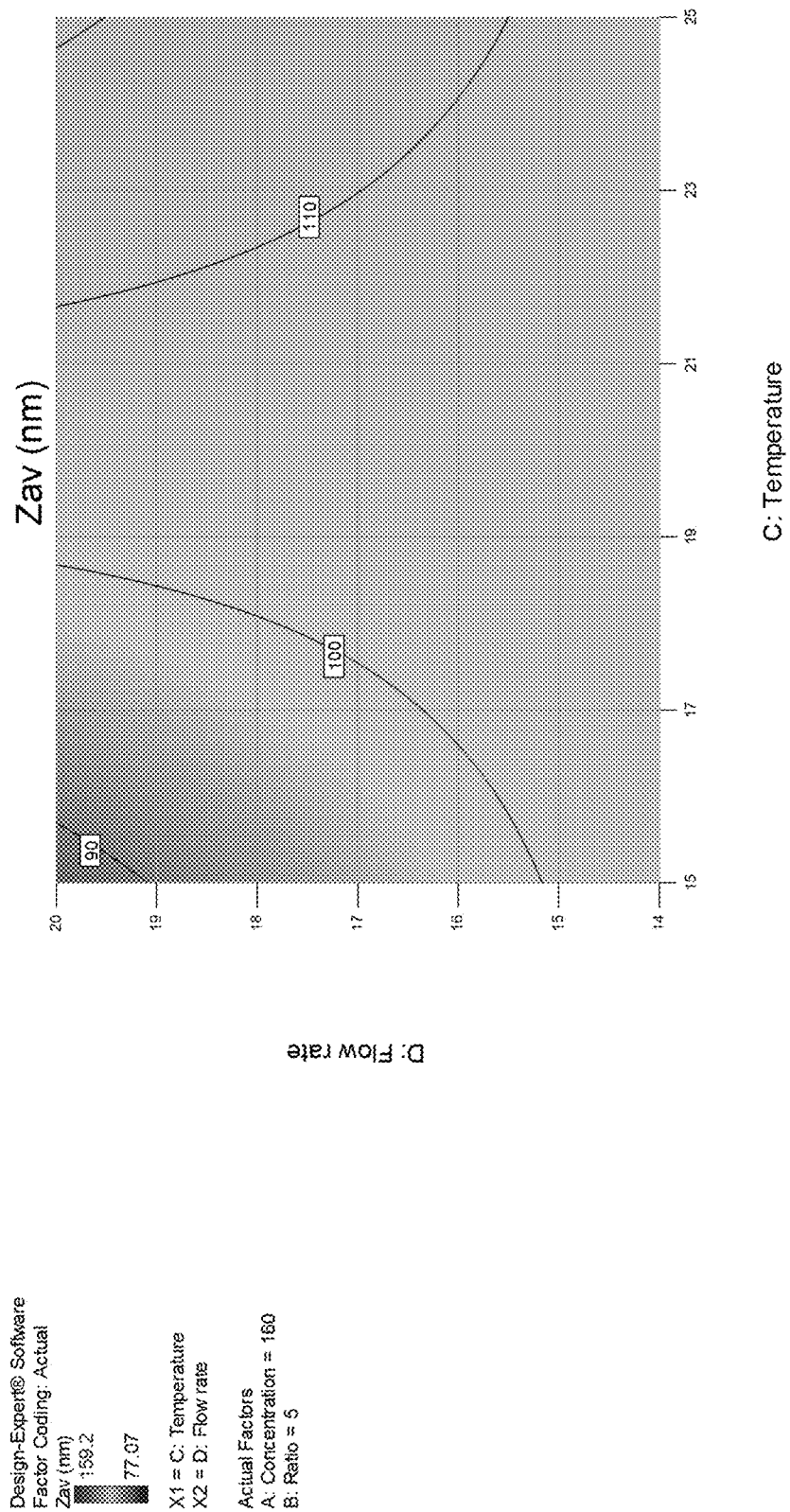
FIG. 14: Prediction of size at 160 mg/ml DOPC and ratio 5 (1:4 organic:aqueous phases)
Figure 15:
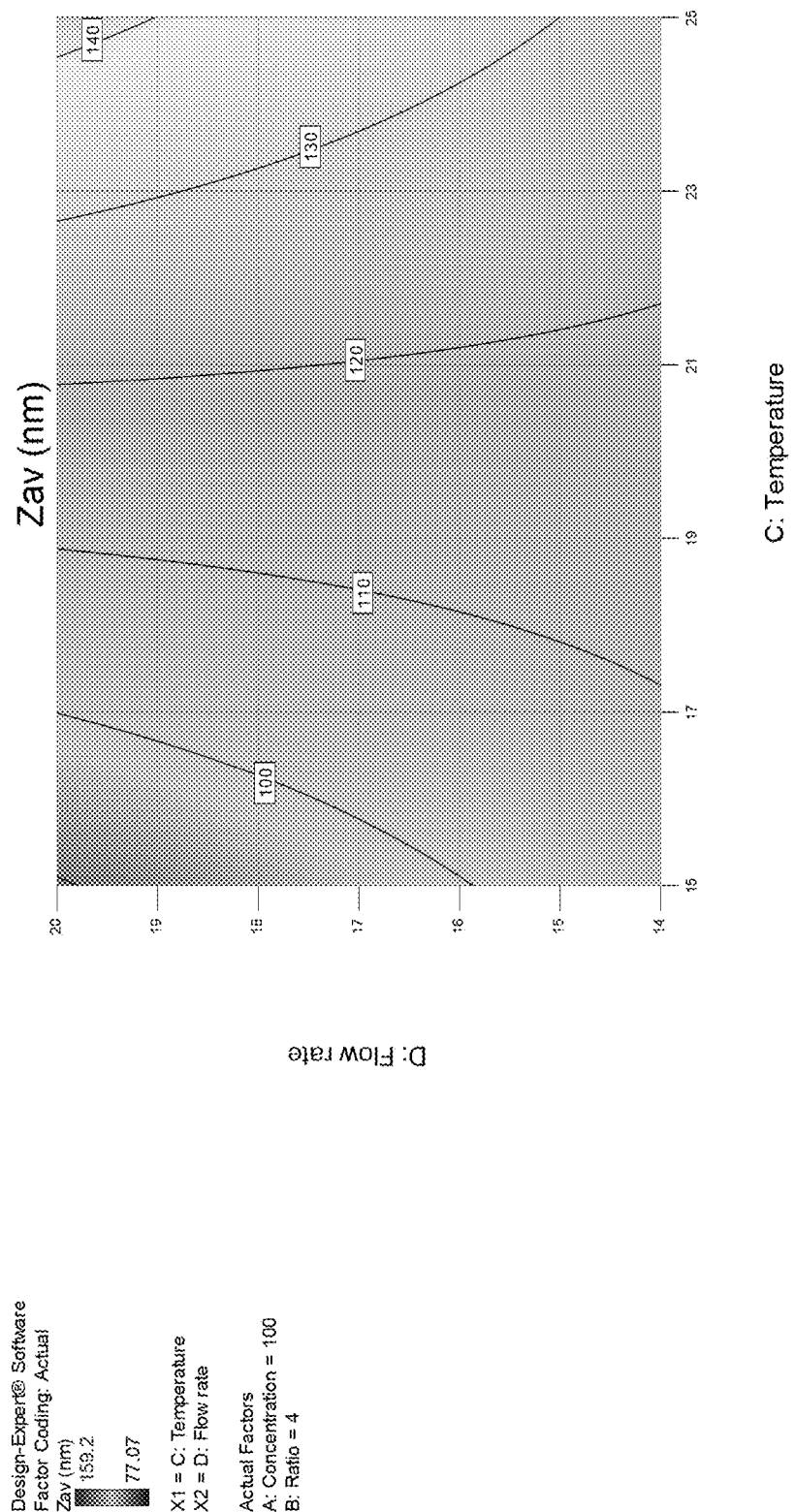
FIG. 15: Prediction of size at 100 mg/ml DOPC and ratio 4 (1:3 organic:aqueous phases)
Figure 16:
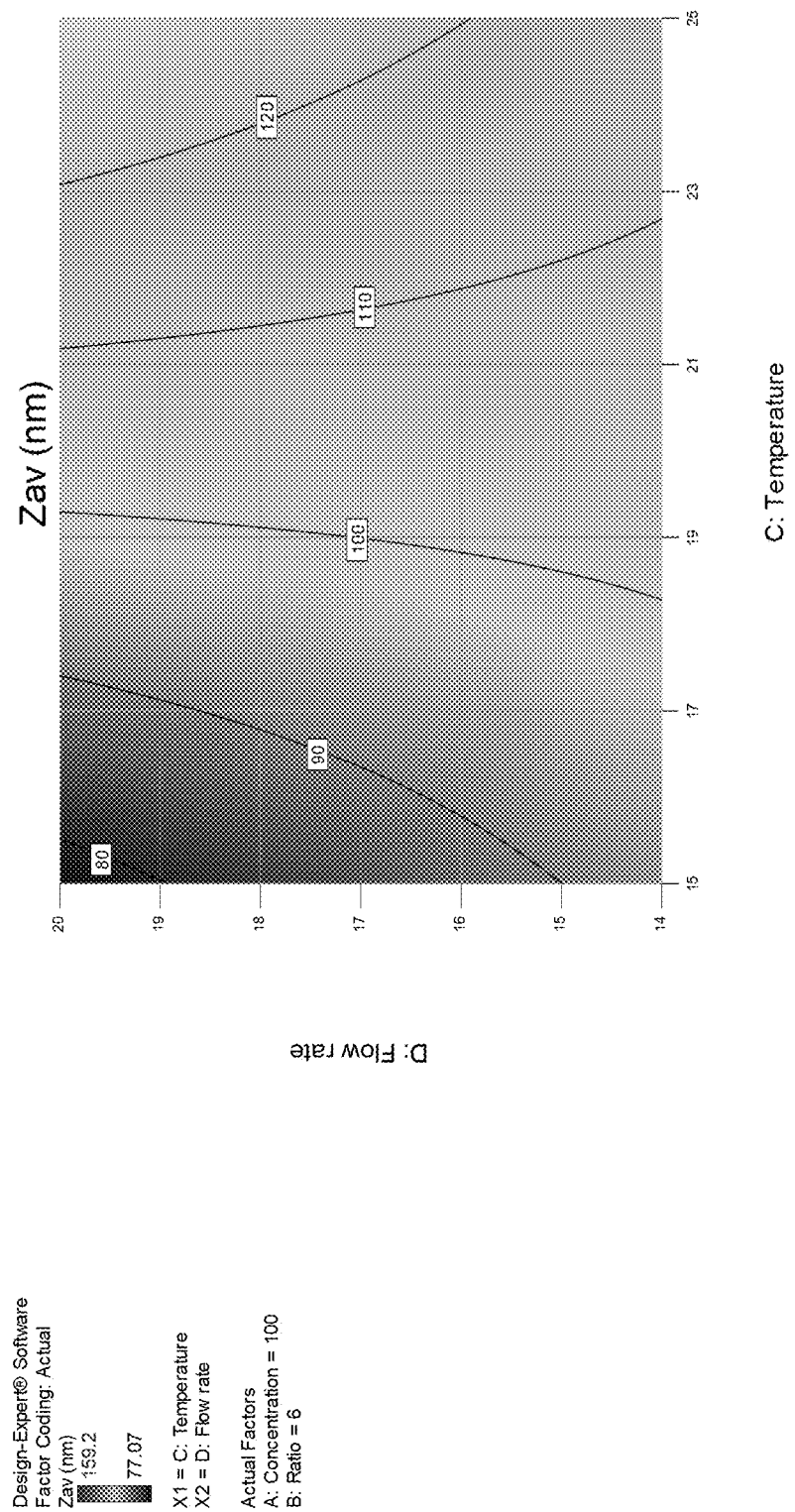
FIG. 16: Prediction of size at 100 mg/ml DOPC and ratio 6 (1:5 organic:aqueous phases)
Figure 17:
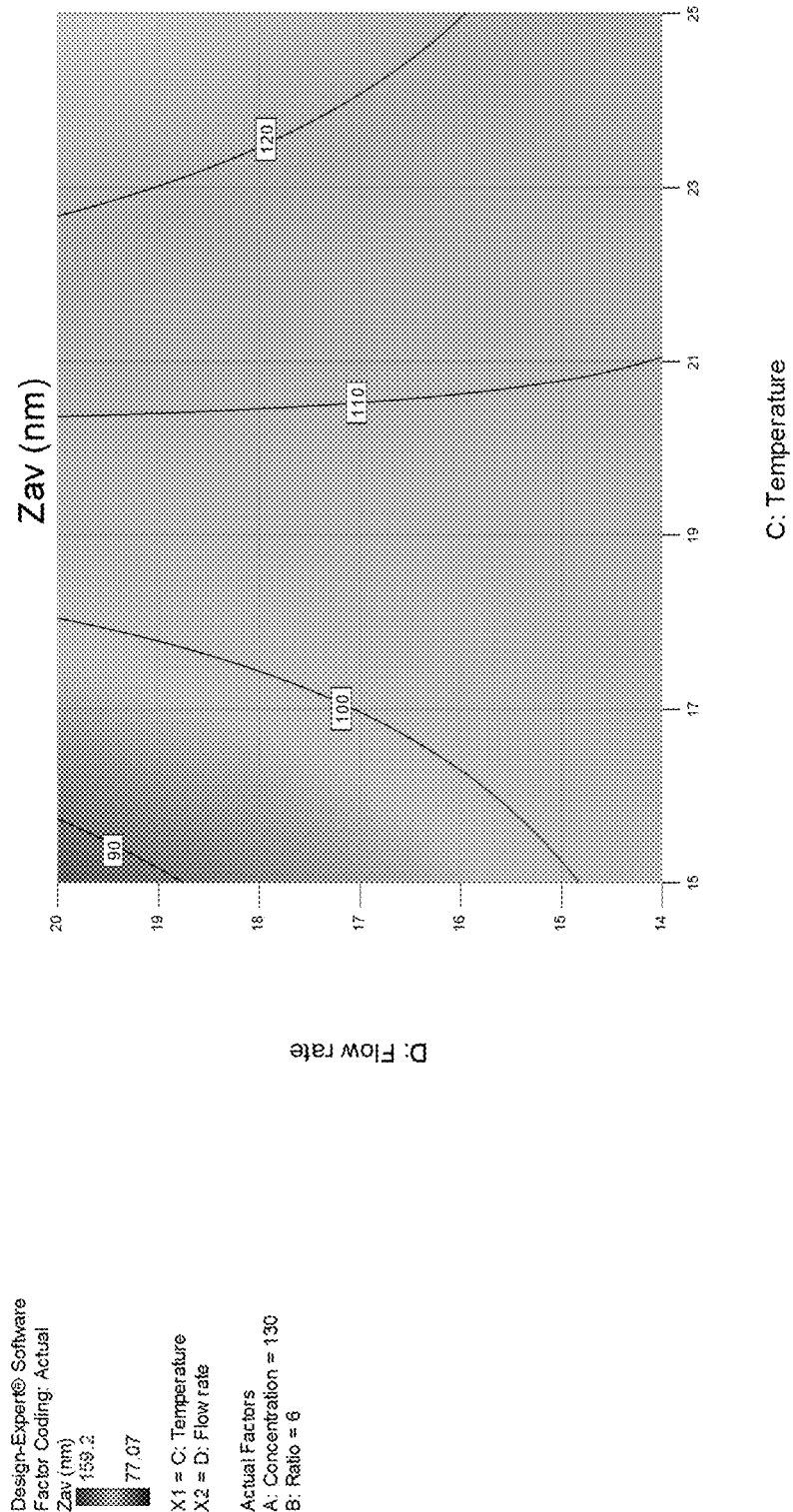
FIG. 17: Prediction of size at 130 mg/ml DOPC and ratio 6 (1:5 organic:aqueous phases)
Figure 18:
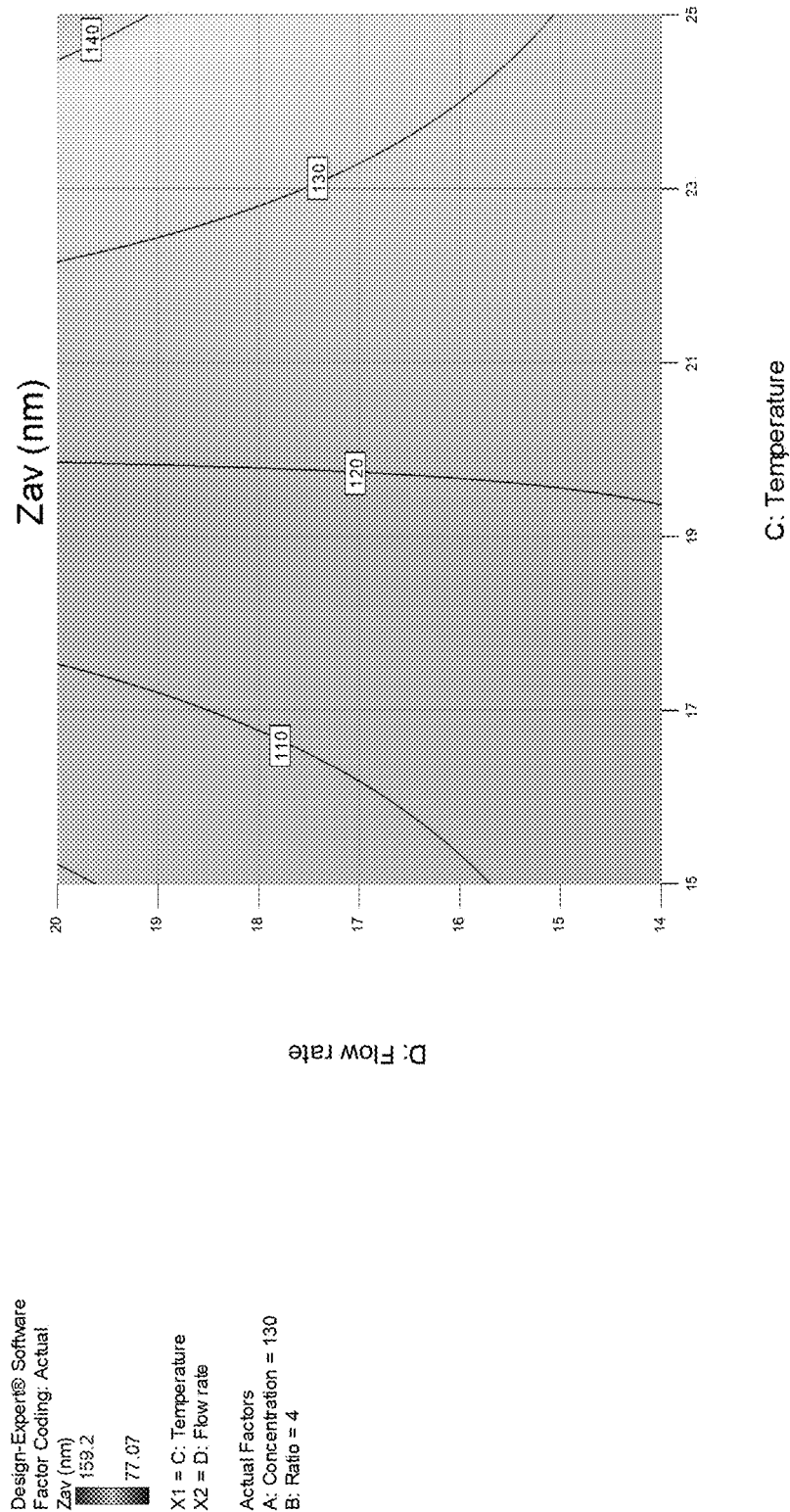
FIG. 18: Prediction of size at 130 mg/ml DOPC and ratio 4 (1:3 organic:aqueous phases)
Figure 19:
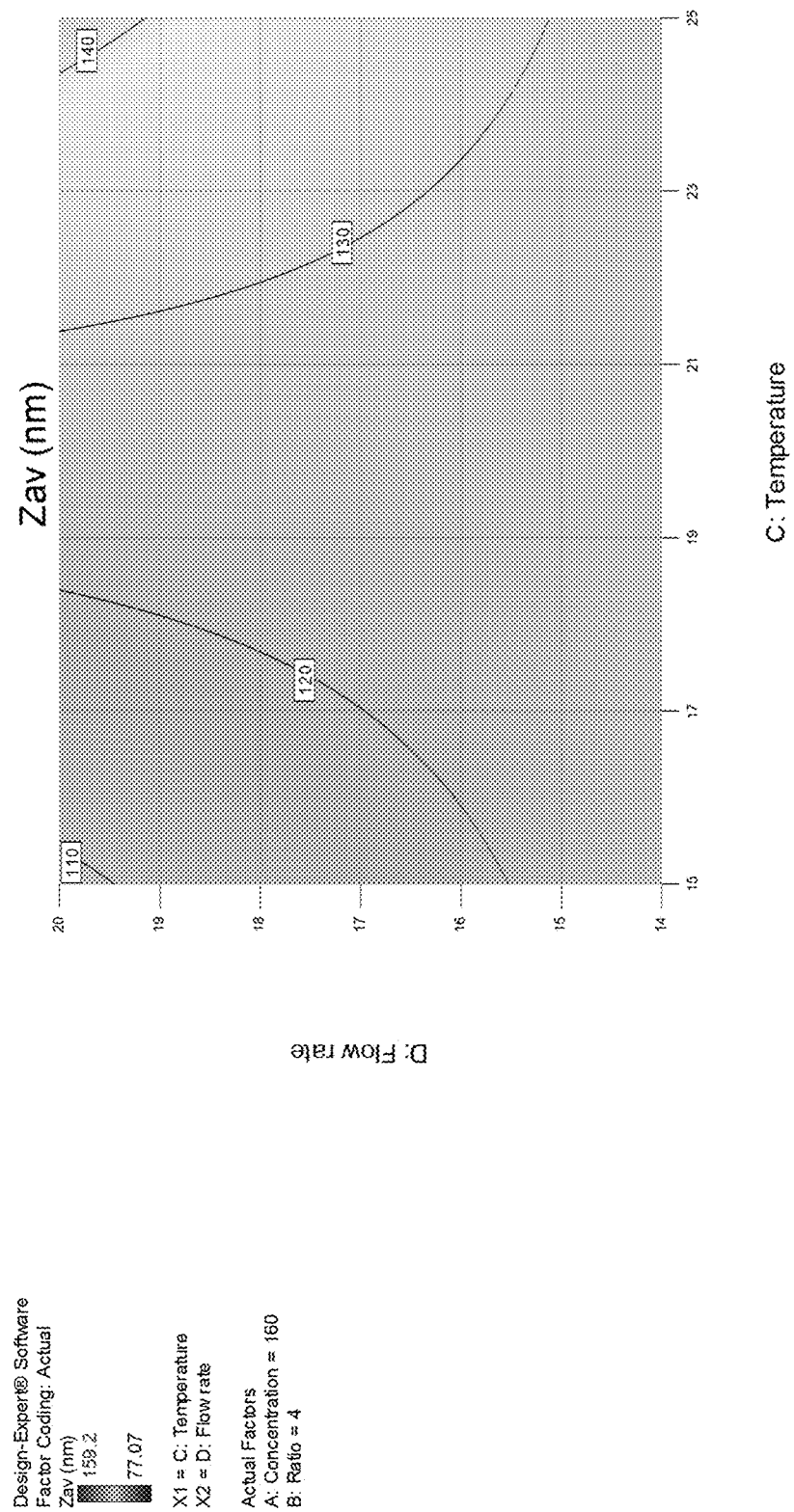
FIG. 19: Prediction of size at 160 mg/ml DOPC and ratio 4 (1:3 organic:aqueous phases)
Figure 20:
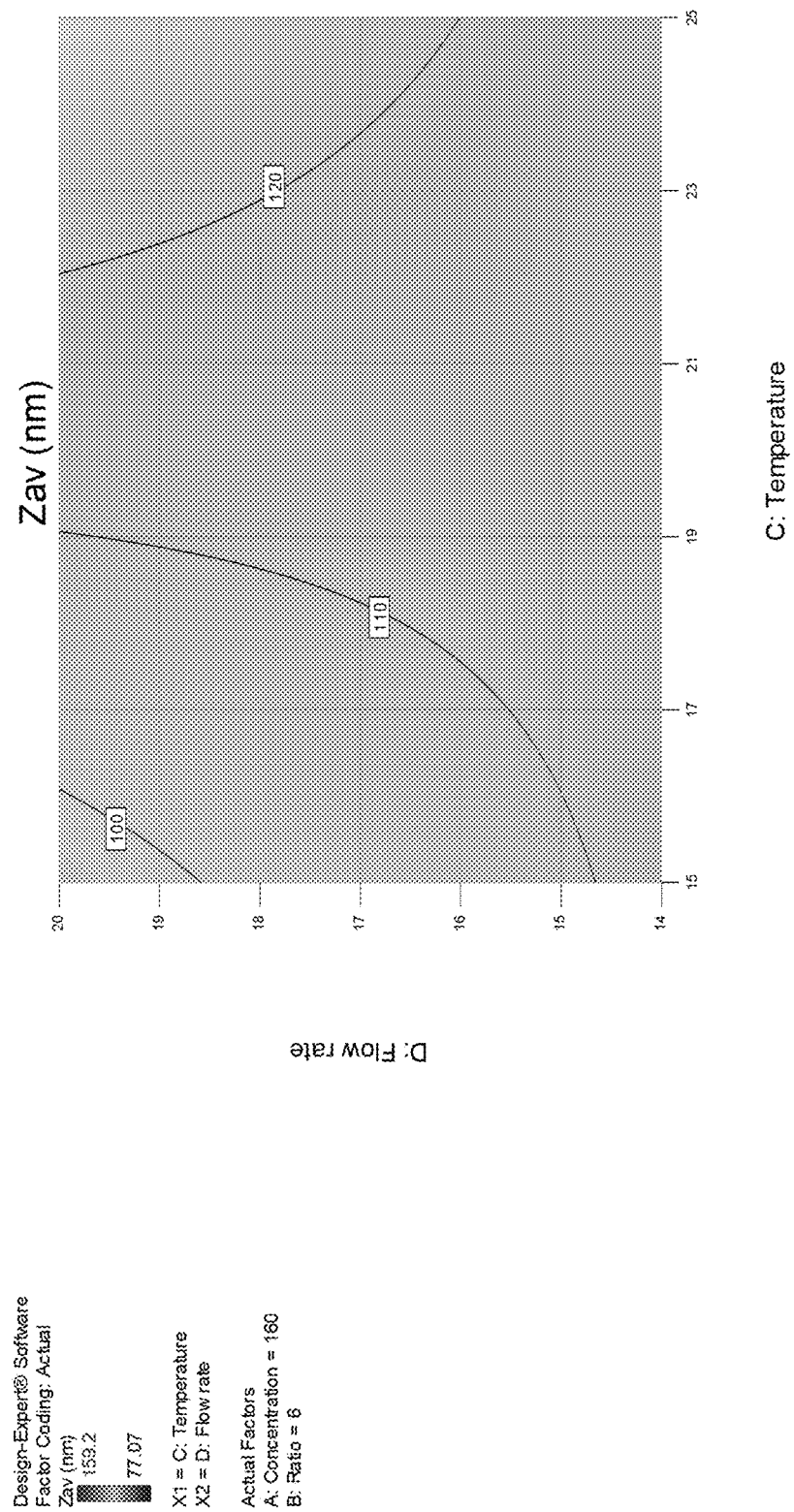
FIG. 20: Prediction of size at 160 mg/ml DOPC and ratio 6 (1:5 organic:aqueous phases)

No reliable prediction model for Pdl could be fit on the data, but significant correlation with Zav (correlation coefficient of 0.75). Zav<110 nM, yields Pdl<0.2 in 0.95 of the cases. The relationship between Zav and Pdl is illustrated in FIG. 11.

Modelling of Zav

Some significant effects of the different factors studied were observed, and a clear co-effect of concentration and temperature as well as temperature and flow rate.

Adj $R^2$=0.80

Pred $R^2$ 0.73

Other effects are considered as non-significant (p-value >5%)

TABLE 4 p-value for the parameters studied and cross-effect

| Factor | P-value |
|---|---|
| Concentration (A) | 0.008308 |
| Flow rate ratio (B) | 0.000998 |
| Temperature (C) | <0.0001 |
| Flow rate (D) | 0.957301 |
| Concentration and Temperature (AC) | 0.008791 |
| Temperature and flow rate (CD) | 0.000151 |
| Ratio squared (13 ^ 2) | <0.0001 |

FIGS. 12 to 20 represent the prediction of the Zav response at different fixed factors using the created model.

Confirmation of Model

Figure 21:
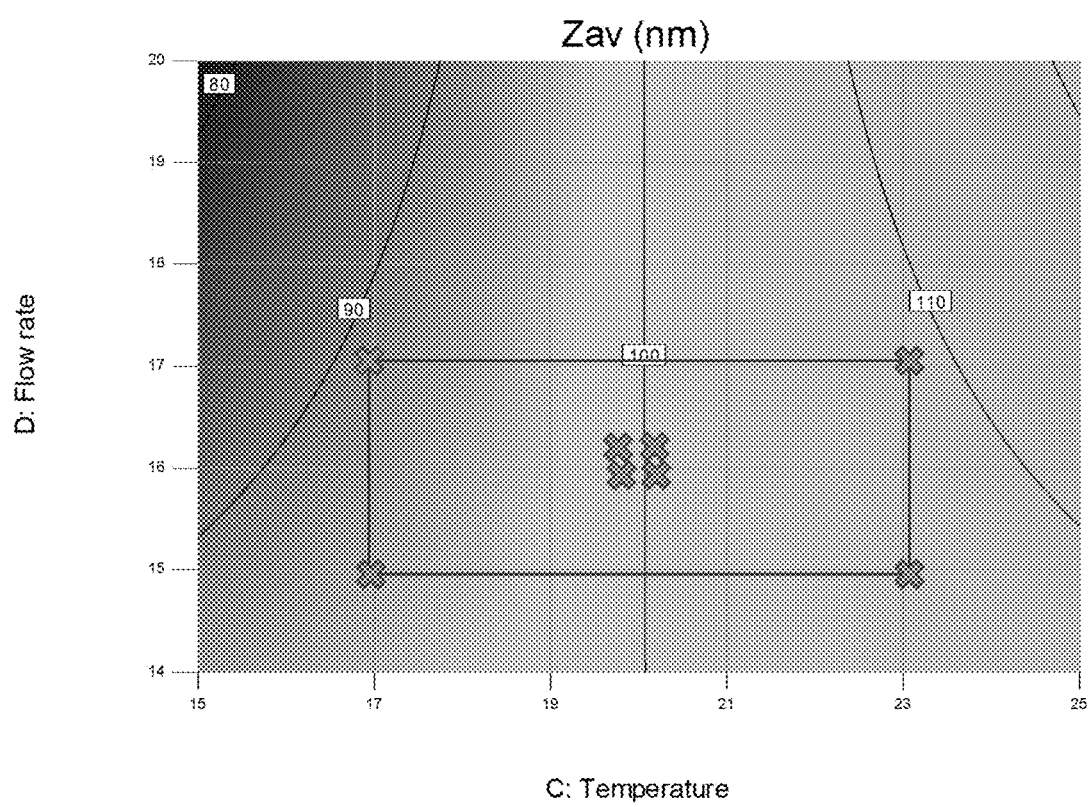
FIG. 21: Confirmation conditions tested at 130 mg/ml DOPC and ratio 5 (1:4 organic:aqueous phases)

As shown in FIG. 21, eight confirmatory runs were undertaken to test the capability of the model (all runs at 130 mg/ml DOPC and flow rate ratio of 5 (1:4 organic:aqueous).

The obtained results are in good agreement with the model, with all results falling in the expected range of 90-111 nm.

TABLE 5

Confirmation results

| Run | Temperature (° C.) | Total flow rate (ml/min) | Zav (nm) Predicted | Zav (nm) Measured | PdI |
|---|---|---|---|---|---|
| 1 | 23 | 15 | 105 | 101 | 0.188 |
| 2 | 23 | 17 | 108 | 104 | 0.187 |
| 3 | 20 | 16 | 100 | 98 | 0.185 |
| 4 | 20 | 16 | 100 | 99 | 0.196 |
| 5 | 17 | 15 | 94 | 97 | 0.168 |
| 6 | 17 | 17 | 91 | 89 | 0.160 |
| 7 | 20 | 16 | 100 | 96 | 0.173 |
| 8 | 20 | 16 | 100 | 95 | 0.176 |

Conclusion

To optimise the process in terms of temperature, run time and harvest volume, a ratio of 1:4 (organic: aqueous) with a DOPC concentration of around 130 mg/ml, flow rate between 14 and 17 ml/min and temperature between 16 and 25° C. appears best for obtaining liposomes in the region of 95-120 nm (i.e. around 100 nm).

Specific parameters are 130 mg/ml DOPC in 80:20 ethanol:IPA, flow rate ratio 1:4 (organic:aqueous), total flow rate 16 ml/min and temperature 20° C.

Table 3 presents the standard deviation (SD) and CV for Zav and Pdl. It shows very low CV representing a good repeatability.

Example 4: Adaptive Immune Responses

Method

Adjuvant Preparation

Liposomes were prepared using the single mixing chamber apparatus described previously. Organic phase comprising DOPC (120 mg/ml), cholesterol (30 mg/ml) and 3D-MPL (6 mg/ml) in 80/20 ethanol/IPA was mixed with aqueous phase containing OS-21 (1.5 mg/ml) in water for injection under conditions of a total flow rate of 18 ml/min and a flow rate ratio of 5 (1:4 organic:aqueous). The organic phase was maintained at 20° C. The aqueous phase was maintained at 15° C.

Solvent was removed by dialysis and the resulting concentrate diluted to provide the final adjuvant preparation.

Vaccination 6-8 week old-female C57Bl6 mice (22/group) were injected twice with a 14-day interval with gE antigen formulated with microfluidic produced liposomes with 3D-MPL and QS-21. A control group of 5 mice received gE with buffer alone.

The final adjuvant preparation was diluted and mixed with gE as necessary to provide the vaccination mixture. Two doses of adjuvant were evaluated (0.4 and 0.1 ug of both 3D-MPL and OS-21 per animal, corresponding to 1/125 and 1/500 of a typical 50 ug human dose (HD), respectively). Each animal received 5 ug of gE. The injection volume was 20 ul.

Spleen and sera were collected and analysed for T and B cell responses, respectively, 7 days post the second immunisation (day 21).

ICS (Intracellular Cytokine Staining)

Spleens were collected in RPMI medium and dissociated using a potter tissue grinder (homogenizer) using two up and down strokes. Homogenized samples were transferred to 50 ml polypropylene tubes.

Fibrous material was removed by filtration through a 100 uM nylon cell strainer. Cells were then washed, counted and re-suspended at $10^7$ cells per ml.

ICS is the technology which allows the quantification of antigen specific T lymphocytes on the basis of cytokine production.

Lymphoid cells are re-stimulated overnight (O.N) with in vitro with peptides gE or medium in the presence of a protein transport inhibitor (brefeldin A). These cells are then processed by conventional immunofluorescent procedure using fluorescent antibodies (extracellular staining: CD4, CD8; intracellular staining: TNF-alpha, IFN-gamma and IL2).

Results are expressed as a frequency of cytokine positive cells within CD4 cell populations after subtraction of the medium condition for each mouse. The statistical analysis was done on the population that showed expression of at least two cytokines (IL2, IFN-alpha or TNF-alpha).

ELISA

Anti-gE total IgG were measured by ELISA. 96 well-plates were coated with antigen overnight at 4° C. The plates were then washed and saturated with saturation buffer for 1 hour at 37° C. After, 100 ul of diluted mouse serum or standard or control was added and incubated for 1 h 30 at 37° C. After wash, the plates were incubated for 1 hour at 37° C. with 100 µl anti mouse IgG-Biotinylated. After wash, the plates were incubated for 30 min at 37° C. with 100 ul Streptavidin-POD conjugate. After wash, 100 ul of TMB per well was added and the plates were kept in the dark at room temperature for 15 minutes. To stop the reaction, 100 ul of $H_2SO_4$ 0.4N was added per well. The absorbance was read at a wavelength of 450/630 nm by an Elisa plate reader. Results were calculated using the softmax-pro software.

Results

Liposomes had a diameter of 95.5 nm, PdI of 0.184. The final adjuvant preparation had a DOPC content of 2.2 mg/ml, cholesterol content of 0.58 mg/ml, QS-21 content of 119 ug/ml and 3D-MPL content of 90 ug/ml.

Figure 22:
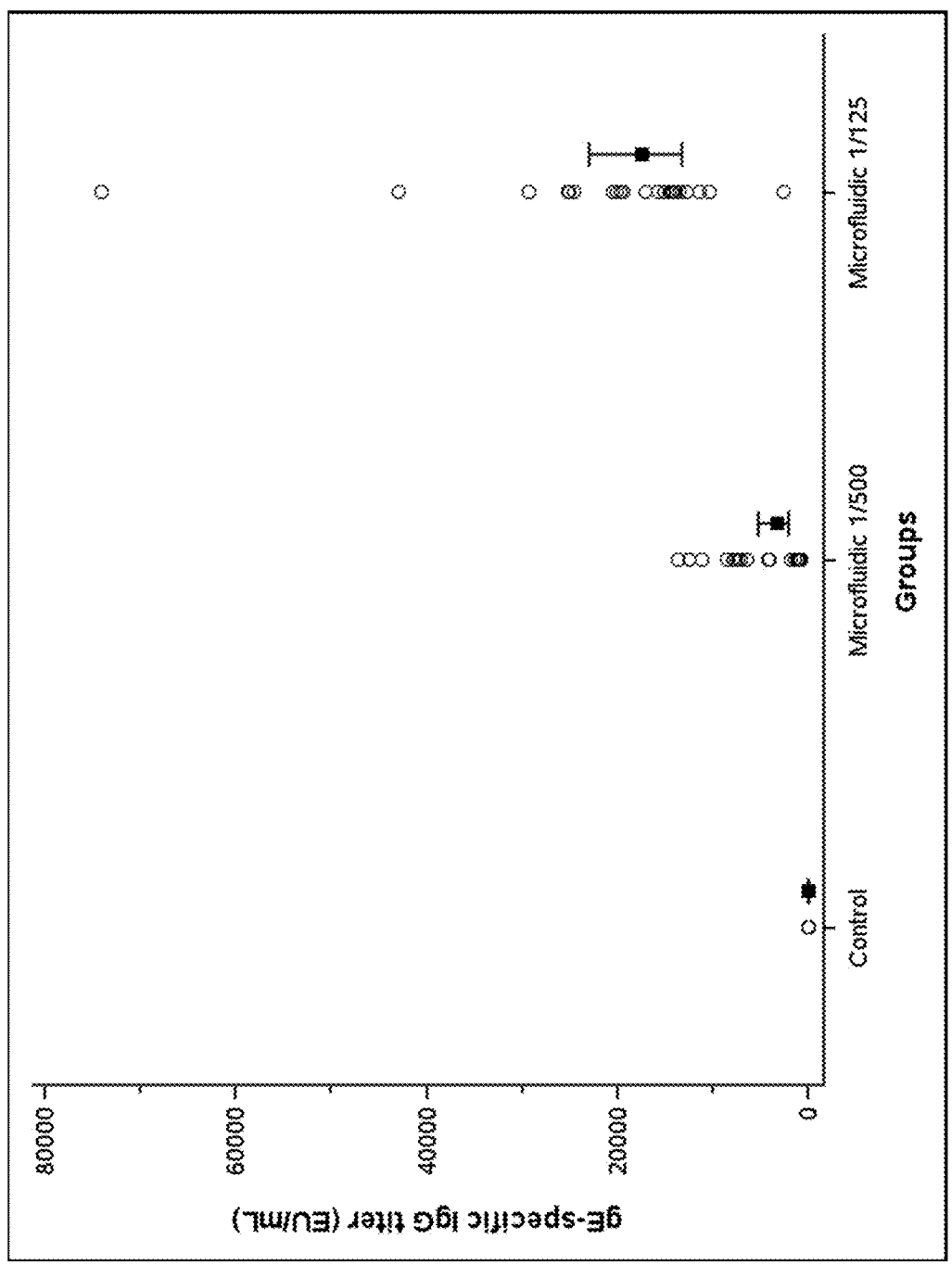
FIG. 22: gE-specific IgG titer
Figure 23:
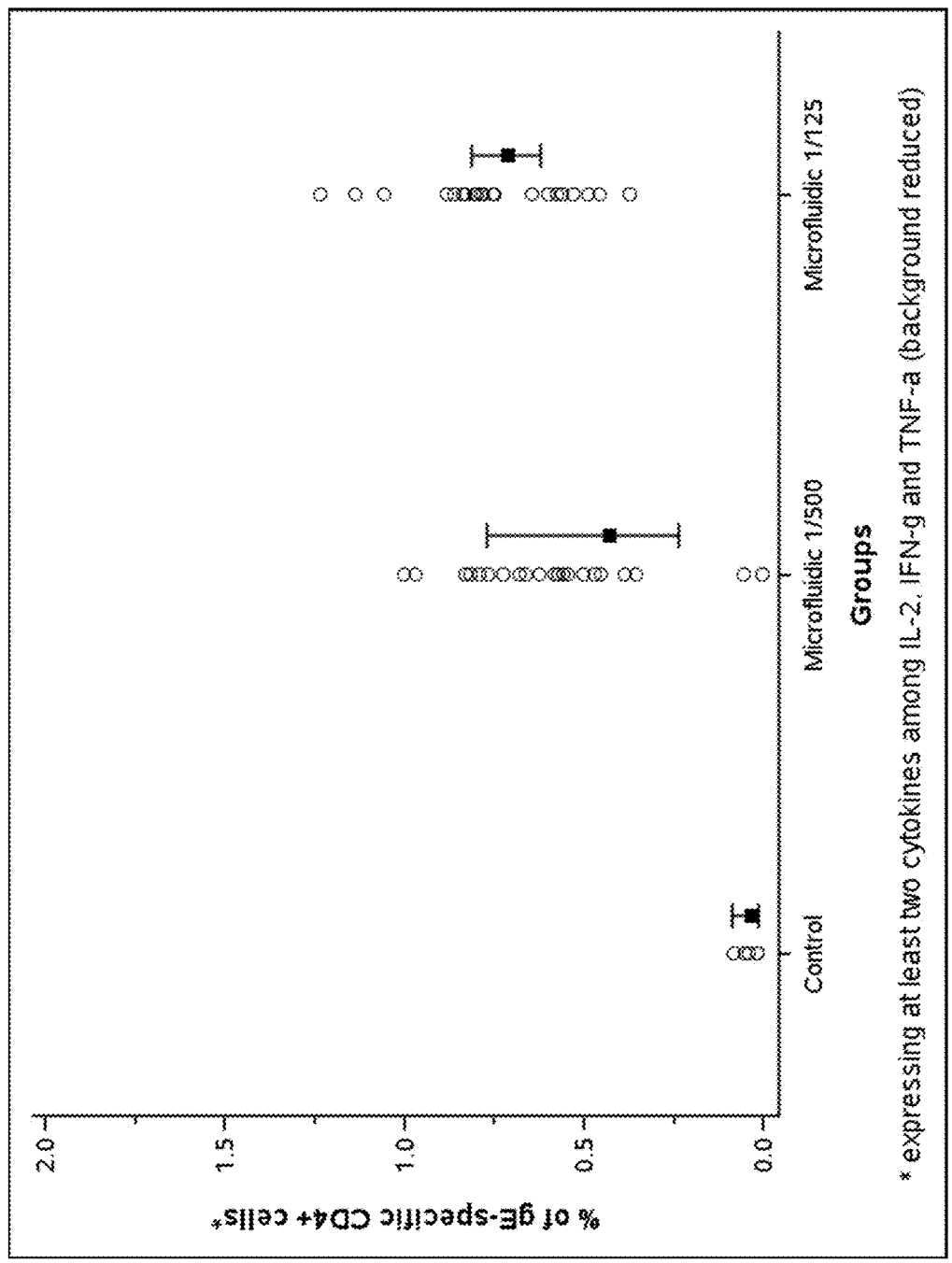
FIG. 23: Percentage of gE-specific CD4+ T cells

ELISA results are shown in FIG. 22 and ICS results in FIG. 23.

Conclusions

Microfluidics-produced liposomes in conjunction with TLR4 agonist and saponin were capable of adjuvanting the cellular and antibody responses to an exemplary antigen.

Example 5: Stability of Microfluidic Liposomes

Liposomes were prepared using the single mixing chamber apparatus described previously. Organic phase comprising DOPC (130 mg/ml), cholesterol (32.5 mg/ml) and 3D-MPL (6.5 mg/ml) in 80/20 ethanol/IPA was mixed with aqueous phase containing QS-21 (1.625 mg/ml) in water for injection under conditions of a total flow rate of 16 ml/min and a flow rate ratio of 5 (1:4 organic:aqueous). The organic phase was maintained at 20° C. The aqueous phase was maintained at 20° C.

Solvent was removed by dialysis and material was sterile filtered.

Figure 24:
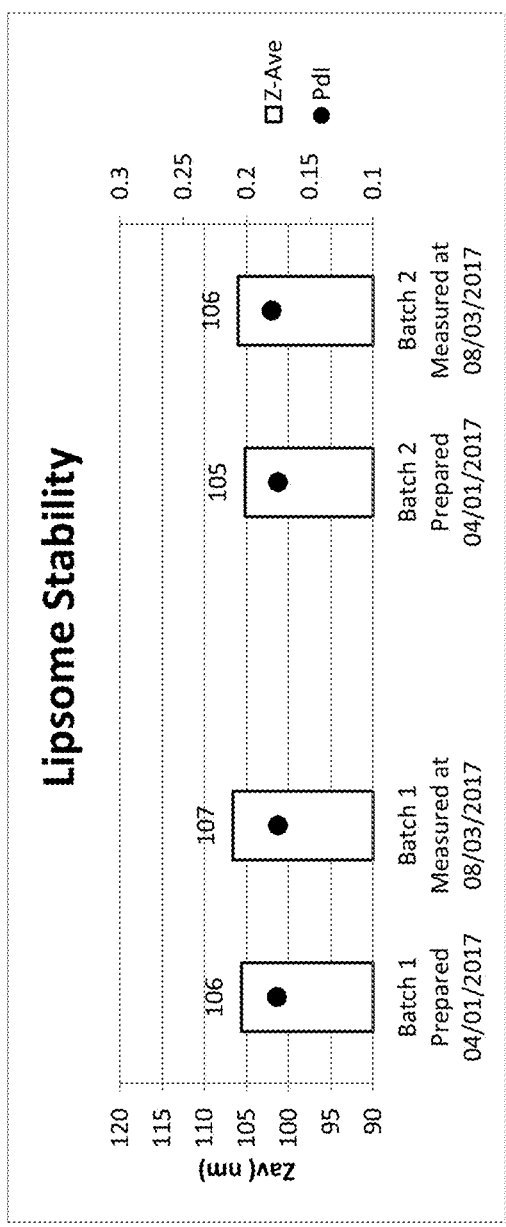
FIG. 24: Microfluidic produced-liposome size and Pdl stability after storage

The results are shown in FIG. 24, indicating that liposomes produced using microfluidics are substantially unchanged after storage for 2 months at 4° C.

Example 6: Upscaling of the Process

Figure 25:
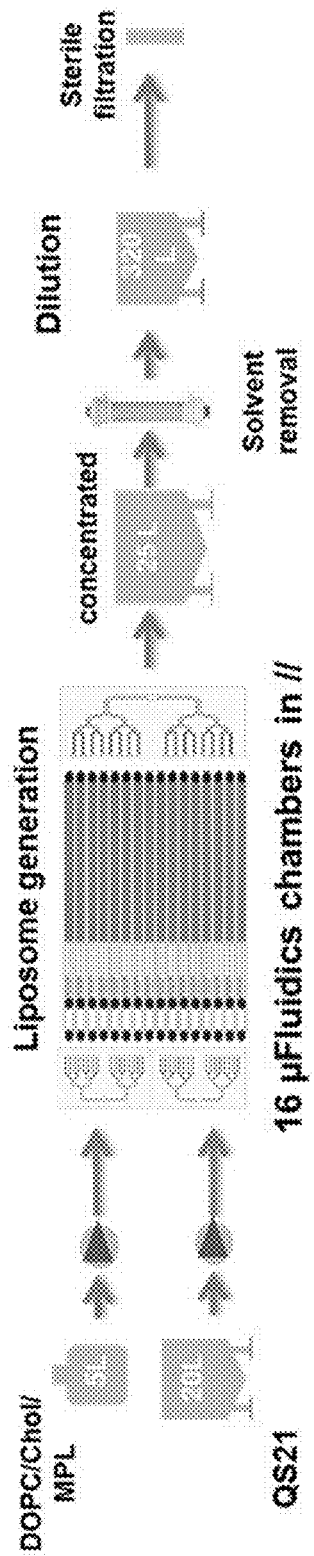
FIG. 25: Schematic of a commercial scale multichamber process

The aim of this example was to test the scaling up of the process in order to produce commercial scale batches of adjuvant using a microfluidic process. A single batch of 320 L of adjuvant was prepared in a production cycle suitable for one working day (FIG. 25). The number of mixing chambers used was 16.

Manifold Evaluation

In order to distribute the organic and aqueous phases into the 16 mixing chambers, the distribution manifold should ideally provide a homogenous flow distribution. Practical limitations mean that perfect distribution is not possible, but excessive variation must be avoided. Excessive variation in flow can lead to lead to inhomogeneity in final product and potentially a product which falls outside target specification.

A theoretical estimation of the component content in the final product was calculated depending on variations in the flow distribution. Table 6 shows that variations below 5% do not substantially affect the component content in the final product which stay in the target specification range.

Above 6% variation, the content of 3D-MPL is close to the upper acceptable boundary and exceeds this boundary with further increases in the percentage of variation.

TABLE 6

Expected component content in the final product with variation of flow rate

| | | ml/min | | | | Final Quantity (mg/ml) | | | |
|---|---|---|---|---|---|---|---|---|---|
| % Var | % (Aq-Org) | ml/min Aq | ml/min Org | Ratio | Total Flow | DOPC | Chol | 3D-MPL | QS21 |
| 0 | 100-100 | 12.8 | 3.2 | 5.00 | 16 | 2.0 | 0.50 | 0.100 | 0.100 |
| 2 | 102-98 | 13.06 | 3.14 | 5.16 | 16.2 | 1.9 | 0.48 | 0.097 | 0.101 |
| 2 | 98-102 | 12.54 | 3.26 | 4.84 | 15.8 | 2.1 | 0.52 | 0.103 | 0.099 |
| 5 | 105-95 | 13.44 | 3.04 | 5.42 | 16.5 | 1.8 | 0.46 | 0.092 | 0.102 |
| 5 | 95-105 | 12.16 | 3.36 | 4.62 | 15.5 | 2.2 | 0.54 | 0.108 | 0.098 |
| 6 | 106-94 | 13.57 | 3.01 | 5.51 | 16.6 | 1.8 | 0.45 | 0.091 | 0.102 |
| 6 | 94-106 | 12.03 | 3.39 | 4.55 | 15.4 | 2.2 | 0.55 | 0.110 | 0.098 |
| 8 | 108-92 | 13.82 | 2.94 | 5.70 | 16.8 | 1.8 | 0.44 | 0.088 | 0.103 |
| 8 | 92-108 | 11.78 | 3.46 | 4.41 | 15.2 | 2.3 | 0.57 | 0.113 | 0.097 |
| 10 | 110-90 | 14.08 | 2.88 | 5.89 | 17.0 | 1.7 | 0.42 | 0.085 | 0.104 |
| 10 | 90-110 | 11.52 | 3.52 | 4.27 | 15.0 | 2.3 | 0.59 | 0.117 | 0.096 |

Procedure Applied for Manifold Testing

Figure 26:
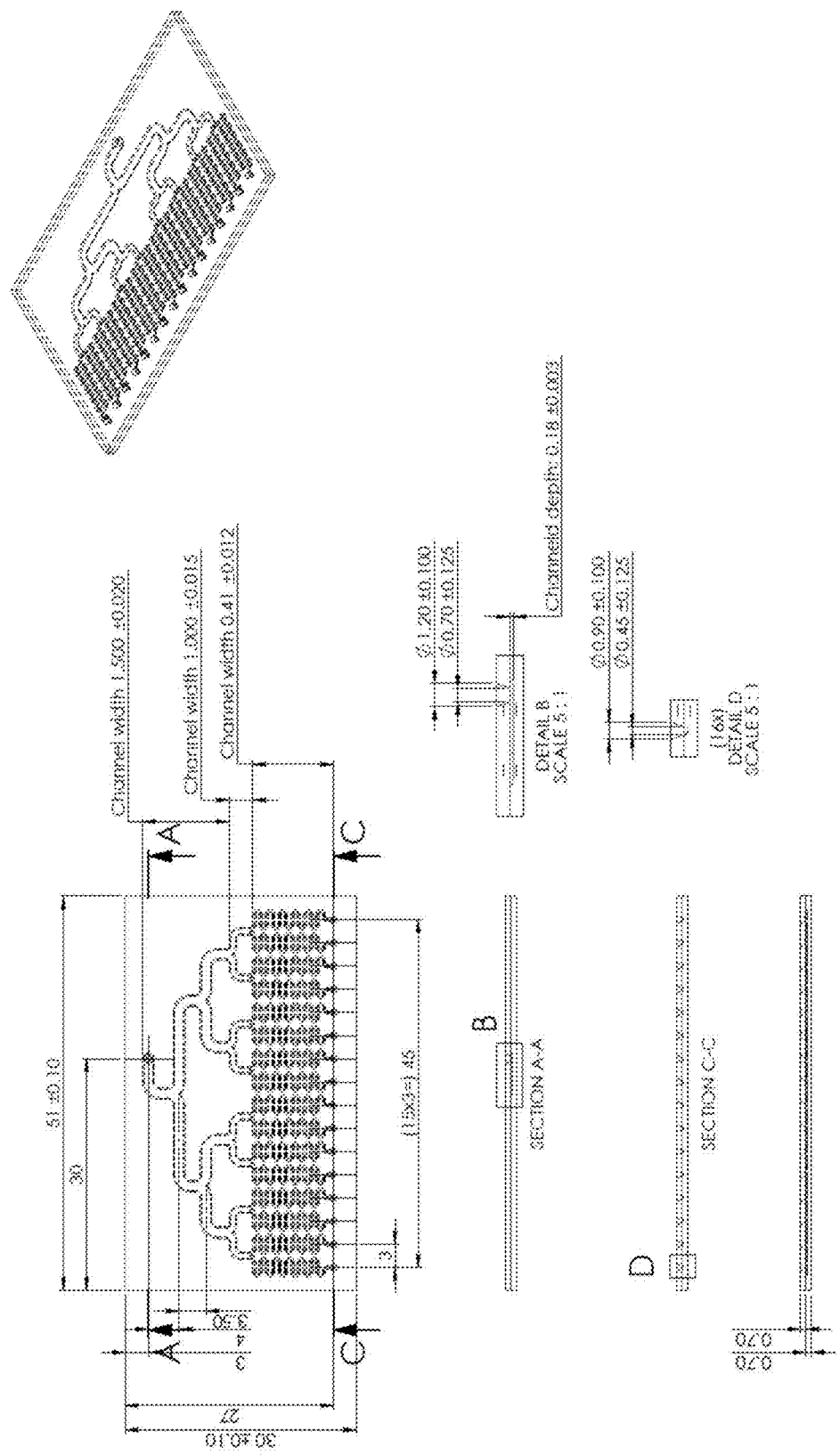
FIG. 26: Schematic of initial manifold design
Figure 27:
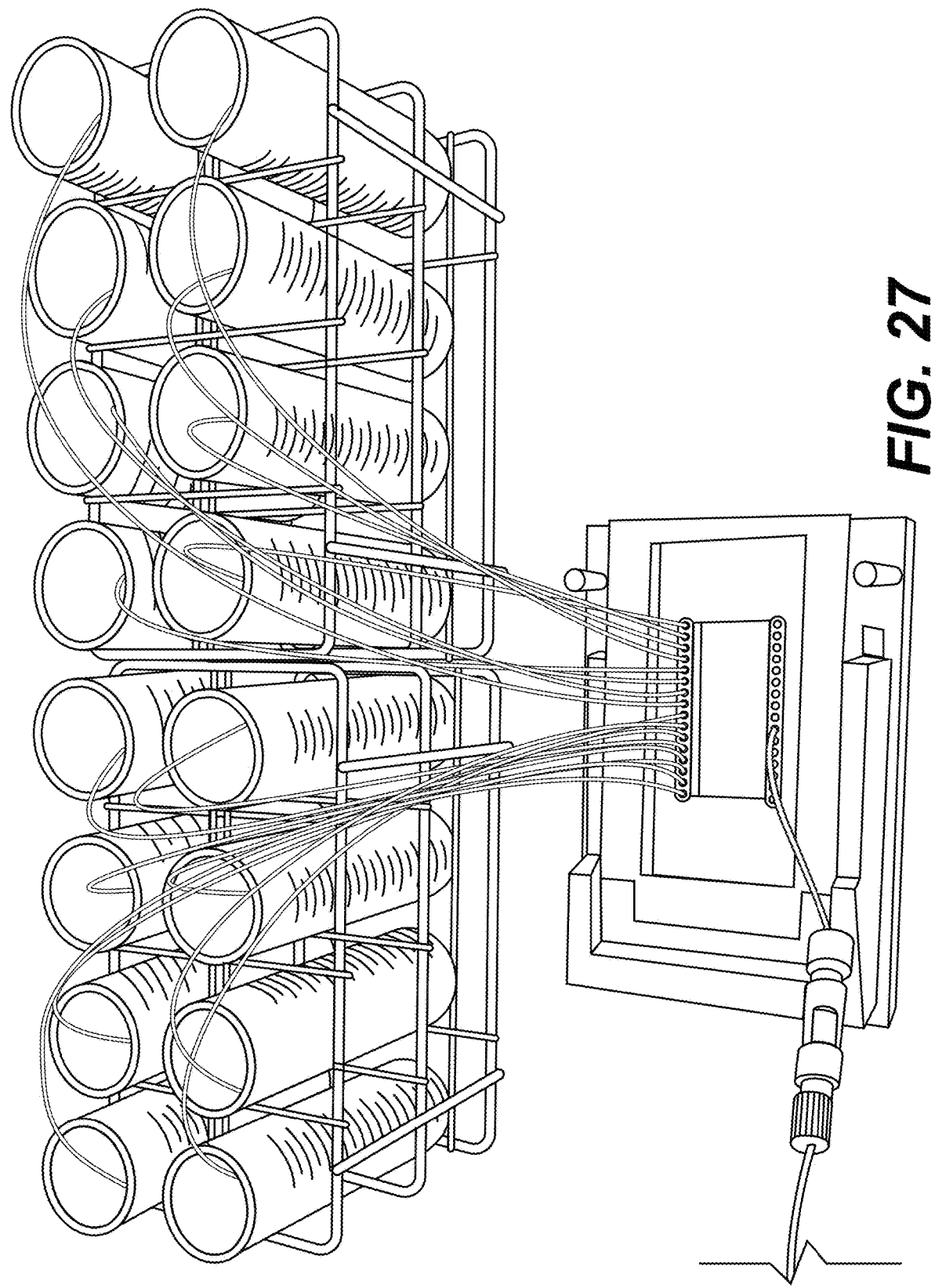
FIG. 27: Photograph of setup for testing of the initial manifold

The inlet of an initial manifold design (FIG. 26) was connected to ISCO pumps filled with water. At each of the 16 exits of the manifold 20 cm of ETFE (Ethylene tetrafluoroethylene) tubing (1/16", 0.04" ID) was connected and placed into a 50 ml Falcon™ tube (FIG. 27). Each Falcon™ tube was weighed before the experiment. Tubing (inlet & exit) and the manifold were then filled with water to eliminate air bubbles.

The system was run for 2 min at ~200 ml/min total flow rate. After the 2 min period, each Falcon™ tube was weighed to calculate the exact mass of water delivered. The % of flow variation was calculated: weight of channel X (1 to 16) divided by the measured average weight.

Figure 28:
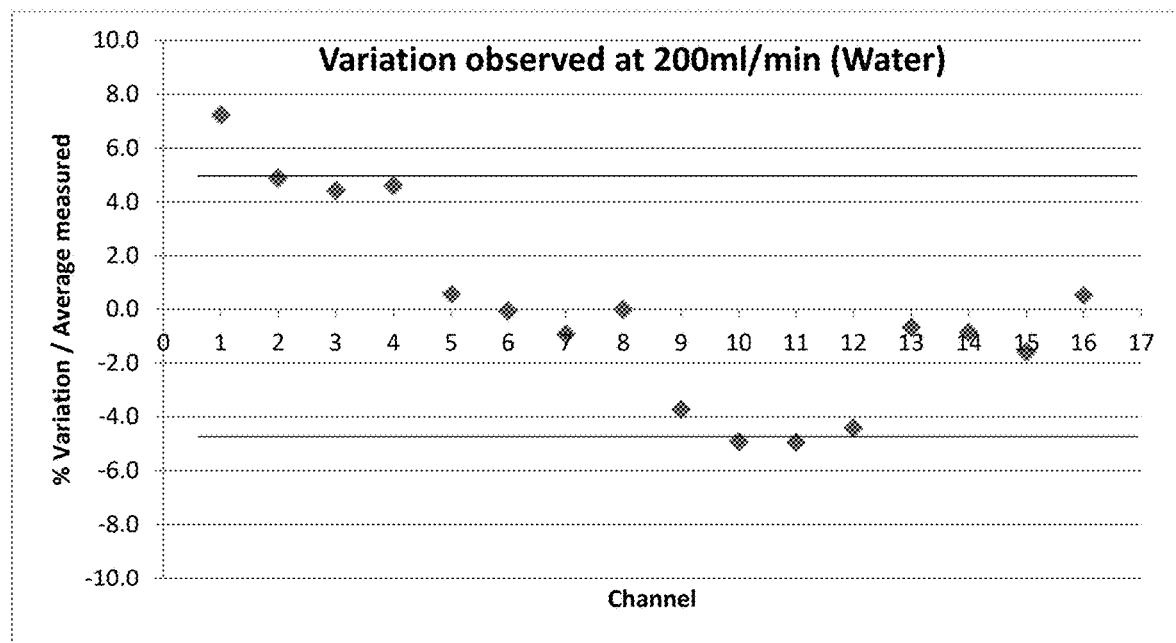
FIG. 28: Observed flow rate variation for initial manifold at 200 ml/min
Figure 29:
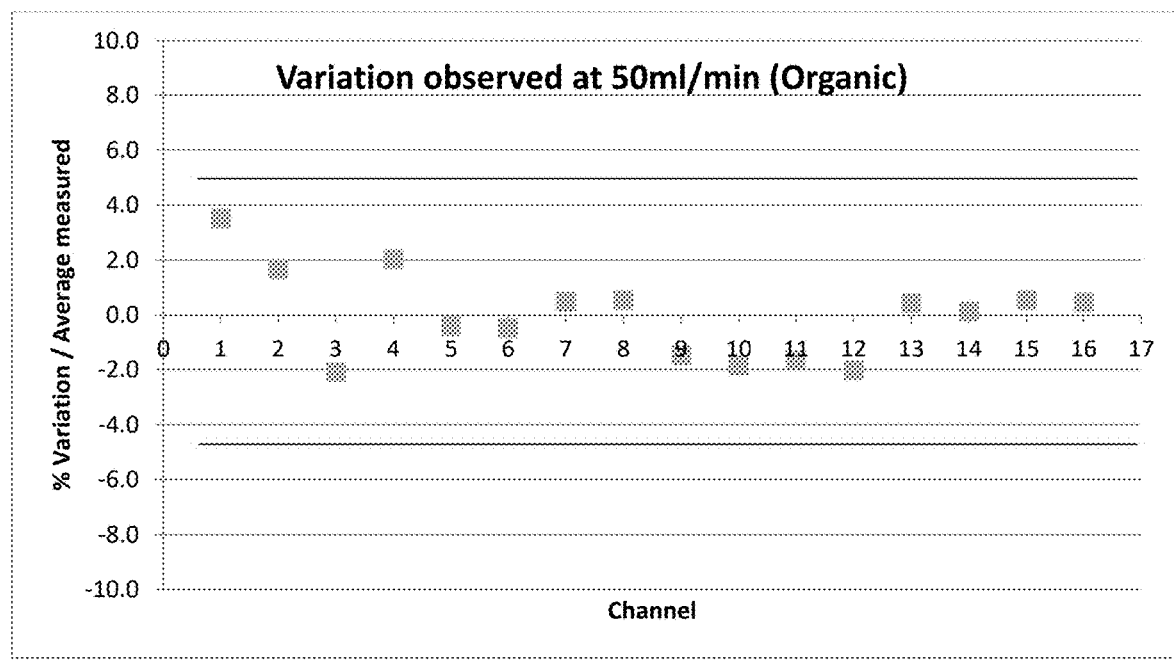
FIG. 29: Observed flow rate variation for initial manifold at 50 ml/min

The initial manifold was tested at 200 ml/min with water and also at 50 ml/min with a mix of ethanol and isopropanol. Results (FIG. 28 & FIG. 29) show the variation across the channels: at a high total flow rate (~200 ml/min), one was above the acceptable variation limit of 5% (Channel 1) but others were close to this limit (Channels 2, 3, 4, 9, 10, 11 and 12). For the lowest flow rate (~50 ml/min) the variation is below 5% but shows the same general trend.

Figure 30:
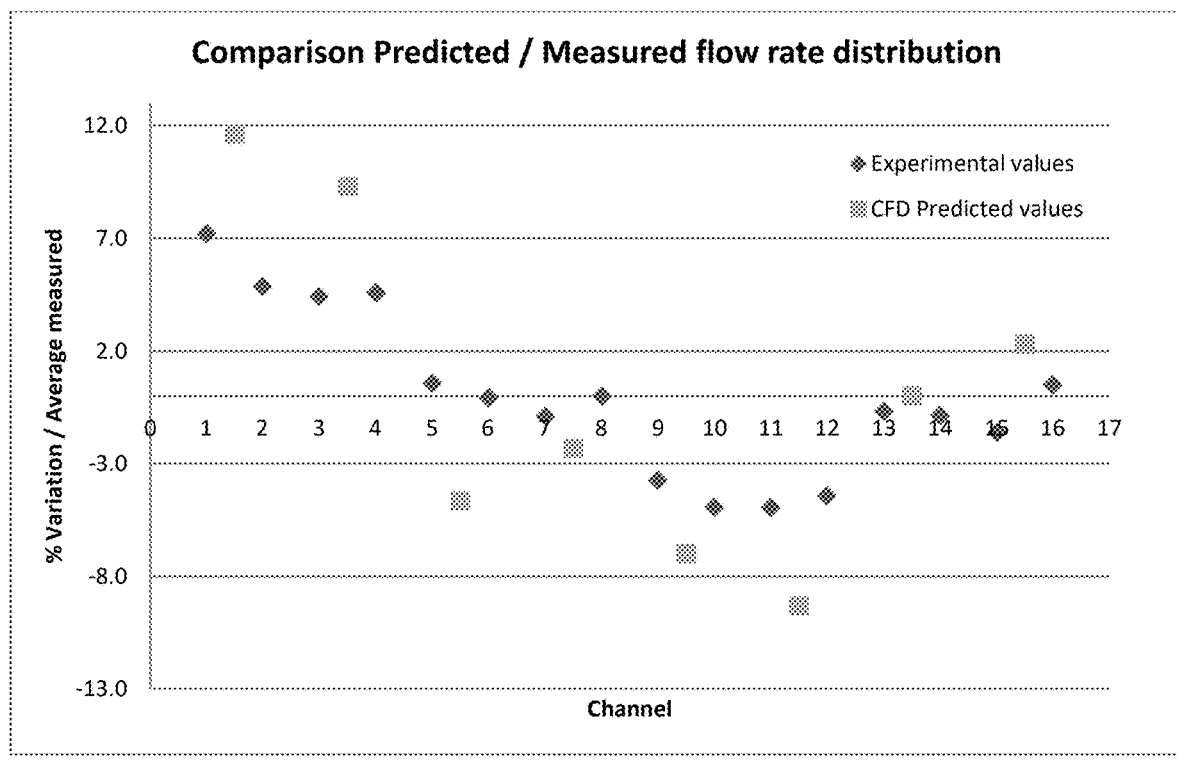
FIG. 30: Graph comparing the predicted values and the measured values of flow rate distribution

Following those results, CFD (Computational fluid dynamics) analysis was performed to predict the flow distribution along each segment of the manifold. The analysis showed that the initial elbow was inducing flow rate differences in the subsequent branches. These differences remained along the final branches. The predicted variation was plotted against the observed experimental values (from 200 ml/min testing) and shows the same general trends (FIG. 30).

The experimental finding for the first manifold that it was not able to distribute with desired homogeneity was confirmed with the CFD analysis.

Figure 31:
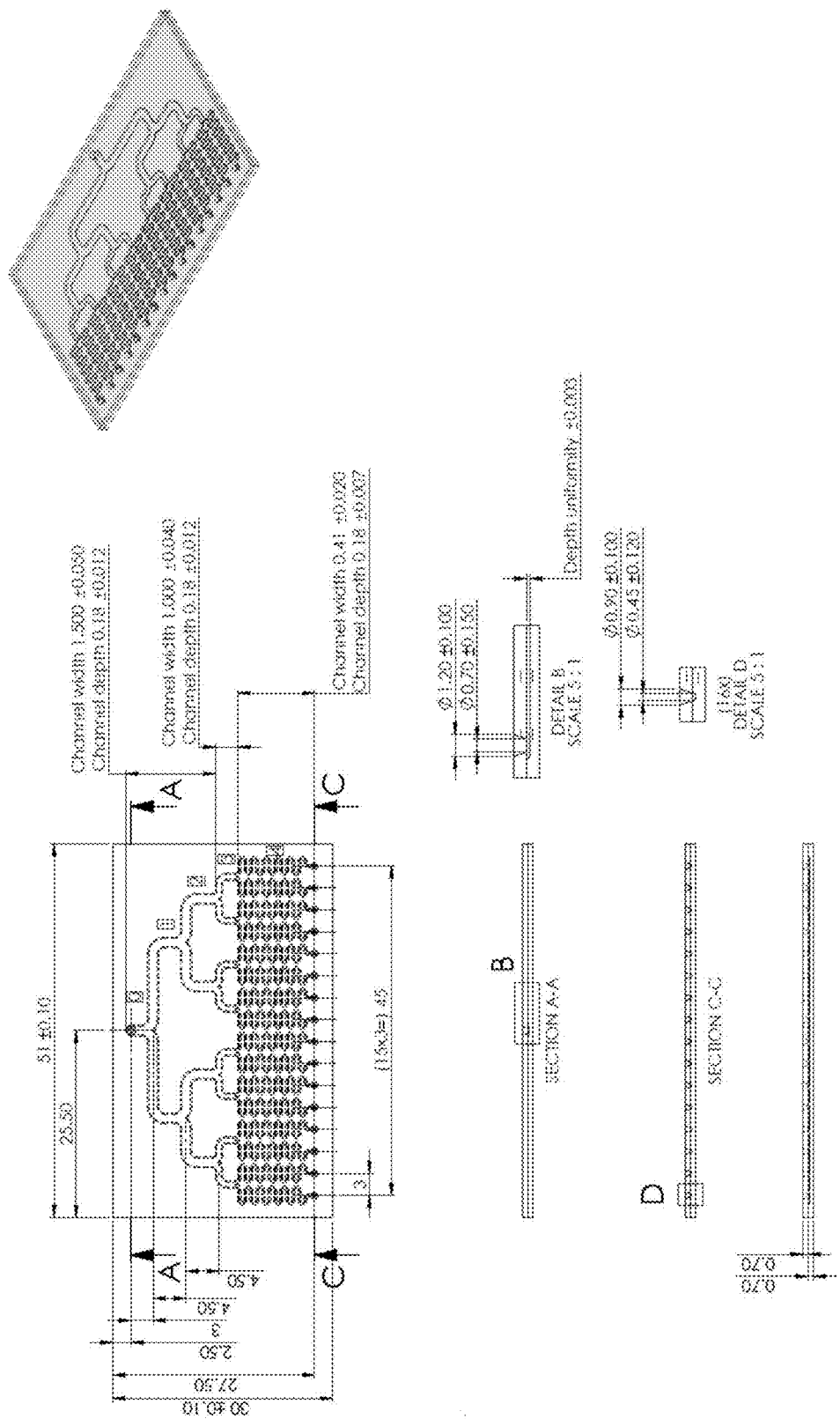
FIG. 31: Schematic of improved manifold design

Following these results, CFD was used as a tool to support the design of an improved second generation manifold (FIG. 31). Investigations led to removal of the initial elbow, shortening of first channel length, increasing the second and third channel lengths. Under these circumstances the velocity profile is more constant and circulations zones were removed almost completely.

Test of Improved Manifold

Figure 32:
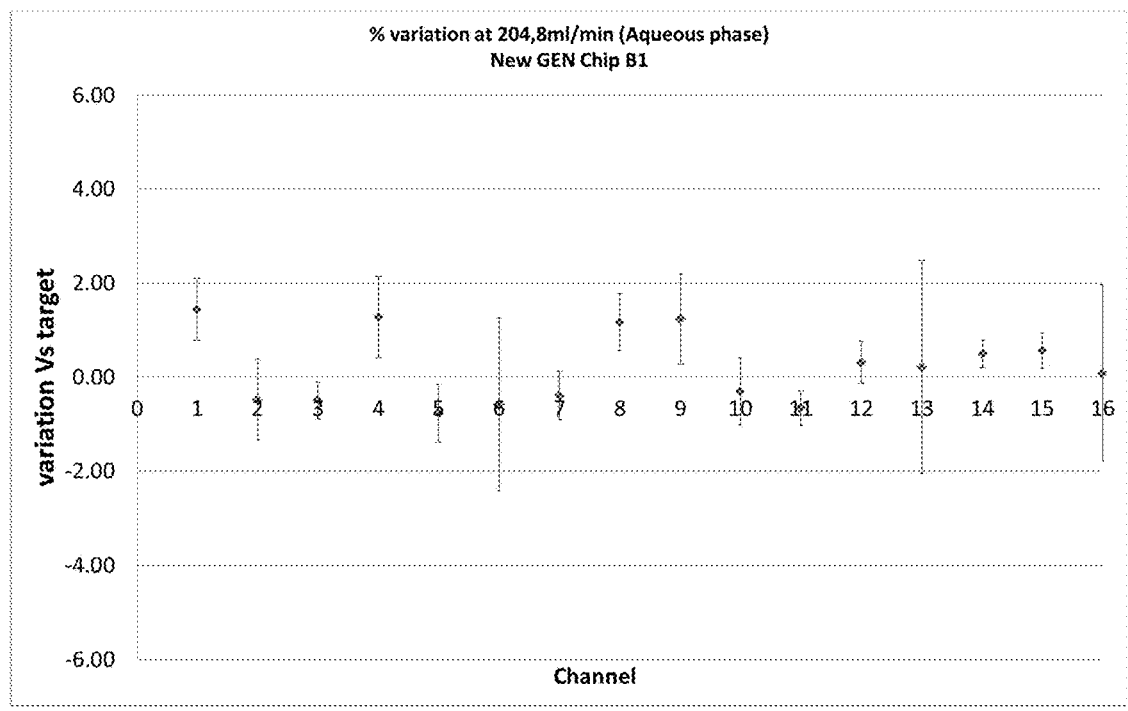
FIG. 32: Flow rate variation from average by each channel for improved manifold unit 1 ('B1')
Figure 33:
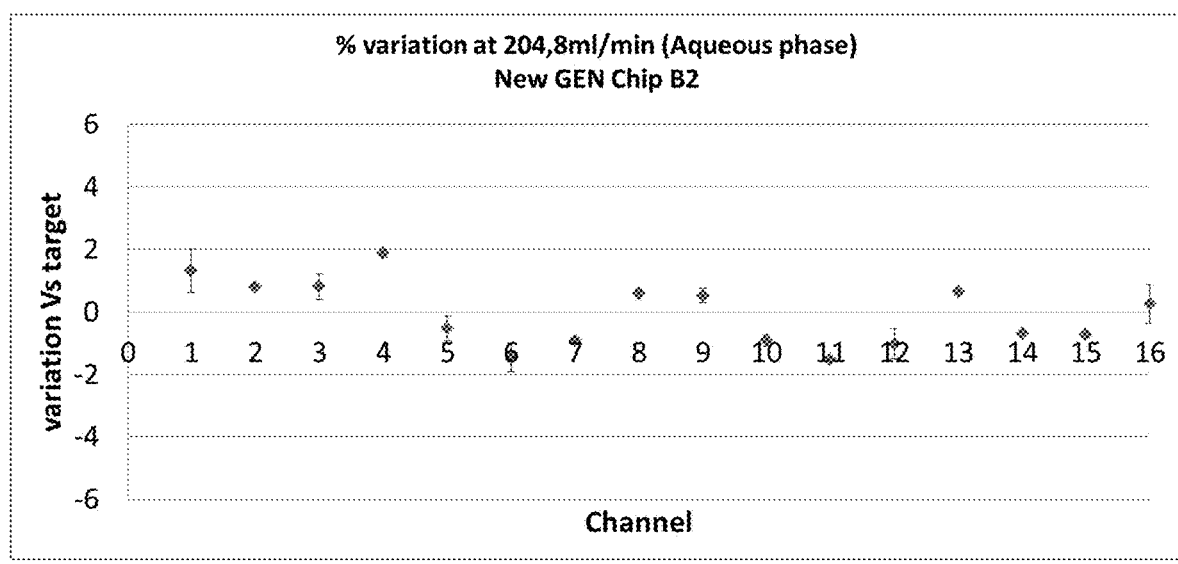
FIG. 33: Flow rate variation from average by each channel for improved manifold unit 2 ('B2')
Figure 34:
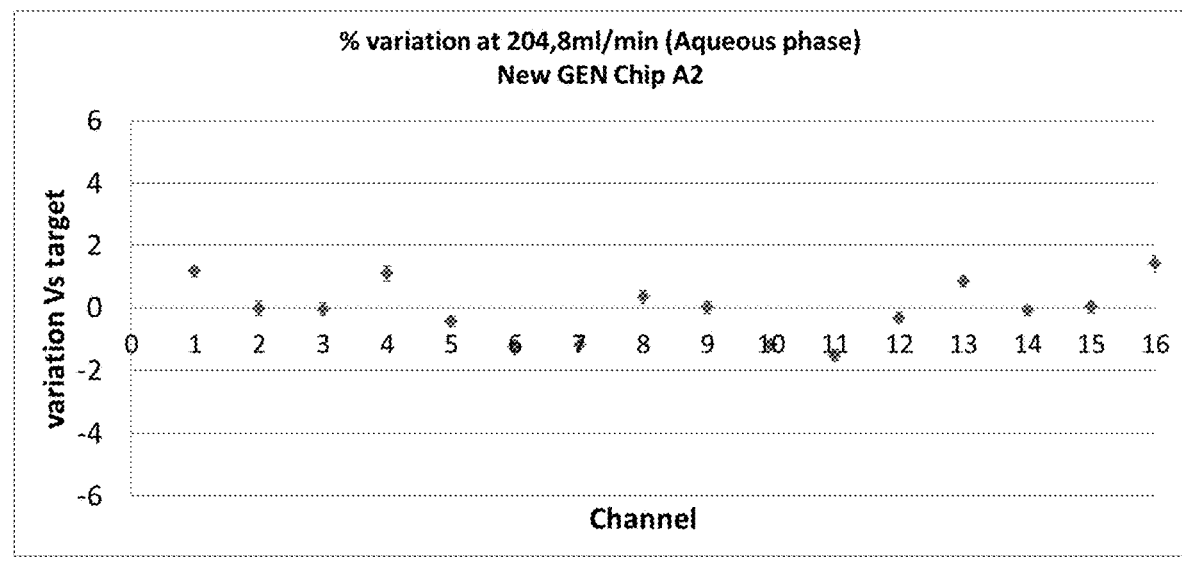
FIG. 34: Flow rate variation from average by each channel for improved manifold unit 3 ('A2')

The second manifold was tested with a similar procedure (12.8 ml/min/channel=204.8 total flow rate) and reproduced three times on each of three manifolds (designated B1, B2 and A2). FIGS. 32-34 show the experimental results obtained. In all cases the variation of individual channels was below the desired limit of 5%, in many cases the variation in measured flow rate was less than 2% from the average.

Liposome Production

Using the improved manifold, an experiment was performed to confirm that liposomes with the same profile as those produced with a single mixing chamber could be produced at commercial scale.

For the experiments, ISCO 1000D & 500D pumps were used in tandem. Only one cylinder of each pump was used, due to the limited run time. The pump heating jacket was connected to a waterbath (Julabo F33), one waterbath per pump. The control of the temperature was monitored using certified probes.

Two improved manifolds were connected to each pump at the inlet and to 2 microchips containing 8 mixing chambers each to provide a total of 16 mixing chambers in parallel. Tubing used was ETFE 1/16 0.04" ID, 29.5 cm in length. 29.5 cm of ETFE tubing (1/16 0.02" ID) was connected at the exit of each mixing chamber. The temperature of the prototype was not controlled directly but the apparatus was placed into controlled temperature area (at 20° C.) and allowed to acclimatise before any experiment.

The pumps were rinsed twice and emptied before filling with the appropriate organic (DOPC at 130 mg/ml, Cholesterol at 32.5 mg/ml solubilized in 80/20 Ethanol/Isopropanol) and aqueous phases (water for injection). The pumps were then primed to eliminate air in the system before connection to the distribution manifolds. Flow rates were set at 51.2 ml/min for the organic phase and 204.8 ml/min for the aqueous phase. When the system was primed and clear of air the first 2 ml from each chamber was discarded and the outlet of each chamber then harvested in in 16 separate containers (run time <30 seconds). 500 ul of product from each channel were pooled and subjected to DLS measurement after dilution 130× in PBS at pH 6.1.

After the run was performed on the multichambered prototype, the tubing from the pumps was disconnected from the multichambered prototype and connected to one mixing chamber. Flow rates were adapted to organic 3.2 ml/min and aqueous 12.8 ml/min. When the system was stabilized (no air), the first 2 ml exiting the mixing chamber was discarded and the subsequent ~2 ml harvested.ml).

Figure 35:
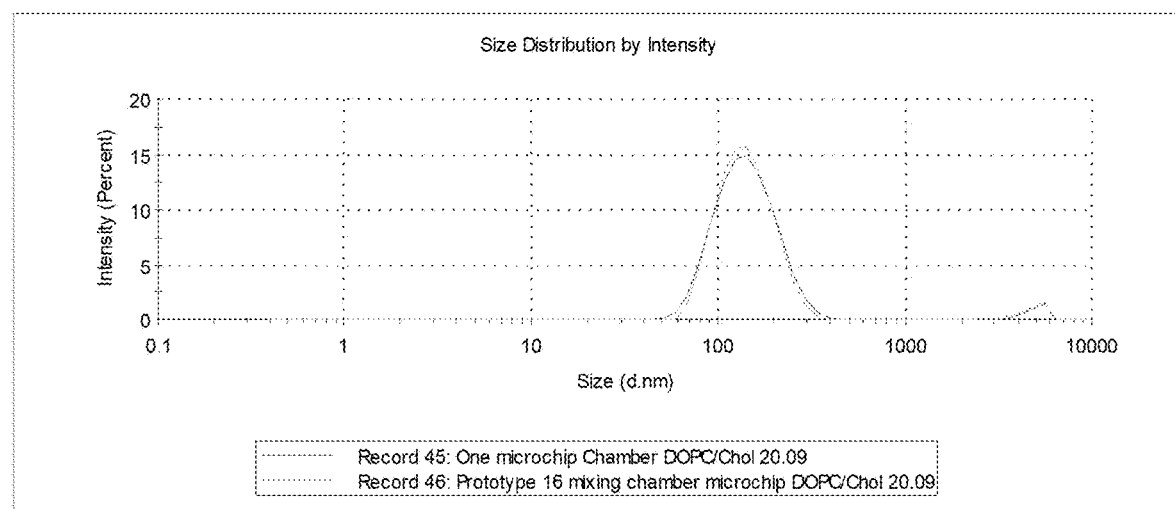
FIG. 35: Size distribution comparison between the 16 mixing chamber and single mixing chamber liposomes

Size measurements were calculated using Malvem ZS Nano series instruments (FIG. 35) and show the same trend for the pool of the 16-mixing chamber compared to the liposomes produced with the "one" mixing chamber. Sizes and polydispersity are also equivalent (Table 7).

The results show for the first time an equivalence for liposome production (DOPC-Cholesterol) between a prototype containing 16 mixing chambers (and the associated manifolds) suitable for use in commercial scale production with the one mixing chamber.

TABLE 7

DLS results of multichamber and single chamber liposomes

|  | Zav (nm) | PdI |
| --- | --- | --- |
| Single mixing chamber | 141 | 0.22 |
| Pool of 16 mixing chambers | 143 | 0.23 |

Example 7: Adaptive Immune Responses Relative to Liposomes Produced by Thin Film Methods Method Adjuvant Preparation Three lots of liposomes were prepared using the single mixing chamber apparatus described previously. Organic phase comprising DOPC (130 mg/ml), cholesterol (32.5 mg/ml) and 3D-MPL (6.5 mg/ml) in 80/20 ethanol/IPA was mixed with aqueous phase containing QS-21 (1.625 mg/ml) in water for injection under conditions of a total flow rate of 16 ml/min and a flow rate ratio of 5 (1:4 organic:aqueous). The temperature was maintained at 20° C.

Solvent was removed by diafiltration using a Hydrosart 30 kDa membrane and six volumes of replacement buffer. Diafiltration time was approximately 40 minutes. Material was subsequently sterile filtered using a sterile filtration on 0.22 um PES membrane.

The resulting liposomal adjuvant concentrate can be diluted as necessary to provide the final adjuvant preparations.

Vaccination 6-8 week old-female C57B16 mice (6 mice per group, total 186 animals) were injected twice with a 14-day interval with gE antigen in a liposomal formulation with 3D-MPL and QS-21. A negative control group received gE with buffer alone over the same schedule.

The final vaccination mixture was prepared by dilution of adjuvant concentrate and mixing with gE as necessary. Five doses of adjuvant were evaluated (0.05, 0.1, 0.2, 0.4 and 1 ug of both 3D-MPL and QS-21 per animal per injection, corresponding to 1/1000, 1/500, 1/250, 1/125 and 1/50 of a typical 50 ug human dose (HD), respectively based on expected content of immunostimulant). Each animal received 5 ug of gE per injection. The injection volume was 20 ul. Three lots of microfluidic liposomal adjuvant were compared to three lots of liposomal adjuvant produced by thin film methods.

Due to space restrictions, the experiment was undertaken in two parts (i.e. 3 mice from each group of 6 received treatment in each part, with the results combined).

Spleen and sera were collected and analysed for T and B cell responses, respectively, 7 days post the second immunisation (day 21).

ICS and ELISA were undertaken using the methods provided in Example 4.

Results

Microfluidic Lot Characterisation

TABLE 8

DLS characterisation of microfluid lots

| Lot | After microfluidic mixing | | After Diafiltration and Sterilisation | | After Storage (4 deg C.) | | |
|---|---|---|---|---|---|---|---|
| | ZAV (nm) | PdI | ZAV (nm) | PdI | ZAV (nm) | PdI | Time |
| 1 | 98 | 0.18 | 96 | 0.19 | 98 | 0.19 | 4.5 months |
| 2 | 100 | 0.21 | 100 | 0.22 | 99 | 0.21 | 4 months |
| 3 | 103 | 0.22 | 102 | 0.24 | 102 | 0.24 | 4 months |

TABLE 9

Microfluidic lot composition (after dilution of concentrate)

| Lot | DOPC (mg/ml) | Cholesterol (mg/ml) | QS21 (ug/ml) (Expected 100) | 3D-MPL (ug/ml) (Expected 100) | Residual alcohol (ug/500ul dose) |
|---|---|---|---|---|---|
| 1 | 1.9 | 0.46 | 91 | 74 | 55 |
| 2 | 2 | 0.51 | 96 | 82 | 125 |
| 3 | 2 | 0.48 | 96 | 79 | 85 |

TABLE 10

Thin film lot characterisation

| Lot | DOPC (mg/ml) | Cholesterol (mg/ml) | QS21 (ug/ml) (Expected 100) | 3D-MPL (ug/ml) (Expected 100) | Residual alcohol (ug/500 ul dose) | Zav (nm) | PdI |
|---|---|---|---|---|---|---|---|
| 1 | 2 | 0.49 | 99 | 84 | Not performed | 104 | 0.14 |
| 2 | 1.9 | 0.49 | 94 | 88 | Not performed | 108 | 0.14 |
| 3 | 2 | 0.48 | 101 | 84 | Not performed | 105 | 0.13 |

Figure 36:
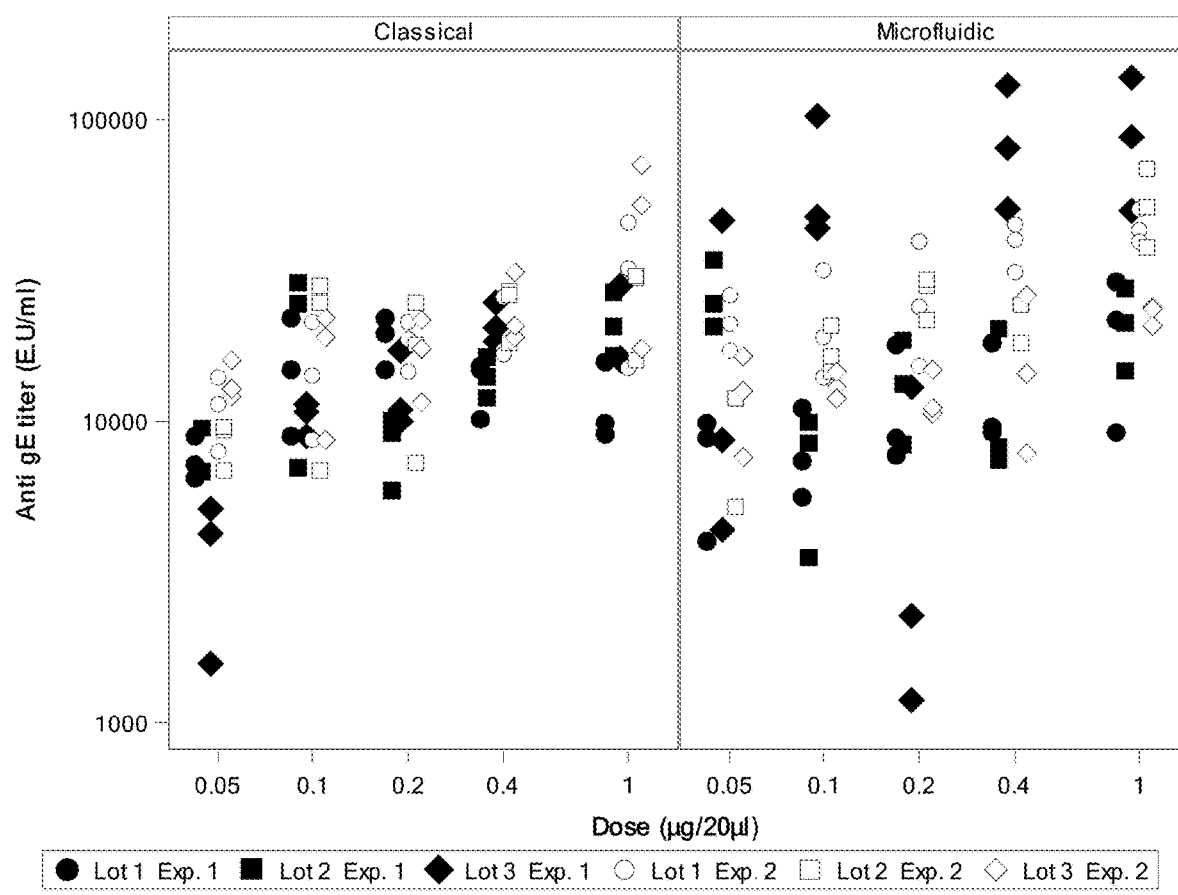
FIG. 36: gE-specific IgG titer comparison between microfluidic and thin film liposomal adjuvants
Figure 37:
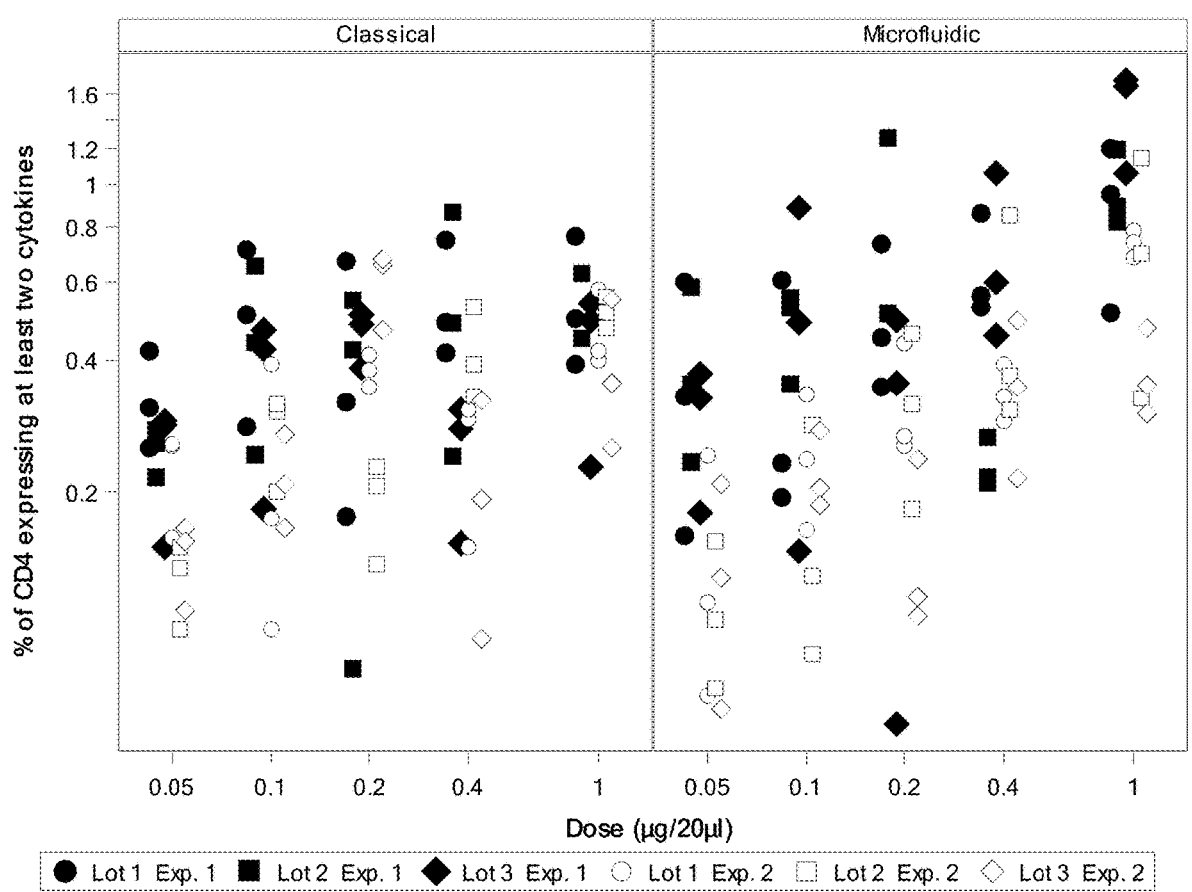
FIG. 37: gE-specific CD4+ T cells comparison between microfluidic and thin film liposomal adjuvants

ELISA results are shown in FIG. 36 and ICS results in FIG. 37.

Figure 38:
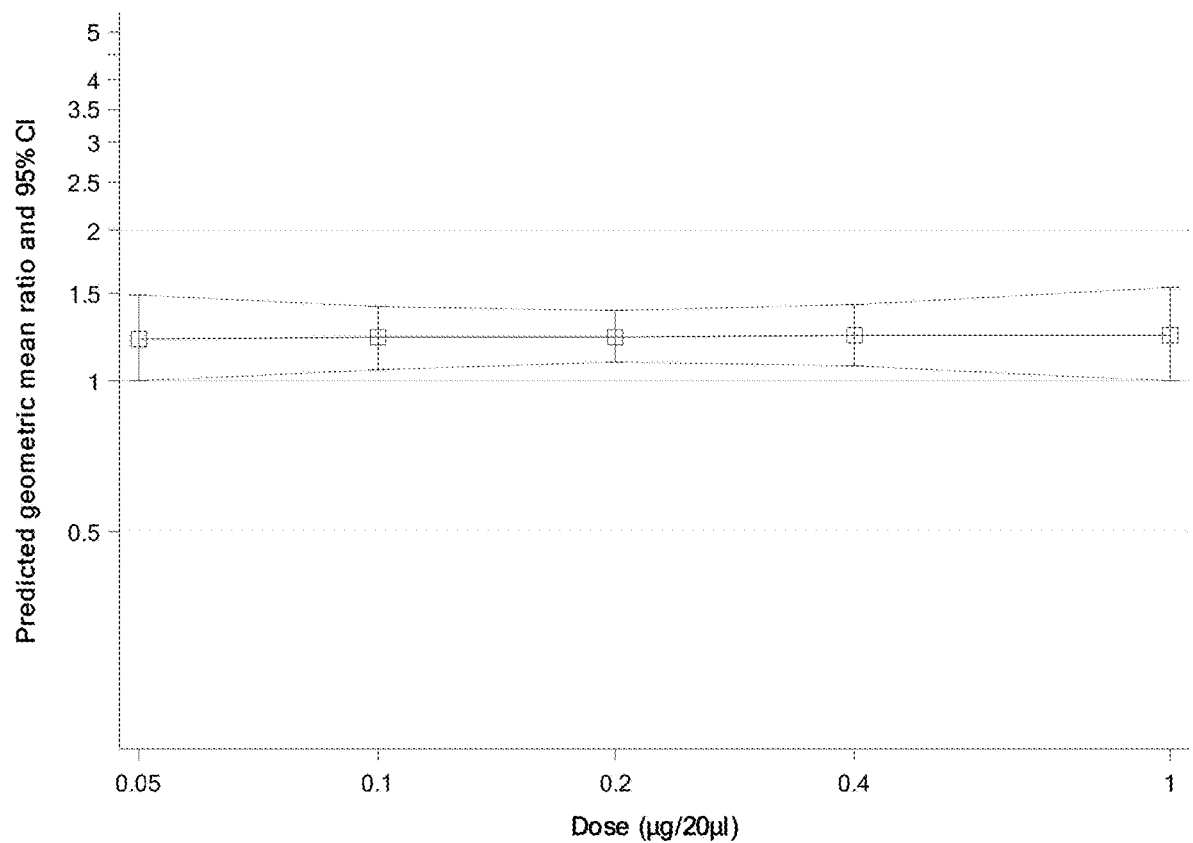
FIG. 38: gE-specific IgG titer GMR comparison between microfluidic and thin film liposomal adjuvants
Figure 39:
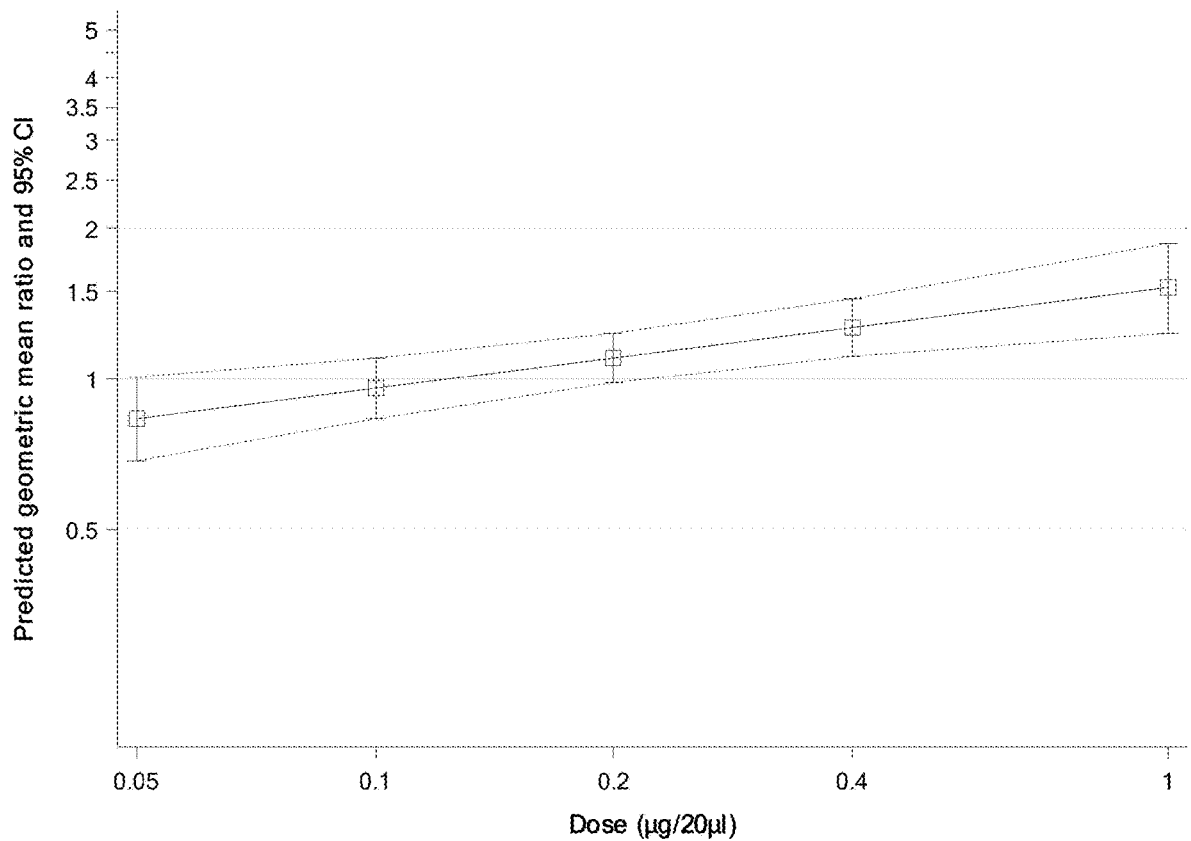
FIG. 39: gE-specific CD4+ T cells GMR comparison between microfluidic and thin film liposomal adjuvants

A model was used to compute and then retrieve the effect of the experiment part (Exp 1 vs Exp 2) and the lot (Lot 1, Lot 2 or Lot 3) from the date. A linear model was then fitted on these data separately for both processes. The associated predicted geometric means ratios between processes are presented in FIG. 38 and FIG. 39 (ELISA and ICS respectively).

Conclusions

Microfluidics-produced liposomes in conjunction with TLR4 agonist and saponin were capable of adjuvating the cellular and antibody responses to an exemplary antigen in a generally comparable manner to thin film produced liposomes.

Example 8: Adaptive Immune Responses Relative to Liposomes Produced by Thin Film Methods Following the successful scale up described in Example 6, the 16 channel microfluidic apparatus was used to prepare a batch of liposomal material including the saponin (QS21) and TLR4 (3D-MPL) immunostimulants.

Organic phase comprising DOPC (130 mg/ml), cholesterol (32.5 mg/ml) and 3D-MPL (6.5 mg/ml) in 80/20 ethanol/IPA was mixed with aqueous phase containing QS-21 (1.625 mg/ml) in water for injection under conditions of a total flow rate of 16 ml/min (per chamber) and a flow rate ratio of 5 (1:4 organic:aqueous). The temperature was maintained at 20° C.

An initial single chamber benchmark run was conducted using a single chamber (first 2 ml discarded).

Subsequently the system was operated with all 16 chambers in parallel and material from each chamber exit was individually collected (first 2 ml from each chamber discarded). A pool of the 16 chambers was prepared. A third run was performed the same single mixing chamber used for the benchmark conditions (not placed into the incubator), again the first 2 ml discarded.

Size measurements were undertaken by DLS after the microfluidic process (no solvent removal).

TABLE 11

DLS results of multichamber and single chamber liposomes

| | Zav (nm) | PdI |
|---|---|---|
| Single mixing chamber benchmark | 105 | 0.21 |
| Pool of 16 mixing chambers | 103 | 0.20 |
| Single mixing chamber | 106 | 0.21 |

Figure 40:
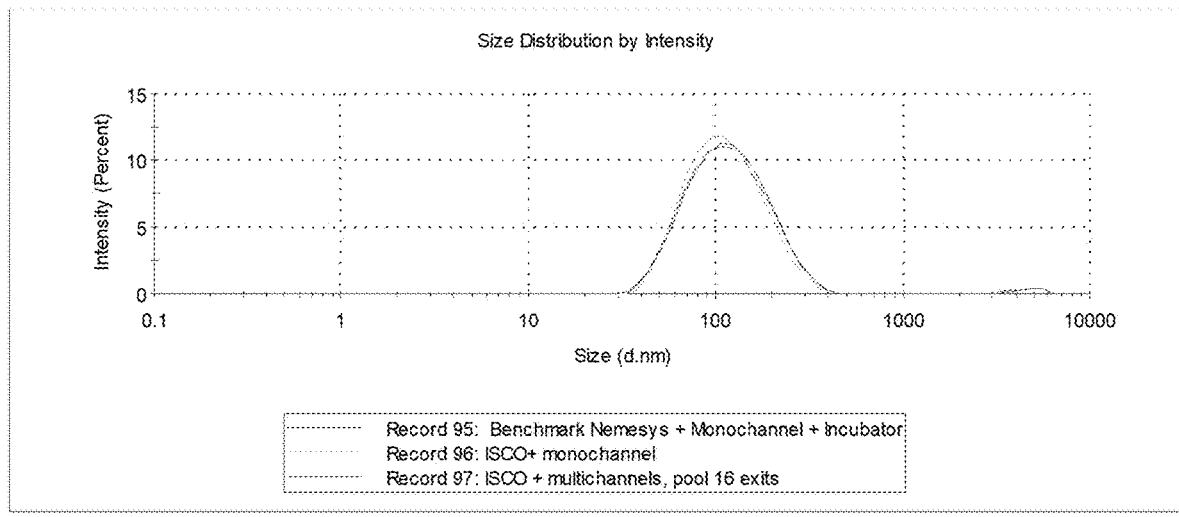
FIG. 40: Size distribution comparison between the 16 mixing chamber and single mixing chamber liposomes with saponin (QS21) and TLR4 agonist (3D-MPL)
Figure 41:
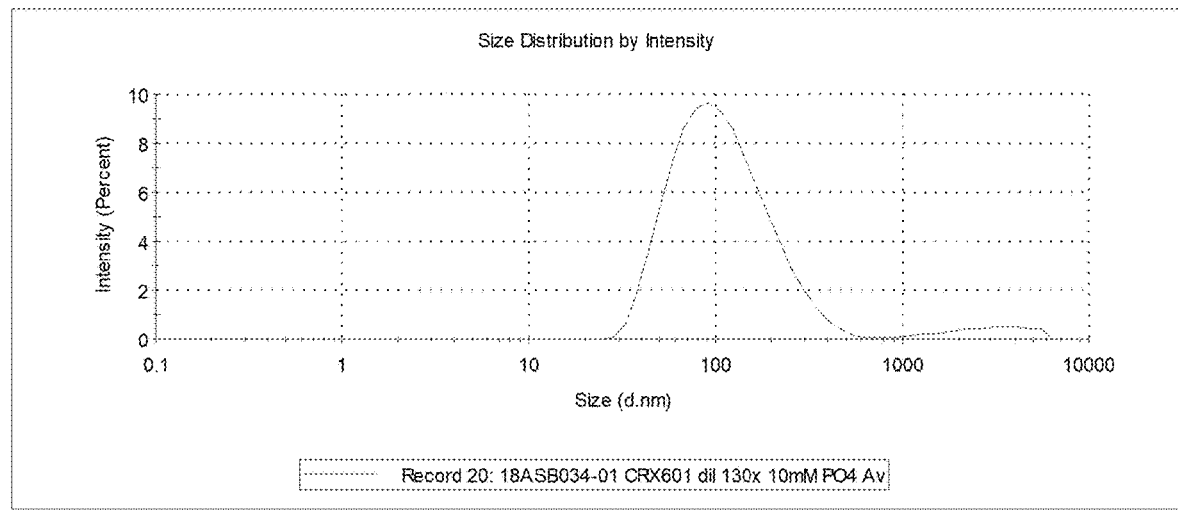
FIG. 41: Size distribution for CRX601 containing liposomes produced in a single mixing chamber device

The comparison of the sizes obtained on the three runs (FIG. 40) shows comparable profiles, confirming that the robust and scalable nature of the approaches set out in the present application.

Example 9: CRX601 Liposome Production

A single channel microfluidic apparatus was used to prepare a batch of liposomal material including the AGP CRX601.

Method

First Solution

A suspension of CRX601 in ethanol (15 mg/ml) was added to DOPC and cholesterol powders. The volume was then adjusted with addition of the ethanol and isopropanol (to reach final proportion of 80:20 ethanol:isopropanol). The mixture was heated to 40° C. for 15 minutes, filtered through 0.45 µm PFTE membranes and the filter washed with solvent (80:20 ethanol:IPA) to provide a final composition with 130 mg/ml of DOPC, 32.5 mg/ml of cholesterol and 6.5 mg/ml of CRX601.

Second Solution

A QS21 stock solution was diluted with water to reach a final concentration of 1.625 mg/ml QS21.

The microfluidics process was run at a temperature of 20° C. with a total flow rate of 16 ml/min and a flowrate ratio of 5 (1:4 organic:aqueous). 2 ml of product was pooled and subjected to DLS measurement after dilution 130× in phosphate buffer at pH 6.1.

Results

TABLE 12

| DLS results of liposome formation | Zav (nm) | PdI |
|---|---|---|
| QS21/CRX601 liposomes | 96 | 0.26 |
| QS21/3D-MPL control liposomes | 99 | 0.19 |

Size analysis in phosphate buffer (PBS pH 6.1) shows a Zav close to the target of 100 nm with a Pdl of 0.26.

Conclusion

Liposomes comprising AGPs such as CRX601 can be produced by microfluidic methods.

Throughout the specification and the claims which follow, unless the context requires otherwise, the word 'comprise', and variations such as 'comprises' and 'comprising', will be understood to imply the inclusion of a stated integer, step, group of integers or group of steps but not to the exclusion of any other integer, step, group of integers or group of steps.

The application of which this description and claims forms part may be used as a basis for priority in respect of any subsequent application. The claims of such subsequent application may be directed to any feature or combination of features described herein. Embodiments are envisaged as being independently, fully combinable with one another where appropriate to the circumstances to form further embodiments of the invention. They may take the form of product, composition, process, or use claims and may include, by way of example and without limitation, the claims which follow.

All publications, including but not limited to patents and patent applications, cited in this specification are herein incorporated by reference as if each individual publication were specifically and individually Indicated to be incorporated by reference herein as though fully set forth.

BIBLIOGRAPHY

Arias M A et al. (2012) Glucopyranosyl Lipid Adjuvant (GLA), a Synthetic TLR4 Agonist, Promotes Potent Systemic and Mucosal Responses to Intranasal Immunization with HIVgp140. PLoS ONE 7(7): e41144. doi:10.1371/journal.pone.0041144

Black, S., E. De Gregorio, and R. Rappuoli. 2015. Developing vaccines for an aging population. *Science translational medicine.* 7:281ps288

Coler R N et al. (2011) Development and Characterization of Synthetic Glucopyrenosyl Lipid Adjuvant System as a Vaccine Adjuvant. PLoS ONE 6(1): e16333. doi:10.1371/journal.pone.0016333

Dalsgaard et al. in 1974 ("Saponin adjuvants", Archiv. für die gesamte Virusforschung, Vol. 44, Springer Verlag, Berlin, p 243-254)

De Becker, G., V. Moulin, B. Pajak, C. Bruck, M. Francotte, C. Thiriart, J. Urbain, and M. Moser. 2000. The adjuvant monophosphoryl lipid A increases the function of antigen-presenting cells. *International immunology.* 12:807-815.

Dendouga, N., M. Fochesato, L. Lockman, S. Mossman, and S. L. Giannini. 2012. Cell-mediated immune responses to a varicella-zoster virus glycoprotein E vaccine using both a TLR agonist and QS-21 in mice. *Vaccine.* 30:3126-3135.

Didierlaurent A. M., Collignon C., Bourguignon P., Wouters S., Fierens K., Fochesato M., Dendouga N., Langlet C., Malissen B., Lambrecht B. N., Garcon N., Van Mechelen M., and S. Morel. 2014 Enhancement of Adaptive Immunity by the Human Vaccine Adjuvant AS01 Depends on Activated Dendritic Cells *Journal of Immunology* 193(4): 1920-1930.

Didierlaurent et al, 2017 Adjuvant system AS01: helping to overcome the challenges of modern vaccines *Expert Reviews of Vaccines* 16(1): 55-63

Enhancement of Adaptive Immunity by the Human Vaccine Adjuvant AS01 Depends on Activated Dendritic Cells. *The Journal of Immunology.* 193

Garcon, N., and M. Van Mechelen. 2011. Recent clinical experience with vaccines using MPL- and QS-21-containing adjuvant systems. *Expert review of vaccines.* 10:471-486

Fochesato, M., Dendouga N. and Boxus M. 2016 *Hum Vaccin Immunother* 12(8):2092-2095

Haumont M., Jacquet A., Massaer M., Deleersnyder V., Mazzu P., Bollen A. and Jacobs P 1996 Purification, characterization and immunogenicity of recombinant varicella-zoster virus glycoprotein gE secreted by Chinese hamster ovary cells *Virus Res* 1996 40(2):199-204

Helminen M E, et al. (1993) Infect. Immun. 61:2003-2010

Hood, R. R.; DeVoe, D. L. 2015 High Throughput Continuous Flow Production of Nanoscale Liposomes by Microfluidic Vertical Flow Focusing. *Small Journal.* 11, No. 43, 5790-5799

Ismaili, J., J. Rennesson, E. Aksoy, J. Vekemans, B. Vincart, Z. Amraoui, F. Van Laethem, M. Goldman, and P. M. Dubois. 2002. Monophosphoryl lipid A activates both human dendritic cells and T cells. *Journal of immunology.* 168:926-932.

Kensil, C. R., U. Patel, M. Lennick, and D. Marciani. 1991. Separation and characterization of saponins with adjuvant activity from *Quillaja saponaria* Molina cortex. *Journal of immunology.* 146:431-437.

Kensil, C. R., and R. Kammer. 1998. QS-21: a water-soluble triterpene glycoside adjuvant. *Expert opinion on investigational drugs.* 7:1475-1482.

Kim Y T et al 2012 Mass production and size control of lipid-polymer hybrid nanoparticles through controlled microvortices. *Nano Letters* 12(7):3587-3591

Lambrecht, B. N., M. Kool, M. A. Willart, and H. Hammad. 2009. Mechanism of action of clinically approved adjuvants. *Current opinion in immunology.* 21:23-29.

Leroux-Roels I. et al. J. Infect. Dis. 2012, 206: 1280-1290

Li, H., S. B. Willingham, J. P. Ting, and F. Re. 2008. Cutting edge: Inflammasome activation by alum and alum's adjuvant effect are mediated by NLRP3. *Journal of immunology.* 181:17-21.

Livingston, P. O., S. Adluri, F. Helling, T. J. Yao, C. R. Kensil, M. J. Newman, and D. Marciani. 1994. Phase 1 trial of immunological adjuvant QS-21 with a GM2 ganglioside-keyhole limpet haemocyanin conjugate vaccine in patients with malignant melanoma. *Vaccine.* 12:1275-1280.

Ragupathl, G., J. R. Gardner, P. O. Livingston, and D. Y. Gin. 2011. Natural and synthetic saponin adjuvant QS-21 for vaccines against cancer. *Expert review of vaccines.* 10:463-470

Martin, M., S. M. Michalek, and J. Katz. 2003. Role of innate immune factors in the adjuvant activity of monophosphoryl lipid A. *Infection and immunity.* 71:2498-2507.

Marty-Roix, R. et al. Identification of QS-21 as an Inflammasome-activating Molecular Component of Saponin Adjuvants. *J. Biol. Chem.* 291, 1123-36 (2016)

Mata-Haro, V., C. Cekic, M. Martin, P. M. Chilton, C. R. Casella, and T. C. Mitchell. 2007. The vaccine adjuvant monophosphoryl lipid A as a TRIF-biased agonist of TLR4. *Science*. 316:1628-1632.

Newman, M. J., J. Y. Wu, B. H. Gardner, K. J. Munroe, D. Leombruno, J. Recchia, C. R. Kensil, and R. T. Coughlin. 1992. Saponin adjuvant induction of ovalbumin-specific CD8+ cytotoxic T lymphocyte responses. *Journal of immunology*. 148:2357-2362.

Soltysik, S., J. Y. Wu, J. Recchla, D. A. Wheeler, M. J. Newman, R. T. Coughlin, and C. R. Kensil. 1995. Structure/function studies of QS-21 adjuvant: assessment of triterpene aldehyde and glucuronic acid roles in adjuvant function. *Vaccine*. 13:1403-1410.

Vafai A., Antibody binding sites on truncated forms of varicella-zoster virus gpl(gE) glycoprotein, *Vaccine* 1994 12:1265-9

---

The invention claimed is:

1. A method of manufacturing a liposomal adjuvant using a microfluidic device; the liposomal adjuvant comprising liposomes; the liposomes comprising: (i) a phosphatidylcholine lipid and (ii) an aminoalkyl glucosaminide phosphate compound (AGP) or a glucopyranosyl lipid adjuvant (GLA); the microfluidic device comprising a mixing chamber, a first inlet, at least two second inlets, and an outlet; the first inlet and the at least two second inlets being in fluid communication with the mixing chamber; the mixing chamber being in fluid communication with the outlet; each of the first inlet and the at least two second inlets having a cross-sectional area of 0.16 mm² or less; the method comprising:

(a) mixing in the mixing chamber a first solution and a second solution; the first solution comprising: (i) a solvent, (ii) the AGP or the GLA and (iii) 100-170 mg of the phosphatidylcholine lipid; the solvent comprising 70-90% v/v ethanol and 10-30% v/v isopropyl alcohol: the second solution comprising water; the first solution being delivered to the mixing chamber by the first inlet; and the second solution being delivered to the mixing chamber by the at least two second inlets; thereby obtaining the liposomal adjuvant in the mixing chamber; the liposomal adjuvant flowing through the outlet; and (b) removing the solvent from the liposomal adjuvant.

2. The method of claim 1 further comprising adding a saponin between (a) and (b).

3. The method of claim 1 further comprising: (c) adding a saponin.

4. The method of claim 1, wherein the second solution further comprises a saponin and the liposomal adjuvant further comprises the saponin.

5. The method of claim 4, wherein the saponin comprises QS-21.

6. The method of claim 5, wherein the liposome comprises the GLA and the GLA is:

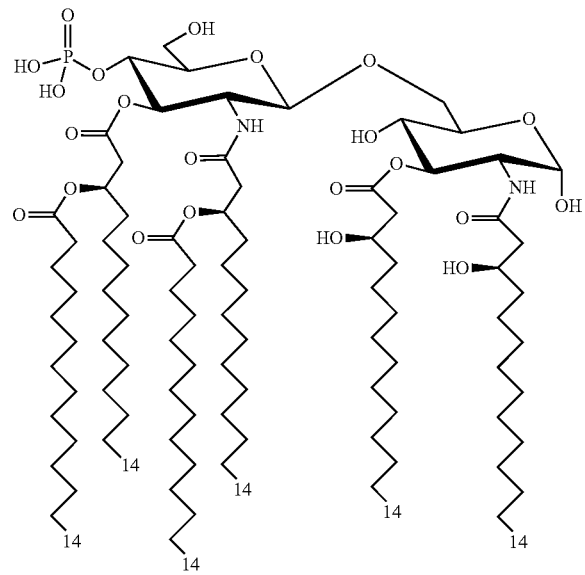

or a salt thereof.

7. The method of claim 6, wherein the phosphatidylcholine lipid is DOPC.

8. The method of claim 7, wherein the liposomes have a Z-average diameter of from 95 nm to 120 nm and a polydispersity of 0.3 or lower.

9. The method of claim 5, wherein the liposome comprises the GLA and the GLA is:

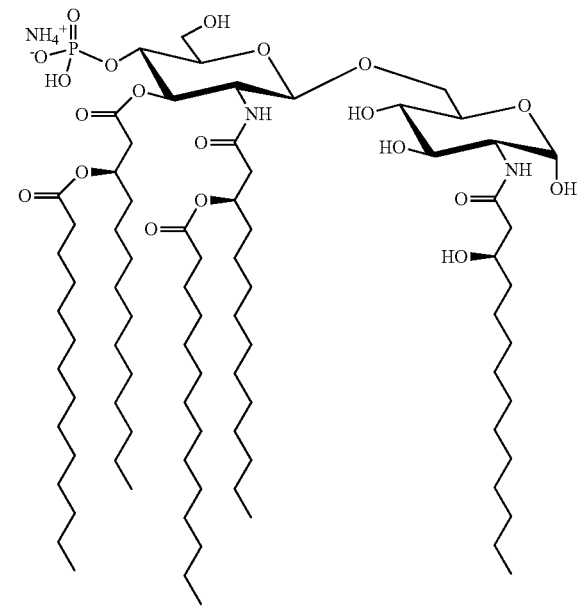

or a salt thereof.

10. The method of claim 9, wherein the phosphatidylcholine lipid is DOPC.

11. The method of claim 10, wherein the liposomes have a Z-average diameter of from 95 nm to 120 nm and a polydispersity of 0.3 or lower.

12. The method of claim 1, wherein the phosphatidylcholine lipid is dioleoyl phosphatidylcholine (DOPC).

13. The method of claim 1, wherein the liposomes have a Z-average diameter of from 95 nm to 120 nm and a polydispersity of 0.3 or lower.

14. The method of claim 1 further comprising mixing the liposomal adjuvant with an immunogen or a polynucleotide encoding the immunogen, thereby obtaining an adjuvanted immunogenic composition.

15. The method of claim 1; the liposomes further comprising cholesterol; the solvent being divided into a first portion and a second portion; the method further comprising before (a):
   (i) preparing a suspension of the AGP or the GLA in the first portion of the solvent, thereby obtaining a suspension;
   (ii) combining the suspension with the phosphatidylcholine lipid and the cholesterol, thereby obtaining a first intermediate;
   (iii) adding the second portion of the solvent to the first intermediate, thereby obtaining a second intermediate;
   (iv) mixing, thereby obtaining the first solution.

16. The method of claim 1; the liposomes further comprising cholesterol; the solvent being divided into a first portion, a second portion, and a third portion, the method further comprising before (a):
   i) preparing a suspension of the AGP or the GLA in the first portion of the solvent, thereby obtaining a suspension;
   (ii) combining the suspension with the phosphatidylcholine lipid and the cholesterol, thereby obtaining a first intermediate;
   (iii) adding the second portion of the solvent to the first intermediate, thereby obtaining a second intermediate;
   (iv) mixing the second intermediate, thereby obtaining a third intermediate;
   (v) adding the third portion of the solvent to the third intermediate, thereby (v) obtaining the first solution.

17. The method of claim 1, wherein the liposomes comprise the AGP and the AGP has the following structure:

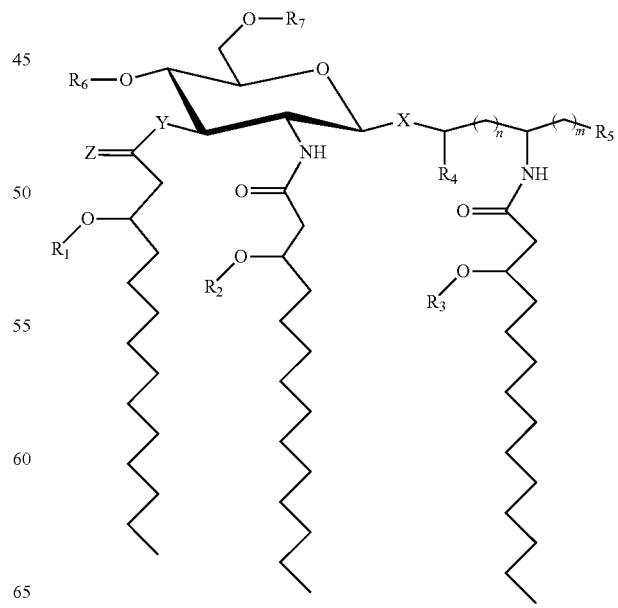

wherein:

m is 0 to 6;

n is 0 to 4;

X is O or S;

Y is O or NH;

Z is O or H;

each of $R_1$, $R_2$, and $R_3$ is selected independently from the group consisting of a $C_{1-20}$ acyl and a $C_{1-20}$ alkyl;

$R_4$ is H or methyl;

$R_5$ is selected from the group consisting of —H, —OH, —($C_1$-$C_4$)alkoxy, —$PO_3R_8R_9$, —$OPO_3R_8R_9$, —$SO_3R_8$, —$OSO_3R_8$, —$NR_8R_9$, —$SR_8$, —CN, —$NO_2$, —CHO, —$CO_2R_8$, and —$CONR_8R_9$, wherein $R_8$ and $R_9$ are each independently selected from H and ($C_1$-$C_4$) alkyl; and each of $R_6$ and $R_7$ is independently H or $PO_3H_2$;

or a pharmaceutically acceptable salt thereof.

18. The method of claim 1, wherein the liposomes comprise the AGP and AGP has the following structure:

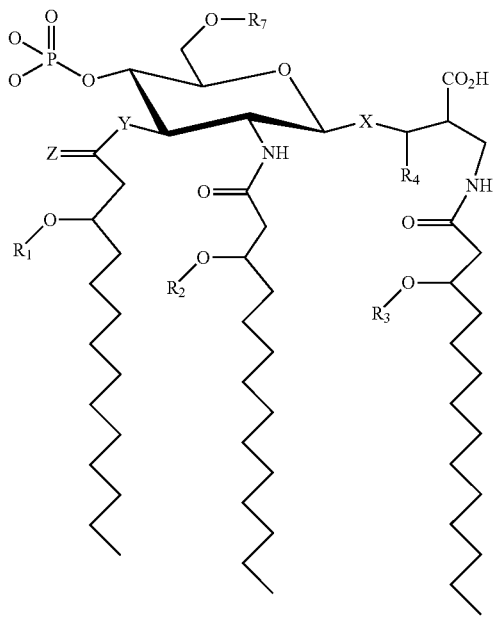

wherein:

X is O or S;

Y is O or NH;

Z is O or H;

each of $R_1$, $R_2$, and $R_3$ is selected independently from the group consisting of a $C_{1-20}$ acyl and a $C_{1-20}$ alkyl;

and $R_4$ is H or methyl;

or a pharmaceutically acceptable salt thereof.

19. The method according to claim 1, wherein the liposomes comprise the AGP and the AGP is:

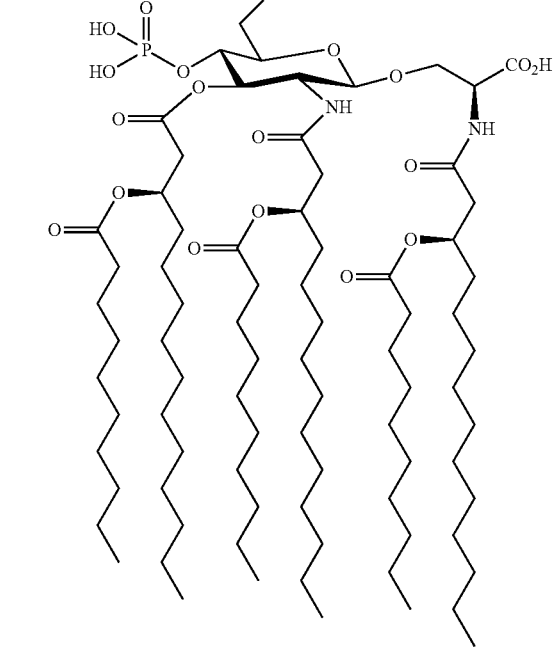

or a salt thereof.

20. The method of claim 1, wherein the liposome comprises the GLA and the GLA is:

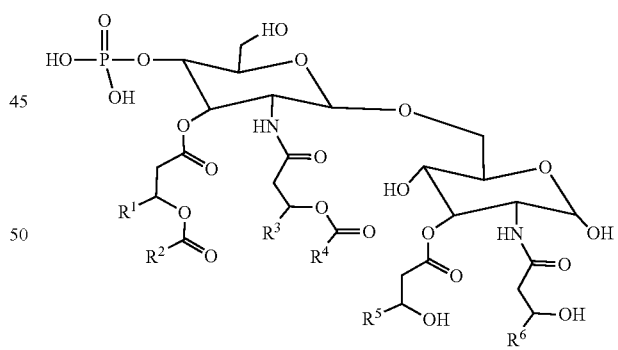

wherein:

$R^1$, $R^3$, $R^5$, and $R^6$ are each independently $C_{11-20}$alkyl; and $R^2$ and $R^4$ are each independently $C_{12-20}$alkyl; or salts thereof.

21. The method of claim 1, wherein the liposomes comprise the GLA and the GLA is:

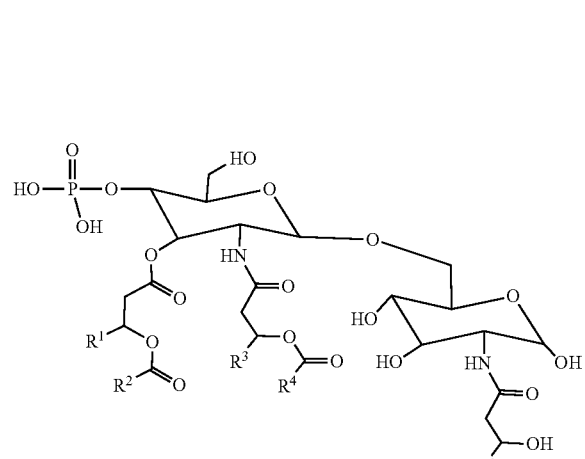

wherein:
$R_1$, $R_3$, and $R_6$ are each independently $C_{11-20}$alkyl; and
$R_2$ and $R_4$ are each independently $C_{12-20}$alkyl; or
a salt thereof.

22. The method of claim 1, wherein the liposomes comprise the GLA and the GLA is:

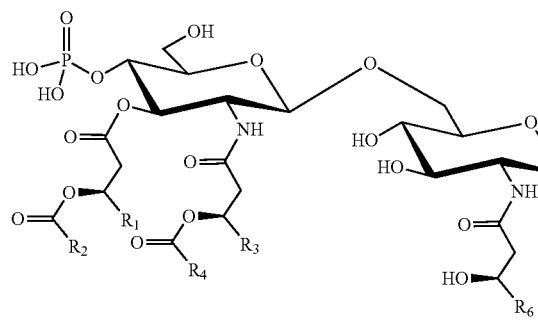

wherein:
$R_1$, $R_3$ and $R_6$ are each independently $C_{11-20}$alkyl; and
$R_2$ and $R_4$ are each independently $C_{12-20}$alkyl; or
a salt thereof.

23. The method of claim 1, wherein the GLA is:

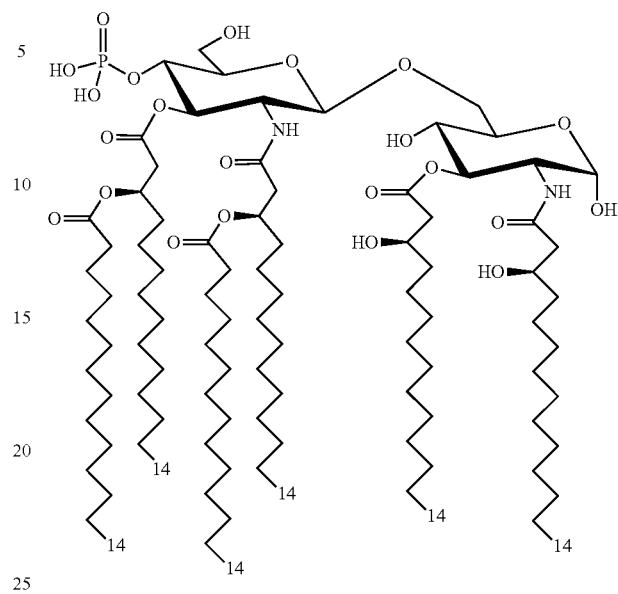

or a salt thereof.

24. The method of claim 1, wherein the liposomes comprise the GLA and the GLA is:

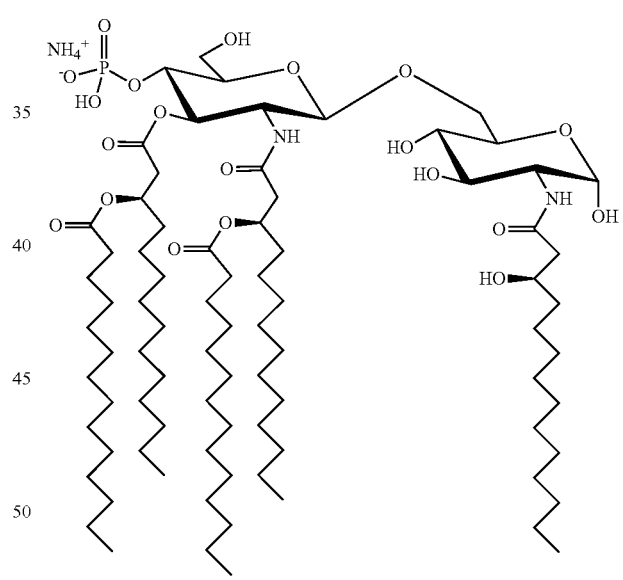

or a salt thereof.

25. The method of claim 1, wherein the liposomes further comprise a sterol and the first solution further comprises the sterol.

26. A method of manufacturing a liposomal concentrate of use in the preparation of a liposomal adjuvant using a microfluidic device; the liposomal concentrate comprising liposomes; the liposomes comprising: (i) a phosphatidylcholine lipid and (ii) an AGP or a GLA; the microfluidic device comprising a mixing chamber, a first inlet, at least two second inlets, and an outlet; the first inlet and the at least two second inlets being in fluid communication with the mixing chamber; the mixing chamber being in fluid communication with the outlet; each of the first inlet and the at least two second inlets having a cross-sectional area of 0.16 mm$^2$ or less; the method comprising mixing in the mixing chamber a first solution and a second solution, the first solution comprising: (i) a solvent, (ii) the AGP or the GLA, and (iii) 100-170 mg of the phosphatidylcholine lipid; the solvent comprising 70-90% v/v ethanol and 10-30% v/v isopropyl alcohol; the second solution comprising water; the first solution being delivered to the mixing chamber by the first inlet; and the second solution being delivered to the mixing chamber by the at least two second inlets; thereby obtaining the liposomal adjuvant in the mixing chamber; and the liposomal adjuvant flowing through the outlet.

\* \* \* \* \*

SEQUENCE LISTING

```
<160> NUMBER OF SEQ ID NOS: 1

<210> SEQ ID NO 1
<211> LENGTH: 546
<212> TYPE: PRT
<213> ORGANISM: Varicella zoster

<400> SEQUENCE: 1

Met Gly Thr Val Asn Lys Pro Val Val Gly Val Leu Met Gly Phe Gly
1               5                   10                  15

Ile Ile Thr Gly Thr Leu Arg Ile Thr Asn Pro Val Arg Ala Ser Val
                20                  25                  30

Leu Arg Tyr Asp Asp Phe His Ile Asp Glu Asp Lys Leu Asp Thr Asn
            35                  40                  45

Ser Val Tyr Glu Pro Tyr Tyr His Ser Asp His Ala Glu Ser Ser Trp
        50                  55                  60

Val Asn Arg Gly Glu Ser Ser Arg Lys Ala Tyr Asp His Asn Ser Pro
65                  70                  75                  80

Tyr Ile Trp Pro Arg Asn Asp Tyr Asp Gly Phe Leu Glu Asn Ala His
                85                  90                  95

Glu His His Gly Val Tyr Asn Gln Gly Arg Gly Ile Asp Ser Gly Glu
            100                 105                 110

Arg Leu Met Gln Pro Thr Gln Met Ser Ala Gln Glu Asp Leu Gly Asp
        115                 120                 125

Asp Thr Gly Ile His Val Ile Pro Thr Leu Asn Gly Asp Asp Arg His
    130                 135                 140

Lys Ile Val Asn Val Asp Gln Arg Gln Tyr Gly Asp Val Phe Lys Gly
145                 150                 155                 160

Asp Leu Asn Pro Lys Pro Gln Gly Gln Arg Leu Ile Glu Val Ser Val
                165                 170                 175

Glu Glu Asn His Pro Phe Thr Leu Arg Ala Pro Ile Gln Arg Ile Tyr
            180                 185                 190

Gly Val Arg Tyr Thr Glu Thr Trp Ser Phe Leu Pro Ser Leu Thr Cys
        195                 200                 205

Thr Gly Asp Ala Ala Pro Ala Ile Gln His Ile Cys Leu Lys His Thr
    210                 215                 220

Thr Cys Phe Gln Asp Val Val Val Asp Val Asp Cys Ala Glu Asn Thr
225                 230                 235                 240

Lys Glu Asp Gln Leu Ala Glu Ile Ser Tyr Arg Phe Gln Gly Lys Lys
                245                 250                 255

Glu Ala Asp Gln Pro Trp Ile Val Val Asn Thr Ser Thr Leu Phe Asp
            260                 265                 270

Glu Leu Glu Leu Asp Pro Pro Glu Ile Glu Pro Gly Val Leu Lys Val
        275                 280                 285

Leu Arg Thr Glu Lys Gln Tyr Leu Gly Val Tyr Ile Trp Asn Met Arg
        290                 295                 300
```

-continued

```
Gly Ser Asp Gly Thr Ser Thr Tyr Ala Thr Phe Leu Val Thr Trp Lys
305                 310                 315                 320

Gly Asp Glu Lys Thr Arg Asn Pro Thr Pro Ala Val Thr Pro Gln Pro
                325                 330                 335

Arg Gly Ala Glu Phe His Met Trp Asn Tyr His Ser His Val Phe Ser
                340                 345                 350

Val Gly Asp Thr Phe Ser Leu Ala Met His Leu Gln Tyr Lys Ile His
            355                 360                 365

Glu Ala Pro Phe Asp Leu Leu Leu Glu Trp Leu Tyr Val Pro Ile Asp
370                 375                 380

Pro Thr Cys Gln Pro Met Arg Leu Tyr Ser Thr Cys Leu Tyr His Pro
385                 390                 395                 400

Asn Ala Pro Gln Cys Leu Ser His Met Asn Ser Gly Cys Thr Phe Thr
                405                 410                 415

Ser Pro His Leu Ala Gln Arg Val Ala Ser Thr Val Tyr Gln Asn Cys
                420                 425                 430

Glu His Ala Asp Asn Tyr Thr Ala Tyr Cys Leu Gly Ile Ser His Met
            435                 440                 445

Glu Pro Ser Phe Gly Leu Ile Leu His Asp Gly Gly Thr Thr Leu Lys
            450                 455                 460

Phe Val Asp Thr Pro Glu Ser Leu Ser Gly Leu Tyr Val Phe Val Val
465                 470                 475                 480

Tyr Phe Asn Gly His Val Glu Ala Val Ala Tyr Thr Val Val Ser Thr
                485                 490                 495

Val Asp His Phe Val Asn Ala Ile Glu Glu Arg Gly Phe Pro Pro Thr
            500                 505                 510

Ala Gly Gln Pro Pro Ala Thr Thr Lys Pro Lys Glu Ile Thr Pro Val
            515                 520                 525

Asn Pro Gly Thr Ser Pro Leu Ile Arg Tyr Ala Ala Trp Thr Gly Gly
            530                 535                 540

Leu Ala
545
```